(12) United States Patent
Grant et al.

(10) Patent No.: US 9,940,394 B1
(45) Date of Patent: Apr. 10, 2018

(54) MESSAGING SEARCH AND MANAGEMENT APPARATUSES, METHODS AND SYSTEMS

(71) Applicant: Slack Technologies, Inc., San Francisco, CA (US)

(72) Inventors: Myles Grant, San Carlos, CA (US); Serguei Mourachov, Vancouver (CA); Renaud Bourassa-Denis, New York, NY (US); Jason Liszka, New York, NY (US); John Gallagher, New York, NY (US); Isabella Tromba, New York, NY (US); Noah Weiss, New York, NY (US); Daniel Stewart Butterfield, Vancouver (CA); Callum Henderson-Begg, San Francisco, CA (US)

(73) Assignee: Slack Technologies, Inc., San Francisco, CA (US)

(*) Notice: Subject to any disclaimer, the term of this patent is extended or adjusted under 35 U.S.C. 154(b) by 0 days.

(21) Appl. No.: 15/651,887

(22) Filed: Jul. 17, 2017

Related U.S. Application Data

(63) Continuation-in-part of application No. 15/604,584, filed on May 24, 2017, and a continuation-in-part of application No. 15/604,589, filed on May 24, 2017.

(60) Provisional application No. 62/408,670, filed on Oct. 14, 2016, provisional application No. 62/500,451, filed on May 2, 2017.

(51) Int. Cl.
*G06F 17/30* (2006.01)
*H04L 12/58* (2006.01)

(52) U.S. Cl.
CPC ........ *G06F 17/30864* (2013.01); *H04L 51/22* (2013.01)

(58) Field of Classification Search
CPC .................................................. G06F 17/30091
See application file for complete search history.

(56) References Cited

U.S. PATENT DOCUMENTS

| | | | | |
|---|---|---|---|---|
| 7,730,094 B2* | 6/2010 | Kaler | .................. | G06F 21/6218 707/785 |
| 2006/0041661 A1* | 2/2006 | Erikson | ............. | G06F 17/30887 709/225 |
| 2008/0104665 A1* | 5/2008 | Naldurg | ................ | G06F 21/577 726/2 |

* cited by examiner

*Primary Examiner* — Mohammad S Rostami
(74) *Attorney, Agent, or Firm* — Hanchuk Kheit LLP; Walter G. Hanchuk

(57) ABSTRACT

The Messaging Search and Management Apparatuses, Methods and Systems ("MSM") transforms message, ranking request inputs via MSM components into work graphs, ML structure input data, ML structure, ranking response outputs. A work graph generation request that includes group level access control data may be obtained. A set of metadata access control carrying messages, a set of users, a set of channels, and a set of topics with access control data corresponding to the group level access control data may be determined. A user priority score for each of the other users, a channel priority score for each of the channels, and a topic priority score for each of the topics, from the perspective of each user, may be calculated. A work graph data structure may be generated that includes, for each user, data regarding the calculated user priority scores, channel priority scores, and topic priority scores.

18 Claims, 28 Drawing Sheets

EXEMPLARY MSM ARCHITECTURE

EXEMPLARY MSM METADATA DETERMINING (MD) COMPONENT

EXEMPLARY MSM WORK GRAPH GENERATING (WGG) COMPONENT

EXEMPLARY MSM WORK GRAPH

EXEMPLARY MSM ML STRUCTURE GENERATING (MLSG) COMPONENT

EXEMPLARY MSM RANKING DETERMINING (RD) COMPONENT

FIGURE 10
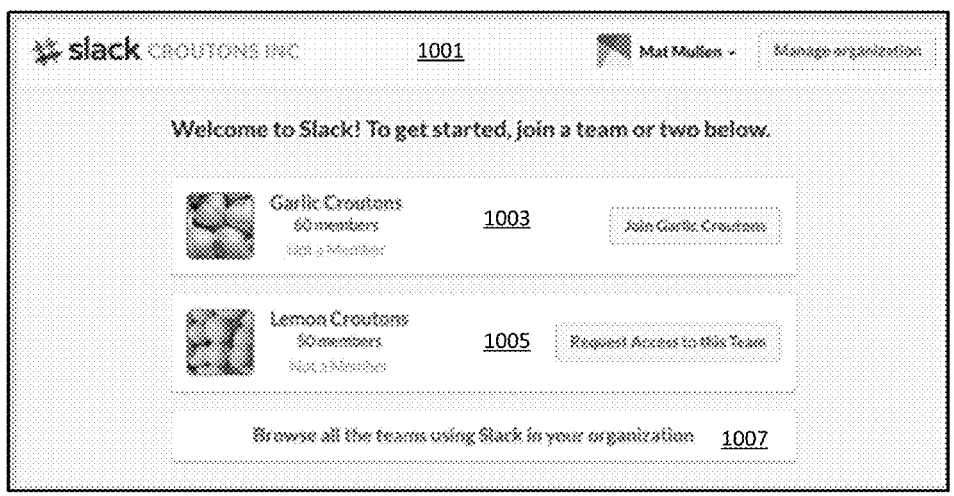
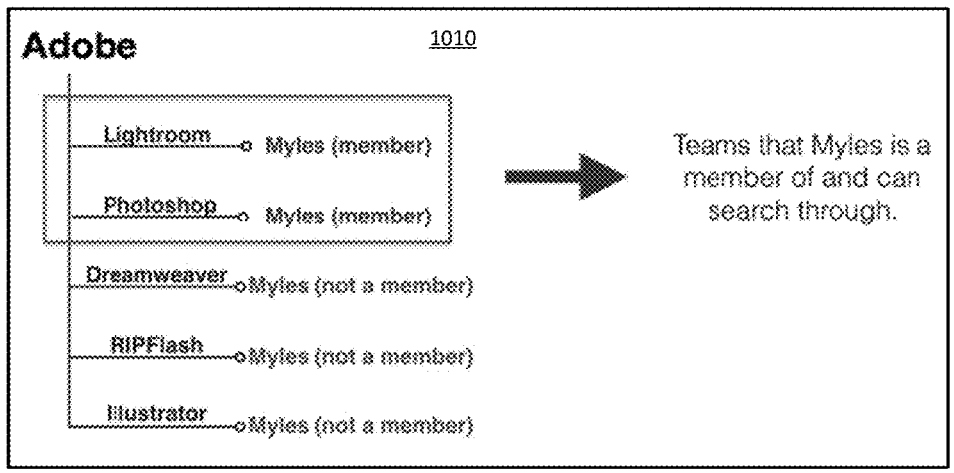
EXEMPLARY MSM SCREENSHOT

EXEMPLARY MSM SCREENSHOT

EXEMPLARY MSM SCREENSHOT

EXEMPLARY MSM SCREENSHOT

EXEMPLARY MSM SCREENSHOT

EXEMPLARY MSM SCREENSHOT

EXEMPLARY MSM SCREENSHOT

FIGURE 17A

EXEMPLARY MSM SCREENSHOT

FIGURE 18
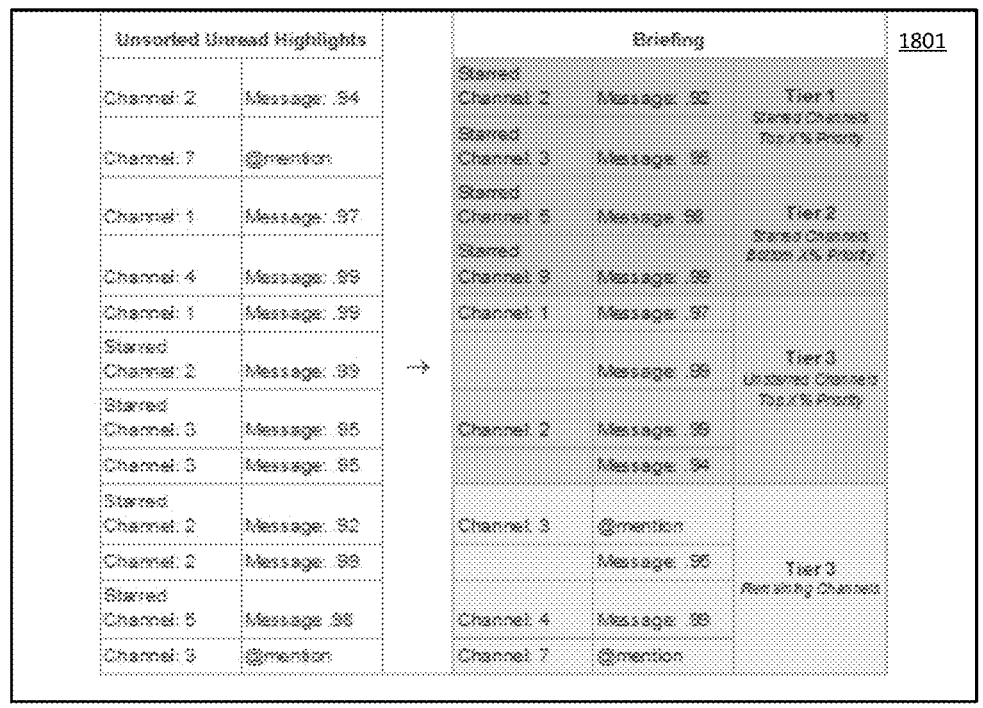
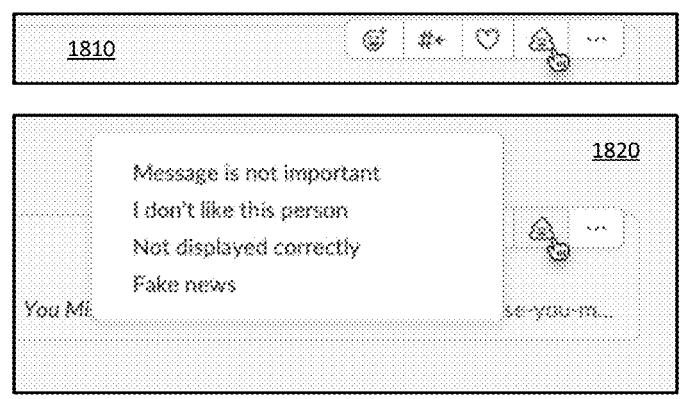
EXEMPLARY MSM SCREENSHOT

EXEMPLARY MSM SCREENSHOT

EXEMPLARY MSM SCREENSHOT

EXEMPLARY MSM SCREENSHOT

EXEMPLARY MSM SCREENSHOT

EXEMPLARY MSM SCREENSHOT

EXEMPLARY MSM SCREENSHOT

MESSAGING SEARCH AND MANAGEMENT APPARATUSES, METHODS AND SYSTEMS

PRIORITY CLAIM

This application is a continuation-in-part of and claims priority under 35 U.S.C. § 120 to U.S. application Ser. No. 15/604,584, filed May 24, 2017, titled "Messaging Search and Management Apparatuses, Methods and Systems,", which in turn claims priority under 35 U.S.C. § 119 to U.S. provisional patent applications: Ser. No. 62/408,670, filed Oct. 14, 2016, entitled "Messaging Search and Management Apparatuses, Methods and Systems,", and Ser. No. 62/500,451, filed May 2, 2017, entitled "Messaging Search and Management Apparatuses, Methods and Systems,". This application, also, is a continuation-in-part of and claims priority under 35 U.S.C. § 120 to U.S. application Ser. No. 15/604,589 titled "Messaging Search and Management Apparatuses, Methods and Systems," filed on May 24, 2017, which in turn claims priority under 35 U.S.C. § 119 to U.S. provisional patent application: Ser. No. 62/408,670, filed Oct. 14, 2016, entitled "Messaging Search and Management Apparatuses, Methods and Systems,", and Ser. No. 62/500,451, filed May 2, 2017, entitled "Messaging Search and Management Apparatuses, Methods and Systems,".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address internet messaging, and more particularly, include Messaging Search and Management Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

The internet allows for various communication forms such as email, file transfer protocols, and messaging. Various types of messaging exist including Internet Relay Chat, AOL Instant Messenger, Apple's iMessage, all of which allow users to send and receive textual messages.

BRIEF DESCRIPTION OF THE DRAWINGS

Appendices and/or drawings illustrating various, non-limiting, example, innovative aspects of the Messaging Search and Management Apparatuses, Methods and Systems (hereinafter "MSM") disclosure, include:

FIG. 10 shows a screenshot diagram illustrating embodiments of the MSM;

FIG. 18 shows a screenshot diagram illustrating embodiments of the MSM;

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Messaging Search and Management Apparatuses, Methods and Systems (hereinafter "MSM") transforms message, ranking request inputs, via MSM components (e.g., MD, WGG, MLSG, RD, etc. components), into work graphs, ML structure input data, ML structure, ranking response outputs. The MSM components, in various embodiments, implement advantageous features as set forth below.

INTRODUCTION

The MSM may generate and associate metadata with messages to facilitate more facets of searching. In one implementation, a facet is a structured metadata field you can attach to a document in a search index and filter over. The MSM may utilize message metadata to generate work graphs that capture relationships between users, between users and channels, between users and topics, between channels and topics, between channels, between topics, and/or the like. Work graph data may be used as machine learning (ML) structure inputs for training and/or utilizing ML structures (e.g., logistic regressions, neural networks, etc.). The MSM may utilize message metadata and/or ML structures to rank messages, people, channels, and/or the like for a variety of applications. For example, such applications may include determining relevant messages, conversations, files, people (e.g., experts who can answer a question), channels (e.g., where a question may be answered), and/or the like in response to a user's search query; generating a recap of a channel; ranking the most important messages to read across every channel; suggesting channels to join, leave, star, and/or the like; providing a push notification of a specified number of the most important messages for a user for the day.

MSM

Figure 1:
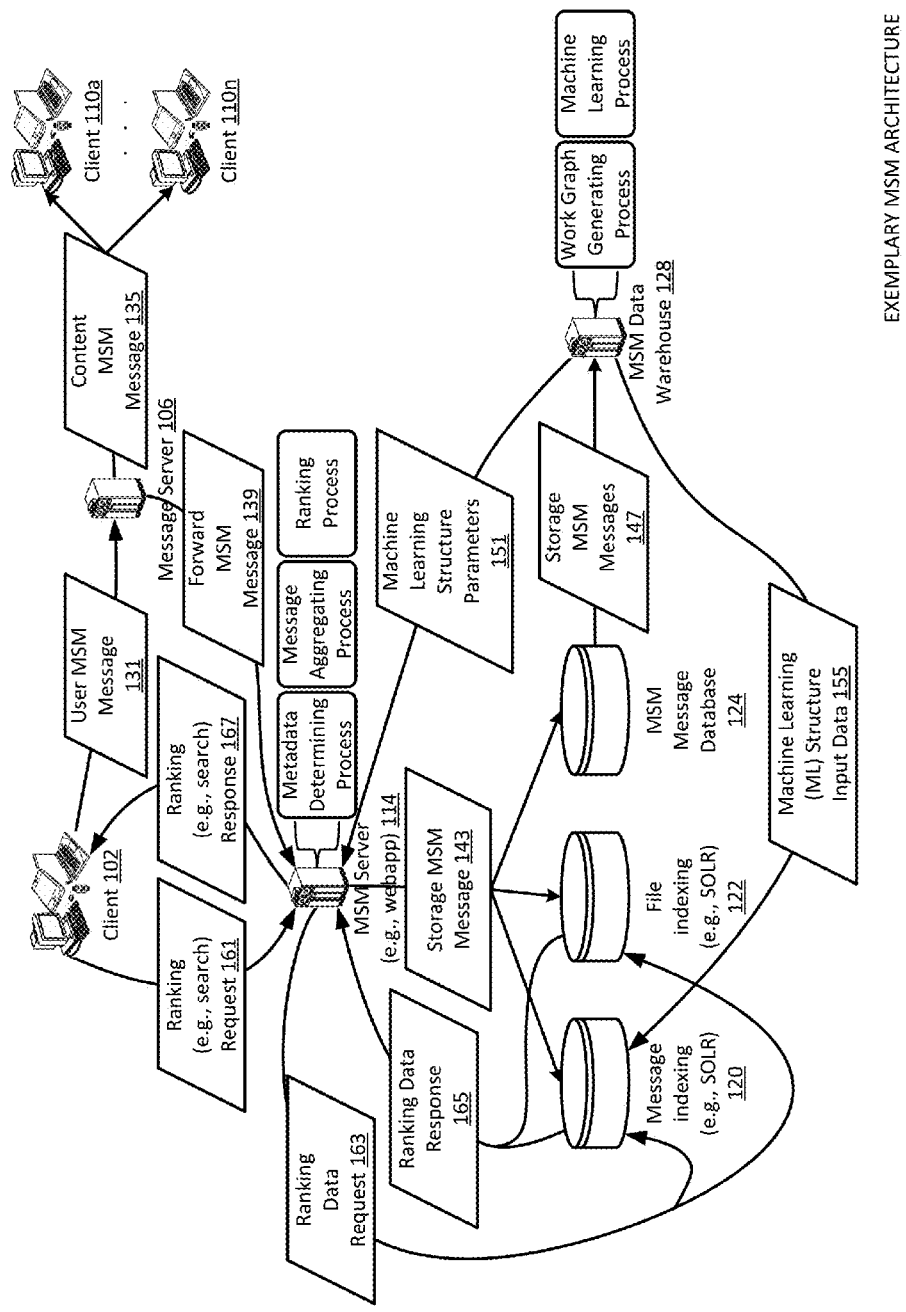
FIG. 1 shows an exemplary architecture for the MSM.

FIG. 1 shows an exemplary architecture for the MSM. In FIG. 1, a user may utilize a client 102 to send a user MSM message 131 (e.g., a chat message sent to a channel). In one embodiment, a MSM message is a message that includes metadata that describes message context and/or facilitates access control. In various implementations, a MSM message may include text, emojis, images, links, files, and/or the like. A message server 106 may obtain the message and send a content MSM message 135 to other users, who are authorized recipients of the message (e.g., other users on the user's team who joined the channel), utilizing clients 110a-110n. The content MSM message may facilitate displaying the content of the user's message to the other users. The message server may also send a forward MSM message 139 to a MSM server 114. The forward MSM message may facilitate analyzing the user's message for indexing, work graph generation, ML, ranking, and/or the like purposes.

The MSM server may include a variety of modules to analyze MSM messages. In one implementation, such modules may include a metadata determining process (e.g., to determine and/or facilitate indexing of message contents and/or metadata), a message aggregating process (e.g., to collect and/or forward messages for further analysis), a ranking process (e.g., to facilitate ranking for a variety of applications), and/or the like. The MSM server may facilitate indexing message contents and/or metadata (e.g., team, channel, user, topics, responses, files, third party metadata) in message indexing 120. If the user attached a file to the message, the MSM server may facilitate indexing file contents in file indexing 122. The MSM server may facilitate storing the storage MSM message 143 in a MSM message database 124. The MSM message database may periodically (e.g., nightly, hourly) forward newly received storage MSM messages 147 to a MSM data warehouse 128.

The MSM data warehouse may include a variety of modules to analyze MSM messages and/or other data. In one implementation, such modules may include a work graph generating process (e.g., to generate work graphs (e.g., ML structure input data such as a channel's priority for the user)), a machine learning process (e.g., to generate other ML structure input data (e.g., team-level term priority), to generate ML structures (e.g., team-level neural networks)), and/or the like. For example, the MSM data warehouse may utilize tools such as Apache Hive, Presto, Apache Spark, and/or the like to facilitate analyzing MSM messages and/or other data. The MSM data warehouse may send ML structure parameters 151 (e.g., parameters that define a neural network) to the MSM server for use in ranking. The MSM data warehouse may facilitate indexing generated ML structure input data 155 (e.g., in message indexing).

The user may utilize the client 102 to send a ranking request 161 to the MSM server. For example, the ranking request may be a search request that includes a search term (e.g., "patents") specified by the user. The MSM server may send a ranking data request 163 to message indexing and/or file indexing to obtain relevant messages and/or files associated with the search. The ranking data request may also specify ML structure input data to obtain for ML structure(s) (e.g., different ML structures may be used for different types (e.g., messages, people, channels) of responses to the search request) utilized for ranking (e.g., for the user's team). A ranking data response 165 may provide the requested relevant messages, relevant files, ML structure input data, and/or the like to the MSM server. The MSM server may utilize ML structure(s) to rank the relevant messages and/or files, people, channels, and/or the like using ML structure input data. The MSM server may send a ranking response 167 to provide the highest ranked messages, files, people, channels, and/or the like to the user.

Figure 2:
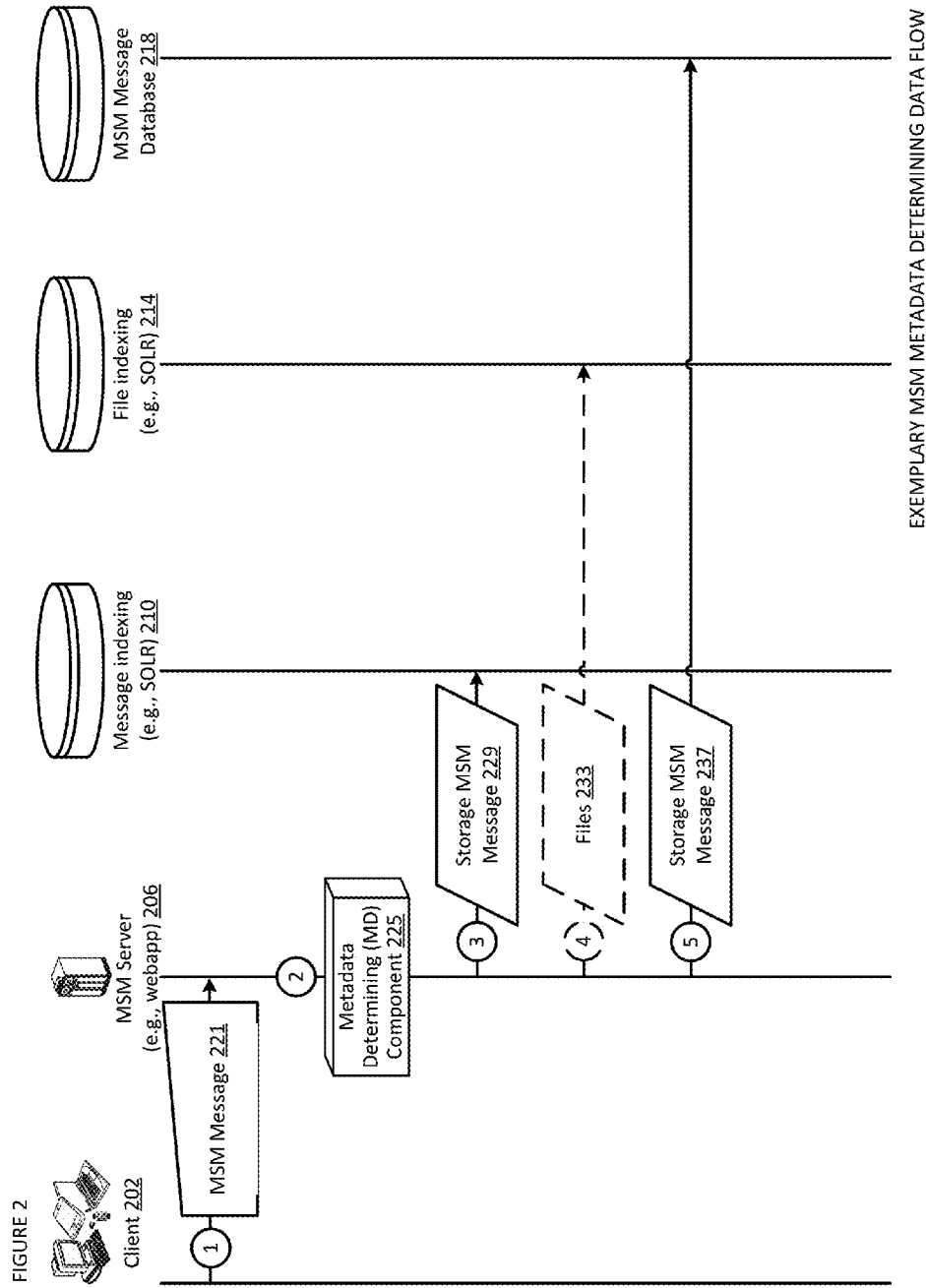
FIG. 2 shows a datagraph diagram illustrating embodiments of a metadata determining data flow for the MSM.

FIG. 2 shows a datagraph diagram illustrating embodiments of a metadata determining data flow for the MSM. In FIG. 2, dashed lines indicate data flow elements that may be more likely to be optional. In FIG. 2, a client 202 may send a MSM message 221 to a MSM server 206. In various implementations, the message may be sent to the MSM server directly by the client, the message may be sent to the MSM server via an intermediary such as a message server, and/or the like. For example, the client may be a desktop, a laptop, a tablet, a smartphone, and/or the like that is executing a client application (e.g., a workgroup chat app). In one implementation, the message may include data such as a message identifier, user account details, a team identifier, a channel identifier, contents (e.g., text, emojis, images, links), attachments (e.g., files), message hierarchy data (e.g., the message may be a reply to another message), third party metadata, and/or the like. In one embodiment, the client may provide the following example message, substantially in the form of a (Secure) Hypertext Transfer Protocol ("HTTP(S)") POST message including eXtensible Markup Language ("XML") formatted data, as provided below:

POST/authrequest.php HTTP/1.1
Host: www.server.com
Content-Type: Application/XML
Content-Length: 667
<?XML version="1.0" encoding="UTF-8"?>
<auth_request>
<timestamp>2020-12-31 23:59:59</timestamp>
<user_accounts_details>
  <user_account_credentials>

```
<user_name>ID_user_1</user_name>
<password>abc123</password>
//OPTIONAL <cookie>cookieID</cookie>
//OPTIONAL
    <digital_cert_link>www.mydigitalcertificate.
    com/JohnDoeDaDoeDoe@gmail.com/mycertif-
    cate.dc</digital_cert_link>
//OPTIONAL  <digital_certificate>_DATA_</digi-
    tal_certificate>
</user_account_credentials>
</user_accounts_details>
<client_details>//iOS Client with App and Webkit
    //it should be noted that although several client details
    //sections are provided to show example variants of
        client
    //sources, further messages will include only on to save
    //space
<client_IP>10.0.0.123</client_IP>
<user_agent_string>Mozilla/5.0 (iPhone; CPU iPhone
    OS 7_1_1 like Mac OS X) AppleWebKit/537.51.2
    (KHTML, like Gecko) Version/7.0 Mobile/11D201
    Safari/9537.53</user_agent_string>
<client_product_type>iPhone6,1</client_product_type>
<client_serial_number>DNXXX1X1XXXX</client_se-
    rial_number>
<client_UDID>3XXXXXXXXXXXXXXXXXX-
    XXXXXD</client_UDID>
<client_OS>iOS</client_OS>
<client_OS_version>7.1.1</client_OS_version>
<client_app_type>app with webkit</client_app_type>
<app_installed_flag>true</app_installed_flag>
<app_name>MSM.app</app_name>
<app_version>1.0</app_version>
<app_webkit_name>Mobile       Safari</client_webkit-
    _name>
<client_version>537.51.2</client_version>
</client_details>
<client_details>//iOS Client with Webbrowser
<client_IP>10.0.0.123</client_IP>
<user_agent_string>Mozilla/5.0 (iPhone; CPU iPhone
    OS 7_1_1 like Mac OS X) AppleWebKit/537.51.2
    (KHTML, like Gecko) Version/7.0 Mobile/11D201
    Safari/9537.53</user_agent_string>
<client_product_type>iPhone6,1</client_product_type>
<client_serial_number>DNXXX1X1XXXX</client_se-
    rial_number>
<client_UDID>3XXXXXXXXXXXXXXXXXX-
    XXXD</client_UDID>
<client_OS>iOS</client_OS>
<client_OS_version>7.1.1</client_OS_version>
<client_app_type>web browser</client_app_type>
<client_name>Mobile Safari</client_name>
<client_version>9537.53</client_version>
</client_details>
<client_details>//Android Client with Webbrowser
<client_IP>10.0.0.123</client_IP>
<user_agent_string>Mozilla/5.0 (Linux; U; Android
    4.0.4; en-us; Nexus S Build/IMM76D) AppleWebKit/
    534.30 (KHTML, like Gecko) Version/4.0 Mobile
    Safari/534.30</user_agent_string>
<client_product_type>Nexus S</client_product_type>
<client_serial_number>YXXXXXXXXZ</client_serial-
    _number>
<client_UDID>FXXXXXXXXX-XXXX-XXXX-
    XXXX-XXXXXXXXXXXX</client_UDID>
<client_OS>Android</client_OS>
<client_OS_version>4.0.4</client_OS_version>
<client_app_type>web browser</client_app_type>
<client_name>Mobile Safari</client_name>
<client_version>534.30</client_version>
</client_details>
<client_details>//Mac Desktop with Webbrowser
<client_IP>10.0.0.123</client_IP>
<user_agent_string>Mozilla/5.0 (Macintosh; Intel Mac
    OS X 10_9_3) AppleWebKit/537.75.14 (KHTML, like
    Gecko)   Version/7.0.3   Safari/537.75.14</user_
    agent_string>
<client_product_type>MacPro5,1</client_product_type>
<client_serial_number>YXXXXXXXXZ</client_
    serial_number>
<client_UDID>FXXXXXXXXX-XXXX-XXXX-
    XXXX-XXXXXXXXXXXX</client_UDID>
<client_OS>Mac OS X</client_OS>
<client_OS_version>10.9.3</client_OS_version>
<client_app_type>web browser</client_app_type>
<client_name>Mobile Safari</client_name>
<client_version>537.75.14</client_version>
</client_details>
<message>
<message_identifier>ID_message_10</message_identi-
    fier>
<team_identifier>ID_team_1</team_identifier>
<channel_identifier>ID_channel_1</channel_identifier>
<contents>That is an interesting invention. I have
    attached a copy our patent policy.</contents>
<attachments>patent_policy.pdf</attachments>
</message>
</auth_request>
```

In another embodiment, the client may provide the following example message, substantially in the form of a JSON message:

```
{
    "text": "That is an interesting invention. I have attached a copy our
patent policy.",
    "attachments": [
        {
            "title": "Patent Policy",
            "title_link": "patent_policy.pdf",
            "fields": [
                {
                    "title": "Part",
                    "value": "1",
                    "short": true
                },
                {
                    "title": "Version",
                    "value": "3",
                    "short": true
                }
            ],
            "author_name": "Patent Counsel",
            "author_icon": "http://a.slack-edge.com/7f18https://a.slack-
edge.com/img/patent_counsel.png",
            "image_url": "http://i.imgur.com/patent_policy.jpg"
        },
        {
            "title": "Synopsis",
            "text": "The latest version of the Patent Policy updated by
@patent_counsel"
        },
        {
            "fallback": "Is this document helpful?",
            "title": "Is this document helpful?",
            "callback_id": "pp_1234_xyz",
            "color": "#3AA3E3",
            "attachment_type": "default",
            "actions": [
                {
```

```
        "name": "yes",
        "text": "Yes",
        "type": "button",
        "value": "good"
      },
      {
        "name": "no",
        "text": "No",
        "type": "button",
        "value": "bad"
      }
    ]
  }
]
}
```

A metadata determining (MD) component 225 may be used to analyze the MSM message sent to the MSM server to facilitate message indexing, file indexing, message storage, and/or the like. See FIG. 3 for additional details regarding the MD component.

The MSM server may send a storage MSM message 229 to message indexing 210 to facilitate message indexing. In one implementation, the storage MSM message may include data such as a message identifier, a team identifier, a channel identifier, a sending user identifier, topics, responses, contents, attachments, message hierarchy data, third party metadata, conversation primitive data, and/or the like. For example, the MSM server may provide the following example storage MSM message, substantially in the form of a HTTP(S) POST message including XML-formatted data, as provided below:

```
POST/storage_message.php HTTP/1.1
Host: www.server.com
Content-Type: Application/XML
Content-Length: 667
<?XML version="1.0" encoding="UTF-8"?>
<storage_message>
  <message_identifier>ID_message_10</message_identifier>
  <team_identifier>ID_team_1</team_identifier>
  <channel_identifier>ID_channel_1</channel_identifier>
  <sending_user_identifier>ID_user_1</sending_user_identifier>
  <topics>
    <topic>inventions</topic>
    <topic>patents</topic>
    <topic>policies</topic>
  </topics>
  <responses>
    <response>liked by ID_user_2</response>
    <response>starred by ID_user_3</response>
  </responses>
  <contents>That is an interesting invention. I have attached a copy our patent policy.</contents>
  <attachments>patent_policy.pdf</attachments>
  <conversation_primitive>
    conversation includes messages: ID_message_8, ID_message_9, ID_message_10, ID_message_11, ID_message_12
  </conversation_primitive>
</storage_message>
```

The MSM server may send files 233 to file indexing 214 to facilitate file indexing. In one implementation, files 233 may include file contents of attachments associated with the MSM message. The MSM server may send a storage MSM message 237 to a MSM message database 218 to facilitate message storage.

Figure 3:
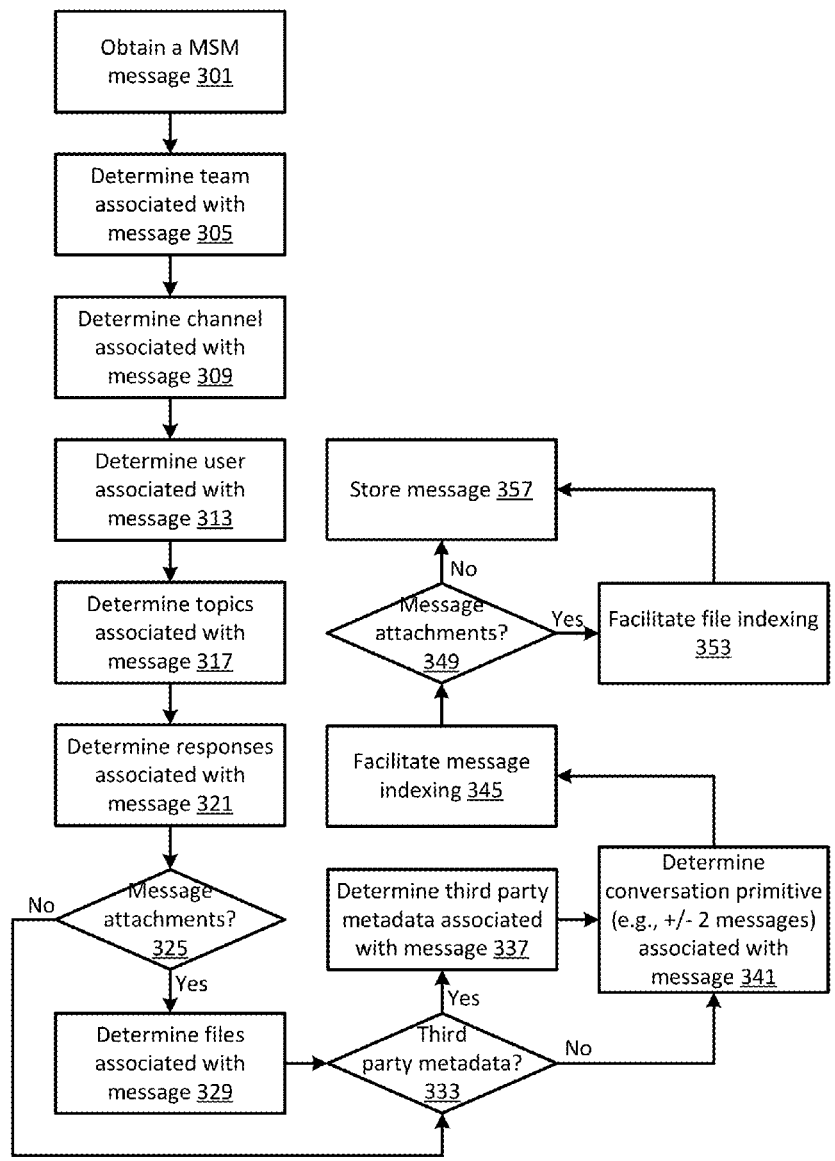
FIG. 3 shows a logic flow diagram illustrating embodiments of a metadata determining (MD) component for the MSM.

FIG. 3 shows a logic flow diagram illustrating embodiments of a metadata determining (MD) component for the MSM. In FIG. 3, a MSM message may be obtained at 301. For example, a user's MSM message may be obtained for analysis.

A team associated with the message may be determined at 305. In one embodiment, MSM users may be organized into organization groups (e.g., employees of each company may be a separate organization group) and each organization group may have one or more team groups (teams) to which users may be assigned or which the users may join (e.g., teams may represent departments, geographic locations such as offices, product lines, and/or the like). See FIG. 10 for additional details regarding teams. In one implementation, the message may be parsed (e.g., using PHP commands) to determine a team identifier of the team associated with the message. For example, the team identifier may be used to facilitate access control for the message (e.g., access to the message, such as during searches, may be restricted to users who are part of the team). In another example, the team identifier may be used to determine context for the message (e.g., a description of the team, such as the name of a department (e.g., engineering, accounting, legal), may be associated with the team identifier).

A channel associated with the message may be determined at 309. In one embodiment, MSM users may join channels (e.g., chat rooms that they find interesting). For example, some channels may be globally accessible to anyone in the company. In another example, access to some channels may be restricted to members of specified teams. See FIG. 11 for additional details regarding channels. In one implementation, the message may be parsed (e.g., using PHP commands) to determine a channel identifier of the channel where the message was posted. For example, the channel identifier may be used to facilitate access control for the message (e.g., access to the message, such as during searches, may be restricted to users who joined the channel or who are allowed to join the channel). In another example, the channel identifier may be used to determine context for the message (e.g., a description of the channel, such as a description of a project discussed in the channel, may be associated with the channel identifier).

A user associated with the message may be determined at 313. In one implementation, the message may be parsed (e.g., using PHP commands) to determine a user identifier of the user who sent the message. For example, a user (or a channel) may be thought of as a collection of messages associated with (e.g., sent) the user (or the channel). These messages may be analyzed to determine context regarding the user (e.g., the user's expertise in a topic may be determined based on the frequency of mention of the topic by the user).

Topics associated with the message may be determined at 317. In one implementation, the message may be parsed (e.g., using PHP commands) to determine topics discussed in the message. For example, hashtags in the message may indicate topics associated with the message. In another example, the message may be analyzed (e.g., by itself, with other messages in a conversation primitive) using a machine learning technique, such as topic modeling, to determine topics associated with the message.

Responses associated with the message may be determined at 321. For example, responses to the message by other users may include reactions (e.g., emoji, liking), clicking on a link in the message, replying to the message, downloading a file associated with the message, sharing the message from one channel to another channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10;

For example, data regarding responses to the message may be analyzed to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

A determination may be made at 325 whether attachments are included with the message. In various implementations, attachments may include files attached to the message, links (e.g., to webpages) in the message, files from third part providers (e g, links to G Suite files, links to Dropbox files), and/or the like. If there are attachments, files associated with the message may be determined at 329. In one implementation, the message may be parsed (e.g., using PHP commands) to determine file names, link addresses, and/or the like of the attachments. For example, file contents (e.g., contents of the attached files, contents of webpages, contents of Dropbox files obtained with permission from the user using the user's authentication information) may be analyzed to determine context for the message (e.g., a patent policy document may indicate that the message is associated with the topic "patents").

A determination may be made at 333 whether third party metadata is associated with the message. For example, third party metadata may provide additional context regarding the message or the user that is specific to a company, team, channel, and/or the like. If there is third party metadata associated with the message, such metadata may be determined at 337. In one implementation, the message may be parsed (e.g., using PHP commands) to determine third party metadata. For example, third party metadata may indicate whether the user who sent the message is an authorized representative of the channel (e.g., an authorized representative may be authorized by the company to respond to questions in the channel).

A conversation primitive associated with the message may be determined at 341. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

Message indexing of the message may be facilitated at 345. For example, various metadata, determined as described above, and/or the contents of the message may be used to index the message (e.g., using the conversation primitive) to facilitate various facets of searching. In one implementation, a storage MSM message may be sent from MSM server 206 to message indexing (e.g., SOLR) 210 to facilitate indexing. In another implementation, metadata associated with the message may be determined and the message may be indexed by message indexing 210. In one embodiment, the message may be indexed such that a company's or a team's messages are indexed separately (e.g., in a separate index associated with the team and/or company that is not shared with other teams and/or companies). In one implementation, messages may be indexed at a separate distributed machine (e.g., to facilitate data isolation for security purposes).

A determination may be made at 349 whether attachments are included with the message. If there are attachments, file indexing of the files associated with the message may be facilitated at 353. For example, file contents of the associated files (e.g., attached files, linked webpages, files from third part providers) may be used to index such files to facilitate searching. In one implementation, the associated files may be sent to file indexing (e.g., SOLR) 214. In one embodiment, the files may be indexed such that a company's or a team's files are indexed at a separate distributed machine.

The message may be stored at 357. In one implementation, a storage MSM message may be sent from MSM server 206 to MSM message database 218 to facilitate message storage. For example, the stored message may be utilized for further analysis by other components of the MSM.

Figure 4:
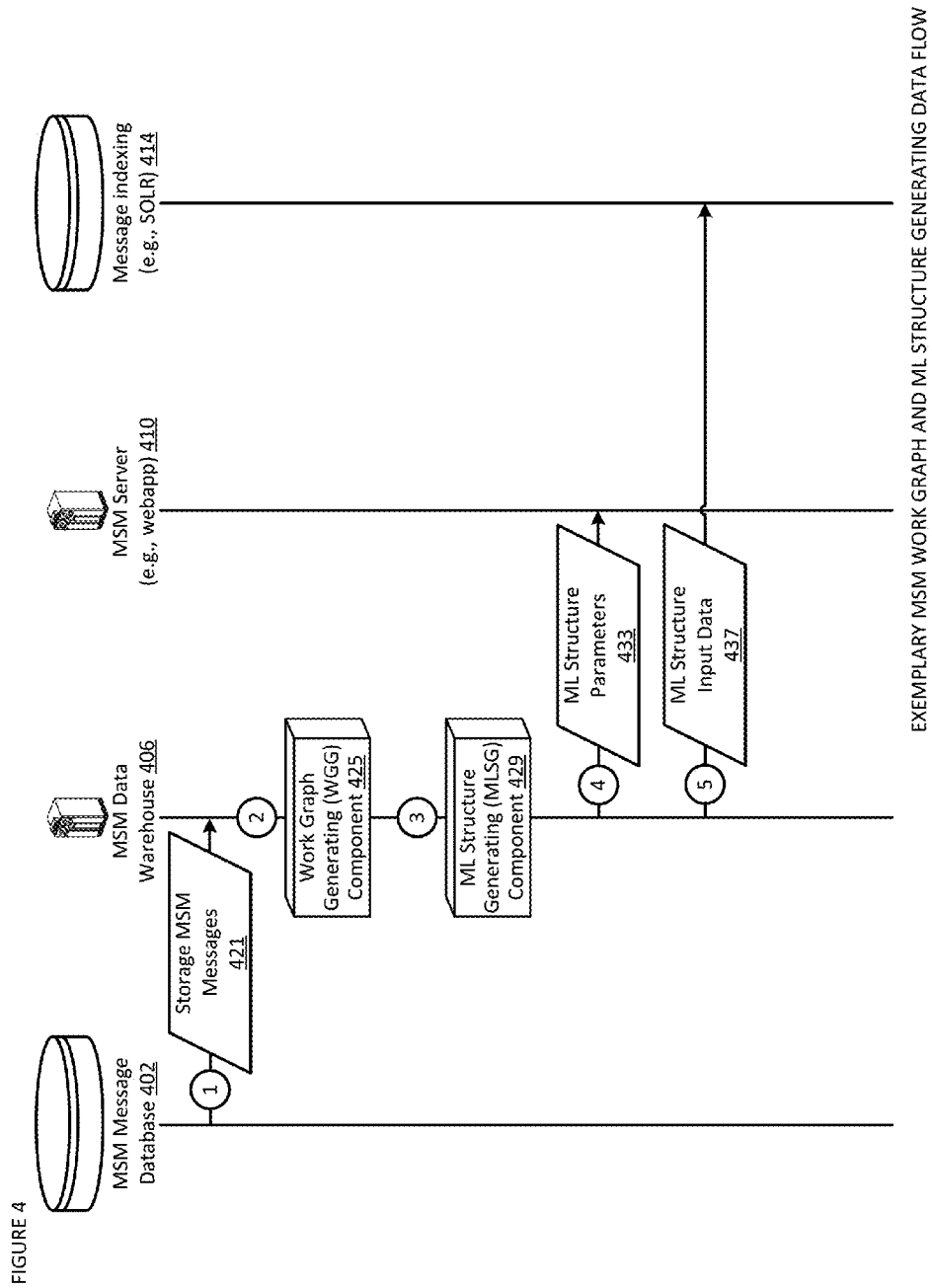
FIG. 4 shows a datagraph diagram illustrating embodiments of a work graph and machine learning (ML) structure generating data flow for the MSM.

FIG. 4 shows a datagraph diagram illustrating embodiments of a work graph and ML structure generating data flow for the MSM. In FIG. 4, a MSM message database 402 may send storage MSM messages 421 to a MSM data warehouse 406. For example, the MSM message database may periodically (e.g., nightly, hourly) forward newly received storage MSM messages to the MSM data warehouse for analysis.

A work graph generating (WGG) component 425 may utilize MSM messages (e.g., newly received MSM messages and/or MSM messages already stored in the MSM data warehouse) to generate a work graph (e.g., for a team associated with the MSM messages). In one embodiment, a work graph may capture relationships between users, between users and channels, between users and topics, between channels and topics, between channels, between topics, and/or the like (e.g., relationships that are specific to the team). See FIG. 5 for additional details regarding the WGG component.

Figure 7:
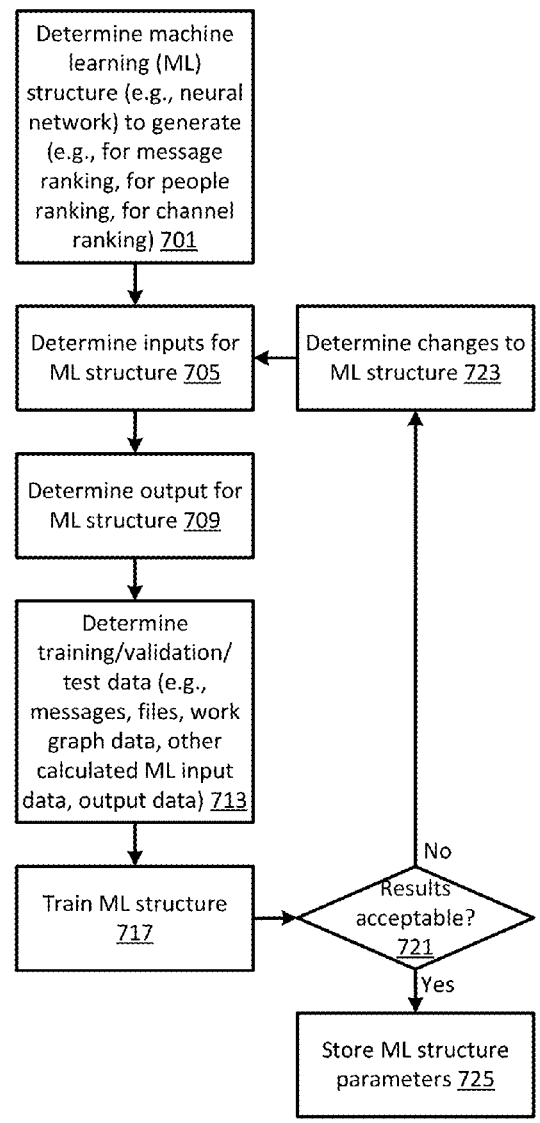
FIG. 7 shows a logic flow diagram illustrating embodiments of a ML structure generating (MLSG) component for the MSM.

A ML structure generating (MLSG) component 429 may utilize MSM messages, work graph data, other ML structure input data, and/or the like to generate ML structure input data (e.g., team-level term priority), ML structures (e.g., team-level neural networks), and/or the like to facilitate ranking See FIG. 7 for additional details regarding the MLSG component.

The MSM data warehouse may send ML structure parameters 433 (e.g., parameters that define a ML structure such as a neural network) to a MSM server 410. For example, the MSM server may utilize the ML structure for ranking (e.g., for the team). In one implementation, ML structure parameters may include data such as a ML structure identifier, ML structure team identifier, ML structure application, ML structure type, ML structure inputs, ML structure output, ML structure parameters data (e.g., data that defines the neural network), and/or the like. For example, the MSM data warehouse may provide the following example ML structure parameters, substantially in the form of a HTTP(S) POST message including XML-formatted data, as provided below:

```
POST/ML_structure_parameters.php HTTP/1.1
Host: www.server.com
Content-Type: Application/XML
Content-Length: 667
<?XML version="1.0" encoding="UTF-8"?>
<ML_structure_parameters>
    <ML_structure_identifier>ID_ML_structure_
        1</ML_structure_identifier>
    <ML_structure_team_identifier>ID_team 1</ML_struc-
        ture_team_identifier>
    <ML_structure_application>ranking of messages</ML_
        structure_application>
    <ML_structure_type>neural network</ML_structure_
        type>
    <ML_structure_inputs>
        user priority, user authority, channel priority, topic
            priority, message text,
        reactions, team-level term priority, team-level term
            frequency, user's click through rate for channel
    </ML_structure_inputs>
    <ML_structure_output>message rank score</ML_struc-
        ture_output>
    <ML_structure_parameters_data>binary data defining the
        ML structure</ML_structure_parameters_data>
</ML_structure_parameters>
```

The MSM data warehouse may send (e.g., in XML format) ML structure input data 437 (e.g., work graph data) to message indexing 414. For example, the MSM server may obtain ML structure input data and utilize the ML structure input data for ranking (e.g., for the team). In one implementation, ML structure input data may include data such as a ML structure input identifier, ML structure input team identifier, ML structure input name, ML structure input type, ML structure input data, and/or the like. For example, the MSM data warehouse may provide the following example ML structure input data, substantially in the form of a HTTP(S) POST message including XML-formatted data, as provided below:

```
POST /ML_structure_input_data.php HTTP/1.1
Host: www.server.com
Content-Type: Application/XML
Content-Length: 667
<?XML version = "1.0" encoding = "UTF-8"?>
<ML_structure_input_data>
    <ML_structure_input_identifier>ID_ML_structure_input_1
    </ML_structure_input_identifier>
    <ML_structure_input_team_identifier>ID_team_1
    </ML_structure_input_team_identifier>
    <ML_structure_input_name>user priority</ML_structure_input_name>
    <ML_structure_input_data>
        <user>
            <user_identifier>ID_user_1</user_identifier>
            <other_users_priorities>
                <user>
                    <user_identifier>ID_user_2</user_identifier>
                    <priority>0.7</priority>
                </user>
                <user>
                    <user_identifier>ID_user_3</user_identifier>
                    <priority>0.3</priority>
                </user>
                ...
            </other_users_priorities>
        </user>
        <user>
            <user_identifier>ID_user_2</user_identifier>
            <other_users_priorities>
                <user>
                    <user_identifier>ID_user_1</user_identifier>
                    <priority>0.2</priority>
                </user>
                <user>
                    <user_identifier>ID_user_3</user_identifier>
                    <priority>0.5</priority>
                </user>
                ...
            </other_users_priorities>
        </user>
        ...
    </ML_structure_input_data>
</ML_structure_input_data>
```

Figure 5:
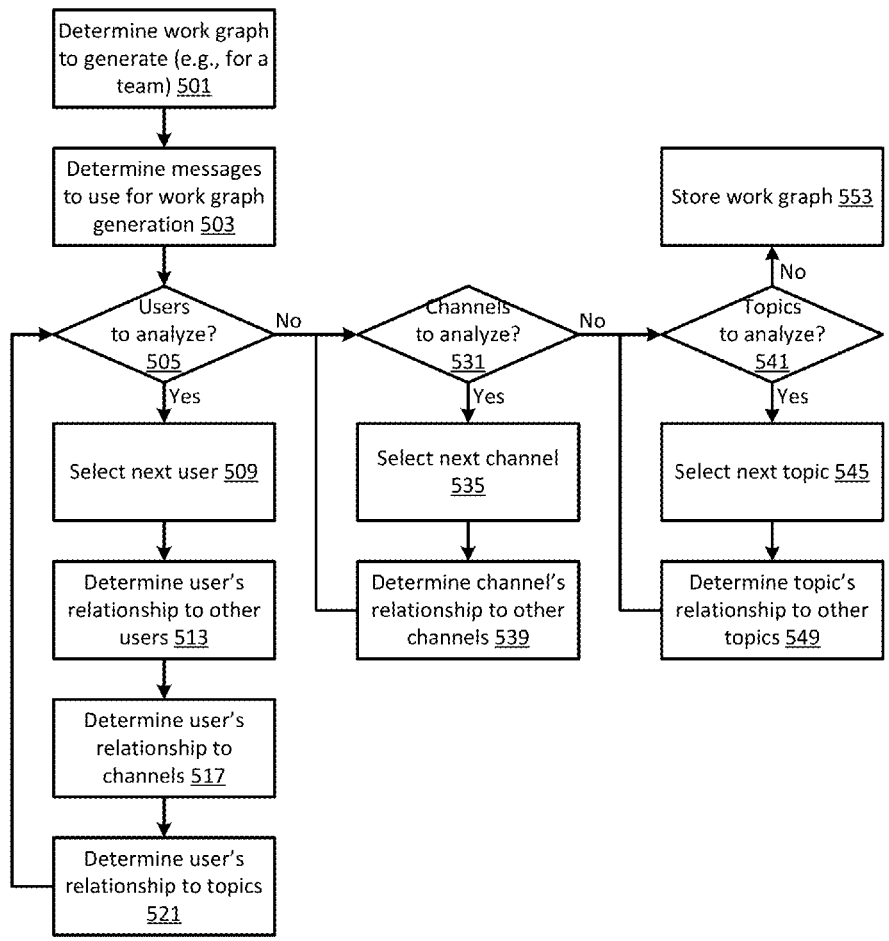
FIG. 5 shows a logic flow diagram illustrating embodiments of a work graph generating (WGG) component for the MSM.

FIG. 5 shows a logic flow diagram illustrating embodiments of a work graph generating (WGG) component for the MSM. In FIG. 5, a work graph to generate may be determined at 501. In one implementation, a team identifier may be provided that indicates a team for which to generate the work graph. For example, work graphs may be generated periodically by a work graph generating process and the work graph generating process may specify the team identifier. In another implementation, the work graph may be generated for a company (e.g., the company may have multiple teams).

MSM messages to use for work graph generation may be determined at 503. In one implementation, messages from channels accessible by the team may be used (e.g., messages sent and/or received by members of the team, messages sent and/or received by anyone with access to the channel). In another implementation, messages from channels associated with the company may be used. In yet another implementation, direct messages (e.g., messages sent by users directly to each other instead of through channels) may also be used. In some embodiments, messages to use may be filtered, such as based on date (e.g., use messages sent and/or received within the last year).

A determination may be made at 505 whether there remain users to analyze. In one implementation, any user on the team may be analyzed. In another implementation, any user in the company may be analyzed. If there remain users to analyze, the next user to analyze may be selected at 509.

The user's relationship to other users may be determined at 513. In one implementation, user to user data such as how many messages from another user the user read, how many messages of another user the user reacted to, how many direct messages the user sent to another user, how many channels the user and another user joined in common, and/or the like may be used to calculate a user priority (e.g., a user priority score) of another user to the user. For example, a weighted average of user to user data may be calculated for each of the other users from the perspective of the user, and the resulting scores normalized so that each of the other users is assigned a user priority score (e.g., in the 0 to 1 range) from the perspective of the user. In another example, a ML technique (e.g., a neural network) may be used to calculate a user priority score for each of the other users from the perspective of the user.

The user's relationship to channels may be determined at 517. In one implementation, user to channel data such as whether the user joined a channel, how many messages the user sent in the channel, how many messages the user read in the channel, how often the user checks the channel, whether the user starred the channel, how similar the channel is to other channels the user participates in, and/or the like may be used to calculate a channel priority (e.g., a channel priority score) of the channel to the user. For example, a weighted average of user to channel data may be calculated for each channel (e.g., each channel accessible to the team, each channel accessible to the company), and the resulting scores normalized so that each of the channels is assigned a channel priority score (e.g., in the 0 to 1 range) from the perspective of the user. In another example, a ML technique (e.g., a neural network) may be used to calculate a channel priority score for each of the channels from the perspective of the user.

The user's relationship to topics may be determined at 521. In one implementation, user to topic data such as how many messages the user sent regarding a topic, how many messages the user read regarding the topic, how many reactions to the user's messages regarding the topic have been received, how many times files regarding the topic that were attached to the user's messages have been downloaded by other users, how many times files regarding the topic have been downloaded by the user, and/or the like may be used to calculate a topic priority (e.g., a topic priority score) of the topic to the user. For example, a weighted average of user to topic data may be calculated for each topic (e.g., each topic discussed by the team, each topic discussed at the company), and the resulting scores normalized so that each of the topics is assigned a topic priority score (e.g., in the 0 to 1 range) from the perspective of the user. In another example, a ML technique (e.g., a neural network) may be used to calculate a topic priority score for each of the topics from the perspective of the user.

In another implementation, a statistical method (e.g., tf-idf, BM25) may be used to calculate a topic expertise score of the user with regard to each topic. For example, each user-channel pair (e.g., a user-channel pair may be thought of as a collection of messages (e.g., a document) associated with the user and a respective channel (e.g., sent by the user in the respective channel)) may be ranked using BM25 (e.g., each such document may be ranked) with regard to each topic to determine for each respective topic whether the user is an expert who discussed the respective topic in the respective channel In some embodiments, the user's messages may be weighted by recency. In some embodiments, synonyms and/or bigrams may be used when determining whether the user discussed a topic. In one implementation, the following technique may be used to calculate term frequency (tf):

Calculating Tf
case class TermFrequency(key: UserChannel, tf: Int, weightedTF: Double) tf: RDD[(String, Seq[UserTermFrequency])]
For each message:
Weight=6 months/(6 months+message age)
Emit (word, (author-channel, weight)) tuples for each word in the message
Do not count @-mentions as words
Use external ID to capture content in shared channels
Also emit (word, (mentionee-channel, weight)) tuples for each @-mention in the message
Reduce by key and create a TermFrequency per key
Sort the list by decreasing weightedTF, truncate to top 50
Also emit bigrams
Alterntively: index context messages too
Alterntively: weight tf by some measure of importance reply_count, reaction count Data cleaning & df
df: RDD[(String, Double)]=tf.mapValues(_.size)
totalTF: RDD[(String, Double)]=tf.mapValues(_.map(_.tf).sum)
Look at the distribution of words by
% of documents (users) with that term
Total occurrences of the term
Discard very common terms (where df>70%)
Discard very rare terms (where total term frequency is <5)
Doc Norms
docNorm: RDD[(String, Double)]=1/Math.sqrt(# of tokens in this document)

A determination may be made at 531 whether there remain channels to analyze. In one implementation, any channel accessible to the team may be analyzed. In another implementation, any channel accessible to the company may be analyzed. If there remain channels to analyze, the next channel to analyze may be selected at 535.

The channel's relationship to other channels may be determined at 539. In one implementation, channel to channel data such as how many users the channel and another channel have in common, similarity of topics discussed in the channel and another channel (e.g., based on channel descriptions of these channels, based on topics of messages sent in these channels), and/or the like may be used to calculate a channel similarity (e.g., a channel similarity score) of another channel to the channel. For example, a weighted average of channel to channel data may be calculated for each of the other channels from the perspective of the channel, and the resulting scores normalized so that each of the other channels is assigned a channel similarity score (e.g., in the 0 to 1 range) from the perspective of the channel. In another example, a ML technique (e.g., a neural network) may be used to calculate a channel similarity score for each of the other channels from the perspective of the channel A determination may be made at 541 whether there remain topics to analyze. In one implementation, any topic discussed by the team may be analyzed. In another implementation, any topic discussed at the company may be analyzed. If there remain topics to analyze, the next topic to analyze may be selected at 545.

The topic's relationship to other topics may be determined at 549. In one implementation, a topic similarity (e.g., a topic similarity score) of a topic to another topic may be calculated. For example, term frequency-inverse document frequency (tf-idf) of each word may be determined (e.g., based on analysis of messages from channels accessible by the team, based on analysis of messages from channels associated with the company), and a topic similarity score may be calculated for each of the other topics from the perspective of the topic based on the number of words that the topic and another topic have in common with each word weighted by tf-idf. In another example, a ML technique (e.g., a neural network) may be used to calculate a topic similarity score for each of the other topics from the perspective of the topic.

Figure 6:
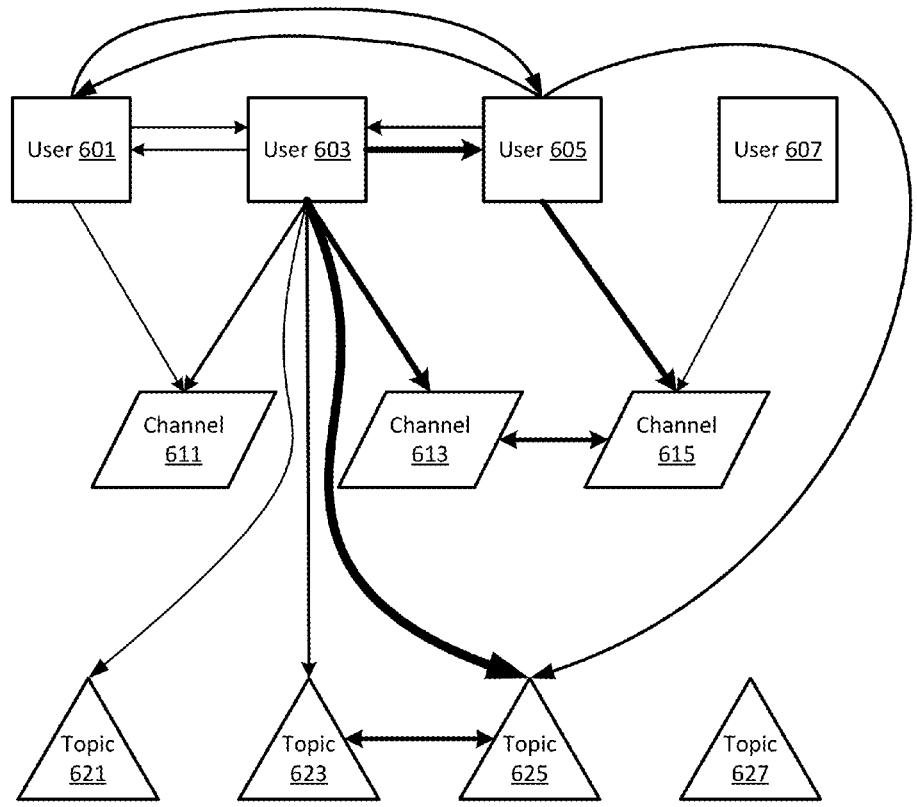
FIG. 6 shows an exemplary work graph for the MSM.

The generated work graph may be stored at 553. In one implementation, the work graph may be stored via a MySQL database command similar to the following:
INSERT INTO WorkGraphs (workGraphID, workGraphTeamID,
workGraphUserData, workGraphChannelData, workGraphTopicData)
VALUES (ID_WorkGraph_1, ID_team_1,
data regarding users, data regarding channels, data regarding topics);

FIG. 6 shows an exemplary work graph for the MSM. In FIG. 6, the work graph example shows relationships between users 601, 603, 605 and 607, channels 611, 613 and 615, and topics 621, 623, 625 and 627. In this work graph example, each arrow indicates a priority relationship (e.g., user priority, channel priority or topic priority) or a similarity relationship (e.g., channel similarity or topic similarity), and the thickness of each arrow indicates the strength (e.g., in the 0 to 1 range) of the relationship (e.g., the thicker the arrow the stronger the relationship). For example, channel priority score of channel 613 (e.g., "engineering—general discussion") is higher than channel priority score of channel 615 (e.g., "legal—general discussion") to user 603 (e.g., the user may be a software developer who joined channel 613 and did not join channel 615). In another example, topic priority score of topic 625 (e.g., "searching") is higher than topic priority score of topic 621 (e.g., "patents") to user 603 (e.g., the user may be a software developer who deals with searching (e.g., the user posts and reads many messages regarding searching) and who may be interested in filing a patent application (e.g., the user downloaded a patent policy file attached to a message from the company's patent counsel)). In one implementation, the absence of an arrow may indicate that the strength of the relationship is below a specified threshold (e.g., 0, below 0.1).

As shown in the work graph example, in one implementation, the strengths of user priority relationships between users may be asymmetric. For example, user priority score of user 605 is higher to user 603 (e.g., user 605 may be a more experienced software developer who answers questions posted by user 603) than user priority sore of user 603 to user 605 (e.g., user 603 may rarely answer questions posted by user 605). In another implementation, the strengths of user priority relationships may be symmetric.

As shown in the work graph example, in one implementation, the strengths of similarity relationships may be symmetric. For example, channel similarity score between channels 613 and 615 may be the same from the perspective of both channels. In another example, topic similarity score between topics 623 and 625 may be the same from the perspective of both topics. In another implementation, the strengths of similarity relationships may be asymmetric.

In some embodiments, work graph data may include multiple dimensions of relationships (e.g., data other than priority relationships and similarity relationships) that may facilitate ranking in a variety of applications. For example, in addition to a topic priority score for topic 625 (e.g., how important this topic is to the user), work graph data for user 603 may include a user authority score for topic 625 (e.g., how much of an expert the user is in this topic). In this example, a high topic priority score may indicate that when the user searches through messages, messages regarding this topic are likely to be relevant to the user (e.g., application—determining relevant messages), while a high user authority score may indicate that when other users search through messages on this topic, the user may be recommended as an expert who may be able to answer questions regarding this topic (e.g., application—determining relevant people).

FIG. 7 shows a logic flow diagram illustrating embodiments of a ML structure generating (MLSG) component for the MSM. In FIG. 7, a ML structure to generate (e.g., a neural network) may be determined at 701. For example, ML approaches such as unsupervised learning, supervised learning, reinforcement learning, deep learning, and/or the like may be used to generate the ML structure (e.g., using a machine learning package such as Spark ML, TensorFlow, etc.). In one implementation, a team identifier may be provided that indicates a team for which to generate the ML structure. For example, ML structures may be generated periodically by a ML process and the ML process may specify the team identifier. In another implementation, the ML structure may be generated for a company (e.g., the company may have multiple teams). In one embodiment, the ML structure may be used for ranking (e.g., for message ranking, people ranking, channel ranking, and/or the like). In another embodiment, the ML structure may be used to generate ML input data (e.g., team-level term priority) that may be used as input to another ML structure (e.g., ML structure use for ranking).

Inputs for the ML structure may be determined at 705. In one implementation, the inputs for the ML structure may be selected from data such as message content, file content, message metadata, work graph data, other generated ML structure input data (e.g., generated via another ML structure (e.g., team-level term priority), calculated via a statistical method such as tf-idf (e.g., team-level term frequency) or BM25), search term, and/or the like. For example, the inputs for the ML structure may be predetermined and may be retrieved via a MySQL database command similar to the following:
SELECT ML_StructureInputs
FROM ML_Structures
WHERE ML_StructureID=ID_ML_structure_1;

Output for the ML structure may be determined at 709. In one implementation, the output for the ML structure may be selected from ranking outputs (e.g., message rank, person rank, channel rank), ML input data outputs, and/or the like. For example, the output for the ML structure may be predetermined and may be retrieved via a MySQL database command similar to the following:
SELECT ML_StructureOutput
FROM ML_Structures
WHERE ML_StructureID=ID_ML_structure_1;

Training, validation, test, and/or the like data may be determined at 713. For example, such data may be used to train one or more candidate ML structures, to compare performances and select the best performing ML structure from the candidate ML structures, to test the predictive strength of the best performing ML structure, and/or the like. In one implementation, data associated with the team that corresponds to the inputs and/or the output of the ML structure may be utilized to select training, validation, test, and/or the like subsets of data. In another implementation, data associated with the company that corresponds to the inputs and/or the output of the ML structure may be utilized to select training, validation, test, and/or the like subsets of data. The ML structure may be trained (e.g., training, selecting the best performing candidate, testing) at 717 using the determined training, validation, test, and/or the like data.

A determination may be made at 721 whether results (e.g., predictive strength) associated with the trained ML structure are acceptable (e.g., is the predictive strength high enough). If the results are not acceptable, changes to the ML structure may be determined at 723. For example, the number and/or types of inputs, the ML approach, the training, validation, test, and/or the like datasets, and/or the like may be changed, and the ML structure may be retrained to attain better results (e.g., higher predictive strength).

If the results are acceptable, ML structure parameters of the ML structure may be stored at 725. For example, the ML structure parameters may define neural network parameters (e.g., interconnections between neurons, weights of the interconnections, activation function for neurons) of a neural network trained by the MLSG component. In various implementations, the ML structure parameters may be stored as binary data, XML, and/or the like. For example, the ML structure parameters may be stored via a MySQL database command similar to the following:

UPDATE ML_Structures
SET ML_StructureParametersData=binary data defining the ML structure
WHERE ML_StructureID=ID_ML_structure_1;

In one embodiment, the MLSG component may be utilized to generate a highlights model. The highlights model may be utilized to assign importance scores for a given user at a given time. For example, the highlights model may be used for features such as in-channel highlights, cross channel briefings, and/or the like.

In one implementation, in order to measure importance (e.g., of messages), the highlights model may utilize engagements as a proxy for importance. As such, a message is considered important if the user is highly likely to engage with it. In other words:

Importance~P(engagement|user, message, time)

In various implementations, one or more engagement types may be tracked and/or utilized for ranking by the highlights model. An exemplary set of engagement types is shown in the table below:

| Engagement Types |
| --- |
| Clicks |
| Reactions |
| Replies |
| File Clicks |
| External Clicks |
| Mentions |
| Shares |
| Stars |
| Implicit Replies |
| Pins |
| Reads |
| Selections |

In one implementation, a ML structure (e.g., a logistic regression classifier) may be generated for each engagement type utilized for ranking. This classifier may be utilized to approximate the probability of a user engaging with a given message at a given time for the given engagement type. For example, for clicks, the classifier may be utilized to approximate:

Output=P(click|user, message, time)

For each classifier, the runtime (e.g., during ranking—see the RD component and FIG. 9) input is a (user, message, time) and the runtime output is a score that should be correlated with the probability of an engagement.

At training time, the input is a list of (user, message, time) tuples with label 1 if an engagement was logged and label 0 otherwise. Since for most engagements there are more negative examples than positive examples, the negative examples may be subsampled for performance and/or quality reasons.

In some implementations, to make sure the model generalizes well to future inputs, the (user, message, time) tuples are expanded into a number of features that should be correlated with the probability of engagements. As well as the input (user, message, time) tuple, the features rely on other (e.g., external) data such as work graph data (e.g., through aggregate signals such as user priority, which models how important a user A is to another user B). For example, features may be properties of the message content, message metadata, message interactions, and/or the like (e.g., some of which may be augmented with properties of the work graph). The table below lists an exemplary set of features that may be used by the classifiers:

| Name | Description |
| --- | --- |
| author_priority | The user priority of the author with respect to the user. |
| user_engagement_count_log_reactions | The number of reactions on the message. |
| engagement_user_priority_reactions | The user priority of the users who reacted to the message with respect to the user. |
| has_file | Whether the message contains a file or not. |
| message_type | The type of the message (e.g. regular, bot_message, file_share, etc.) |
| count_words | The number of words contained in the message. |
| . . . | . . . |

Figure 8:
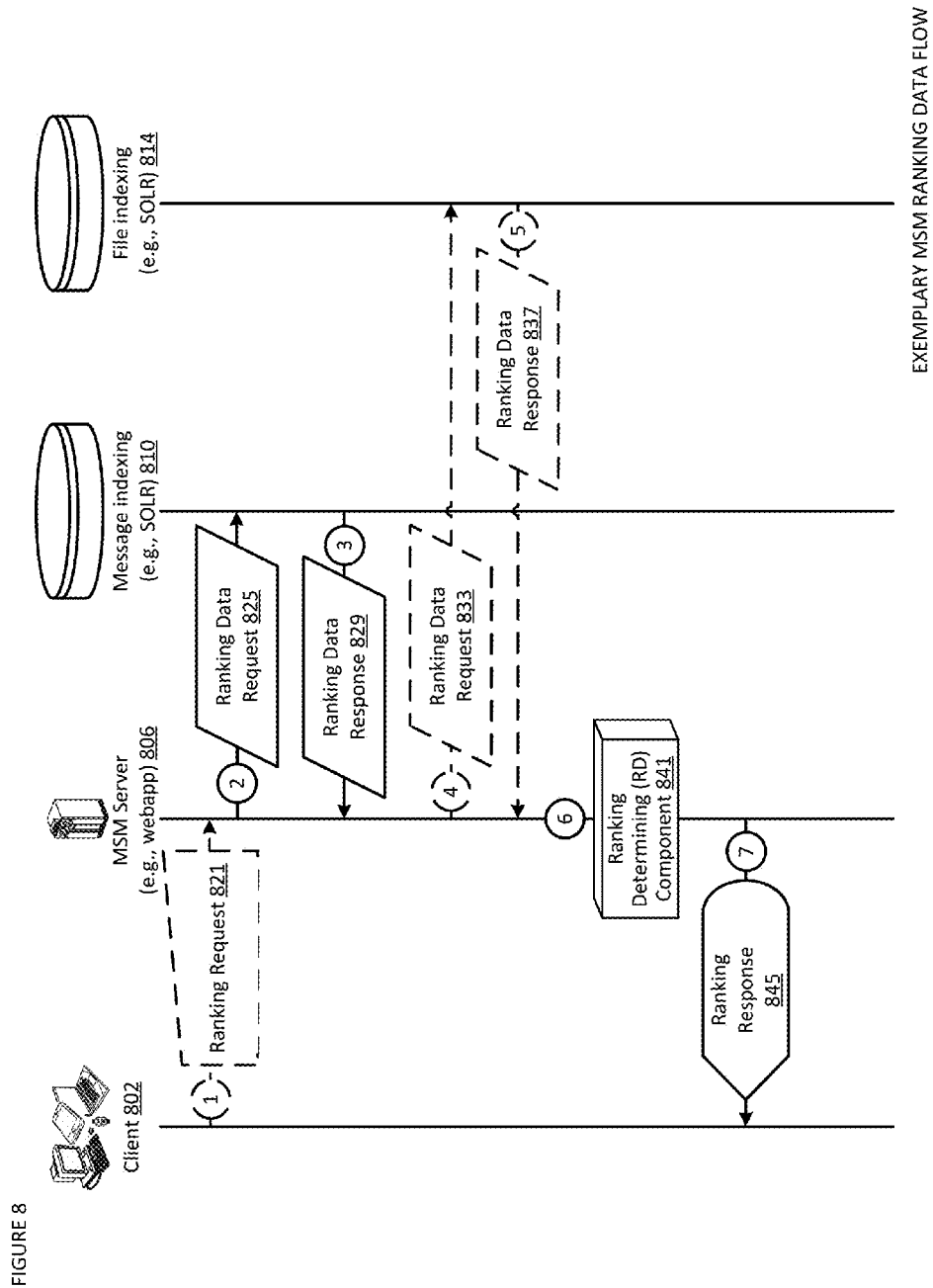
FIG. 8 shows a datagraph diagram illustrating embodiments of a ranking data flow for the MSM.

FIG. 8 shows a datagraph diagram illustrating embodiments of a ranking data flow for the MSM. In FIG. 8, dashed lines indicate data flow elements that may be more likely to be optional. In FIG. 8, a client 802 may send a ranking request 821 to a MSM server 806. For example, the ranking request may be a search request that includes a search term (e.g., "patents") specified by a user. In one implementation, the ranking request may include data such as a request identifier, a user identifier (e.g., to facilitate access control), a ranking type (e.g., search for messages, people, channels; recap a channel), a ranking filter (e.g., search results should include messages and exclude people and channels), ranking details (e.g., a search term for a search request, a channel identifier for a recap request), and/or the like. For example, the client may provide the following example ranking request, substantially in the form of a HTTP(S) POST message including XML-formatted data, as provided below:

POST/ranking_request.php HTTP/1.1
Host: www.server.com
Content-Type: Application/XML
Content-Length: 667
<?XML version="1.0" encoding="UTF-8"?>
<ranking_request>
<request_identifier>ID_request_1</request_identifier>
<user_identifier>ID_user_2</user_identifier>
<ranking_type>search</ranking_type>
<ranking_details>
  <search_term>patents</search_term>
</ranking_details>
</ranking_request>

In an alternative embodiment, the ranking request may be generated by the MSM server. For example, the ranking request may be a channel suggestion request (e.g., suggesting channels to join, leave, star, and/or the like) periodically generated by the MSM server for the user. In another example, the ranking request may be a contextual search for key phrases in a channel to augment the user's reading experience with relevant messages and/or files.

The MSM server may send a ranking data request 825 to message indexing 810. In one implementation, the ranking data request may specify facets of searching for message indexing 810 to filter over (e.g., search term, team and/or company identifier associated with the user). In another implementation, the ranking data request may specify ML structure input data to obtain for ML structure(s) utilized for ranking. For example, the MSM server may provide the following example ranking data request, substantially in the form of a HTTP(S) POST message including XML-formatted data, as provided below:

POST/ranking_data_request.php HTTP/1.1
Host: www.server.com
Content-Type: Application/XML
Content-Length: 667
<?XML version="1.0" encoding="UTF-8"?>
<ranking_data_request>
  <request_identifier>ID_request_2</request_identifier>
  <relevant_messages_to_get>
    <access_control>data accessible to ID_team_1 (e.g., team of ID_user_2)<access_control>
    <search_term>patents</search_term>
  </relevant_messages_to_get>
  <ML_structure_input_data_to_get>
    ID_ML_structure_input_1, ID_ML_structure_input_2, . . . .
  </ML_structure_input_data_to_get>
</ranking_data_request>

Message indexing 810 may send a ranking data response 829 to the MSM server with the requested data (e.g., relevant messages, ML structure input data).

The MSM server may send a ranking data request 833 to file indexing 814. In one implementation, the ranking data request may specify facets of searching for file indexing 814 to filter over (e.g., search term, team and/or company identifier associated with the user). File indexing 814 may send a ranking data response 837 to the MSM server with the requested data (e.g., relevant files).

A ranking determining (RD) component 841 may utilize ranking data (e.g., relevant messages, relevant files, ML structure input data) to rank the relevant messages and/or files, people, channels, and/or the like using ML structure(s). See FIG. 9 for additional details regarding the RD component.

The MSM server may send a ranking response 845 to the client. The ranking response may be used to provide the highest ranked messages, files, people, channels, and/or the like to the client. For example, the client may utilize the ranking response to display results (e.g., search results, a recap of a channel, channel suggestions) to the user. See FIGS. 12-16 for examples of results that may be displayed to the user.

Figure 9:
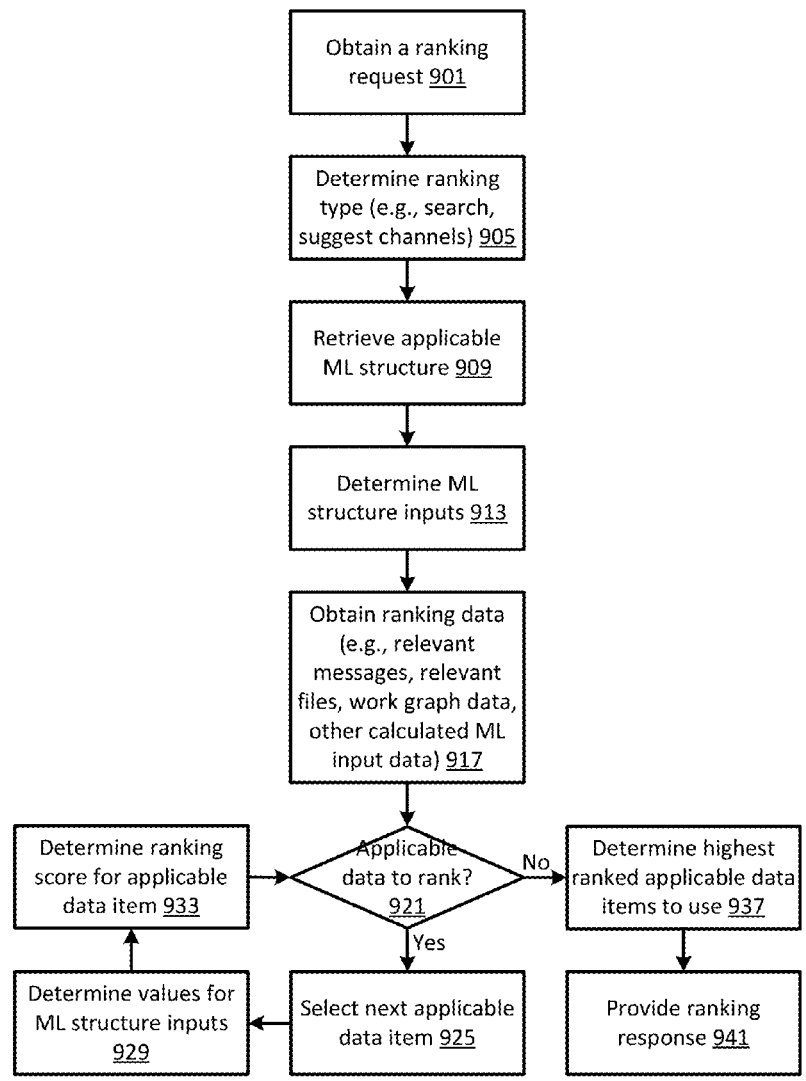
FIG. 9 shows a logic flow diagram illustrating embodiments of a ranking determining (RD) component for the MSM.

FIG. 9 shows a logic flow diagram illustrating embodiments of a ranking determining (RD) component for the MSM. In FIG. 9, a ranking request may be obtained at 901. For example, the ranking request may be obtained as a result of a user executing a search. In another example, the ranking request may be obtained as a result of a ranking process periodically generating channel suggestions for the user. In some implementations, ranking requests may exclude specific queries (e.g., exclude search terms in a search), may exclude users (e.g., exclude the user), may exclude contexts (e.g., exclude specified channels), and/or the like. In some implementations, multiple ranking requests may be generated (e.g., for a search) to generate different types of results. For example, when the user executes the search, a ranking request may be generated to determine relevant messages, another ranking request may be generated to determine relevant people, and another ranking request may be generated to determine relevant channels. In another example, when the user executes the search, multiple ranking requests may be generated to utilize multiple ML structures (e.g., classifiers) to rank results (e.g., messages) and scores from these classifiers may be combined into a single score using a combiner heuristic. In some implementations, a ML structure may be utilized to determine which ranking requests should be generated (e.g., is the user looking for a specific message, an expert, a channel in which to ask a question, or an answer to a question).

The ranking type of the ranking request may be determined at 905. In one embodiment, the ranking type may indicate the application associated with the ranking request. For example, such applications may include determining relevant messages, conversations, files, people, channels, and/or the like in response to the user's search query; generating a recap of a channel for the user; suggesting channels for the user to join, leave, star, and/or the like; providing a push notification of a specified number of the most important messages for the user for the day. In another embodiment, the ranking type may indicate which classifier to utilize for ranking (e.g., based on the engagement type). In one implementation, the ranking request may be parsed (e.g., using PHP commands) to determine the ranking type.

The applicable ML structure (e.g., neural network) to use for the ranking request may be retrieved at 909. In one embodiment, different ML structures may be used for different types of ranking requests and/or for different teams and/or companies. In one implementation, the applicable ML structure may be retrieved based on the ranking type and the team identifier associated with the user (e.g., the team identifier of the team to which the user is assigned). For example, the applicable ML structure may be retrieved via a MySQL database command similar to the following:

SELECT*
FROM ML_Structures
WHERE ML_StructureApplication=search_messages
  AND ML_StructureTeamID=ID_team_1;

ML structure inputs for the retrieved ML structure may be determined at 913. In one implementation, the ML structure inputs may utilize data such as message content, file content, message metadata, work graph data, other generated ML structure input data (e.g., generated via another ML structure (e.g., team-level term priority), calculated via a statistical method such as tf-idf (e.g., team-level term frequency) or BM25), search term, and/or the like. For example, the ML structure inputs may be determined via a MySQL database command similar to the following:

SELECT ML_StructureInputs
FROM ML_Structures
WHERE ML_StructureID=ID_ML_structure_1;

Ranking data for the determined ML structure inputs may be obtained at 917. In one embodiment, the ranking data may include relevant messages, files, people, channels, and/or the like. For example, messages accessible to the user (e.g., messages associated with the team identifier associated with the user) may be searched for a search term specified by the user, and matching messages may be obtained. In another embodiment, the ranking data may include generated ML structure input data. For example, generated ML structure input data accessible to the user (e.g., generated ML structure input data associated with the team identifier associated with the user) that correspond to the ML structure inputs may be obtained. In one implementation, a ranking data request may be sent to obtain the ranking data.

A determination may be made at 921 whether there remain applicable data to rank. In one implementation, any relevant messages, files, people, channels, and/or the like may be ranked. If there remain applicable data to rank, the next applicable data item may be selected at 925.

Values for ML structure inputs for the selected applicable data item may be determined at 929. In one implementation, values for the ML structure inputs may be determined based on message metadata. For example, if channel priority for the user is one of the ML structure inputs, metadata associated with the selected message may be analyzed to determine a channel identifier associated with the selected message. The channel identifier may be used in a second ML structure (e.g., a ML structure that determines channel priority for the user) to determine channel priority of the channel where with the selected message was sent for the user. In another implementation, values for ML structure inputs may be determined based on work graph and/or other generated ML structure input data. For example, if user priority for the user is one of the ML structure inputs, work graph data associated with the user's team may be analyzed to determine user priority of the user who sent the selected message to the user executing the search.

A ranking score for the selected applicable data item may be determined at 933. In one implementation, the determined values for ML structure inputs may be provided to the applicable ML structure, which may generate the ranking score for the selected applicable data item. For example, a message rank score may indicate how relevant the selected applicable data item is with regard to the ranking request (e.g., how relevant the selected message is with regard to the user's search).

In some alternative embodiments, statistical methods may be used to rank applicable data items (e.g., instead of a ML structure). For example, a search for experts (e.g., triggered based on a heuristic or a ML classifier) may utilize tf-idf, BM25, and/or the like techniques to rank users as experts with regard to a given topic (e.g., specified in the user's search query). In one implementation, the following technique may be used:

Calculating Tf-idf for a Given Query
Let N=total number of documents (e.g., user-channel pairs)
For each word in the query:
  For each user-channel in tf(word), calculate tf-idf score:
    tf=pow(userTF.weightedTF,0.75)
    idf=Math.log(N/(1+df(word))
    norm=docNorm(user)
    tfidf=tf*idf*idf*norm
Group scores by user-channel key and sum
Return top 5 user-channels
Alternatively: Use BM25 for scoring
Alternatively: Use channels instead of user-channel pairs
Alternatively: Allow experts to not match all terms in the query, using the "2<75%" rule. That is, if the query has 1 or 2 terms, they are required. If the query has 3 terms, 2 are required; 4 terms, 3 are required, etc.

Highest ranked applicable data items to use may be determined at 937. In one implementation, a threshold number of highest ranked applicable data items may be specified (e.g., use up to 10 most relevant messages). In another implementation, a threshold ranking score may be specified (e.g., use messages with message rank score of at least 0.7 out of 1).

A ranking response may be provided at 941. In one implementation, the ranking response may be used to provide the highest ranked applicable data items to the user. For example, search results that include the highest ranked messages may be displayed to the user. In another example, a recommendation for channels to join, leave, star, and/or the like may be displayed to the user.

In one embodiment, the RD component may be utilized for ranking using the highlights model (e.g., see the MLSG component and FIG. 7). In one implementation, the highlights model may combine the output of each classifier into a single score using a combiner heuristic (e.g., the generalized mean of the engagement types used for ranking). For example, if click, reaction, and reply engagement types are utilized for ranking, using the aliases $P_{type}$ for each output, the combiner heuristic may be:

$$\text{Score} = ((P_{click}^{12} + P_{reaction}^{12} + P_{reply}^{12})/3)^{1/12}$$

The score may be used for ranking (e.g., cross channel briefing), thresholding (e.g., in-channel highlights), and/or the like applications.

In some implementations, one or more post processing heuristics may be applied after scoring. For example, the post processing heuristics may include:

Feedback
Some of the highlights products include a feedback mechanism that allows the user to provide feedback on a message. As part of this mechanism, the user can request to receive fewer messages from a given user, channel or containing links from a particular domain. This feedback may be used to scale the scores down for messages that match negative feedback received in the past from the user.

Justifications
The scores for each message may be justified post ranking using a number of templates. For example, a message with reactions from users with high user priority with respect to the current user might be justified as important using the string: "@user1, @user2 and @user3 reacted to . . . ". Message for which no template fits may be discarded.

Diversity
Some of the highlights products include a diversity heuristic. In the case of cross channel briefing for example, no more than N messages are kept from the same user, channel or file type. In the case of in-channel highlights, the top scoring message from a run of consecutive high scoring messages may be kept.

Thresholding
For some highlights products, messages may be thresholded by score and in number. For example, for cross channel briefings, messages above a certain score may be considered and the top 10 messages with a high enough score may be kept.

Small Messages
Small messages, containing a few words or emojis, may be discarded.

Unfurls
Messages containing links where the link unfurls into a separate message may be grouped together and counted as one.

Time Decay
For some highlights products such as cross-channel briefing, a time decay may be applied to the score for each message to boost more recent messages and downweight older messages.

FIG. 10 shows a screenshot diagram illustrating embodiments of the MSM. In FIG. 10, screen 1001 shows that a user may join one or more teams. In one embodiment, a team may be public (e.g., any company employee may join the team). For example, the user may join Garlic Crouton team 1003. In another embodiment, a team may be private (e.g., the team may be restricted to certain company employees) For example, the user may request access to Lemon Croutons team 1005, and, if the user meets criteria for joining the team, the user may be allowed to join the team. In one implementation, a ranking request may be used to determine teams to recommend for the user to join (e.g., utilizing the user's data such as the user's job title, geographic location, and/or the like). The user may also browse 1007 teams in the user's company that the user may join.

Screen 1010 shows various teams in a company, and a user's membership status with regard to these teams. For example, the user may be a member of two out of five teams. In one embodiment, when the user sends a ranking request, messages associated with these two teams may be analyzed.

Figure 11:
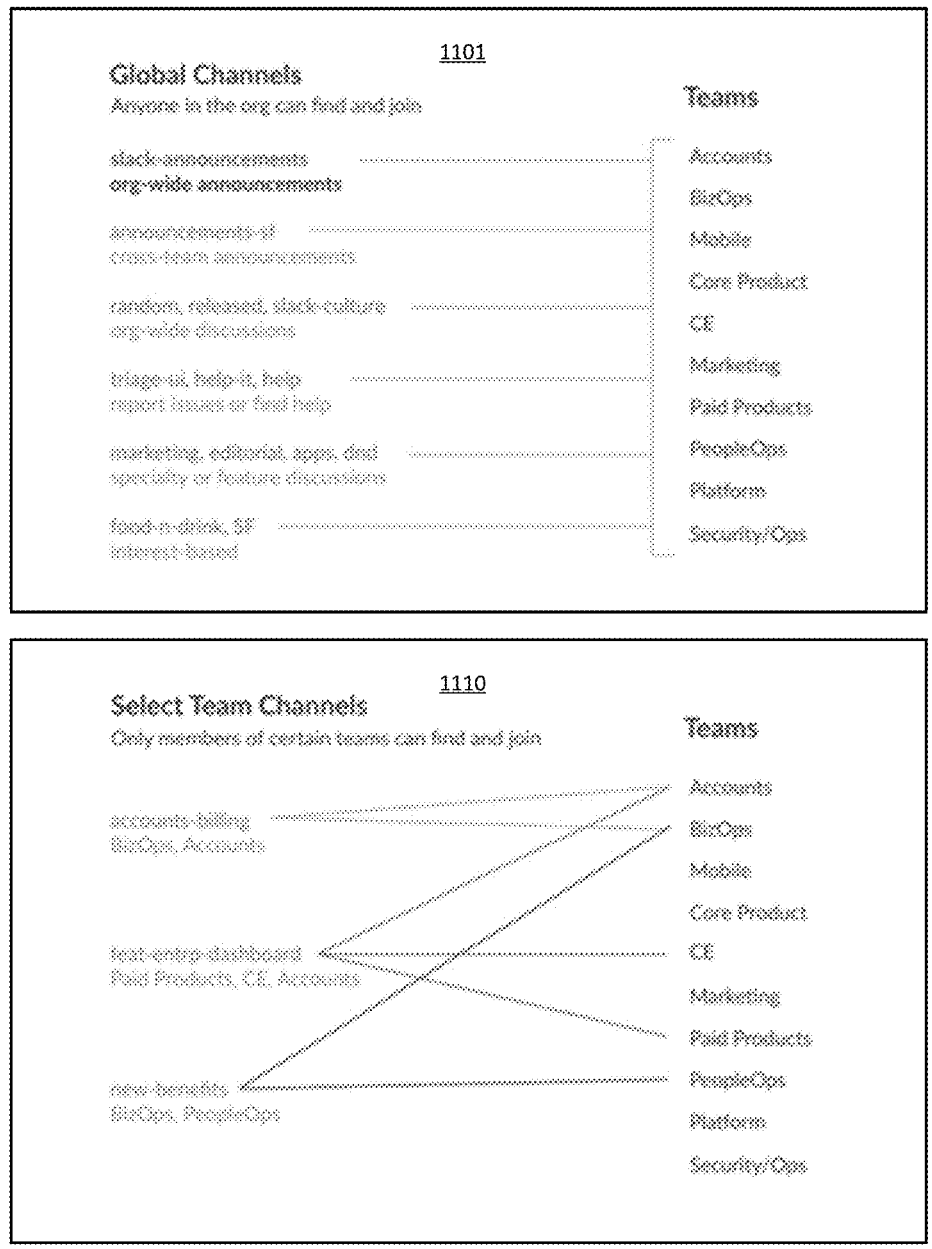
FIG. 11 shows a screenshot diagram illustrating embodiments of the MSM.

FIG. 11 shows a screenshot diagram illustrating embodiments of the MSM. In FIG. 11, screen 1101 illustrates global channels. In one embodiment, a member of any of the teams (e.g., anyone in the company) may find and/or join global channels. For example, members of both Accounts team and Mobile team may join the "food-n-drink, SF" channel.

Screen 1110 illustrates select team channels. In one embodiment, access (e.g., ability to find and/or join) to select team channels may be restricted to members of specified teams. For example, members of Accounts team have access to "accounts-billing" channel, but members of Mobile team do not have access to this channel.

Figure 12:
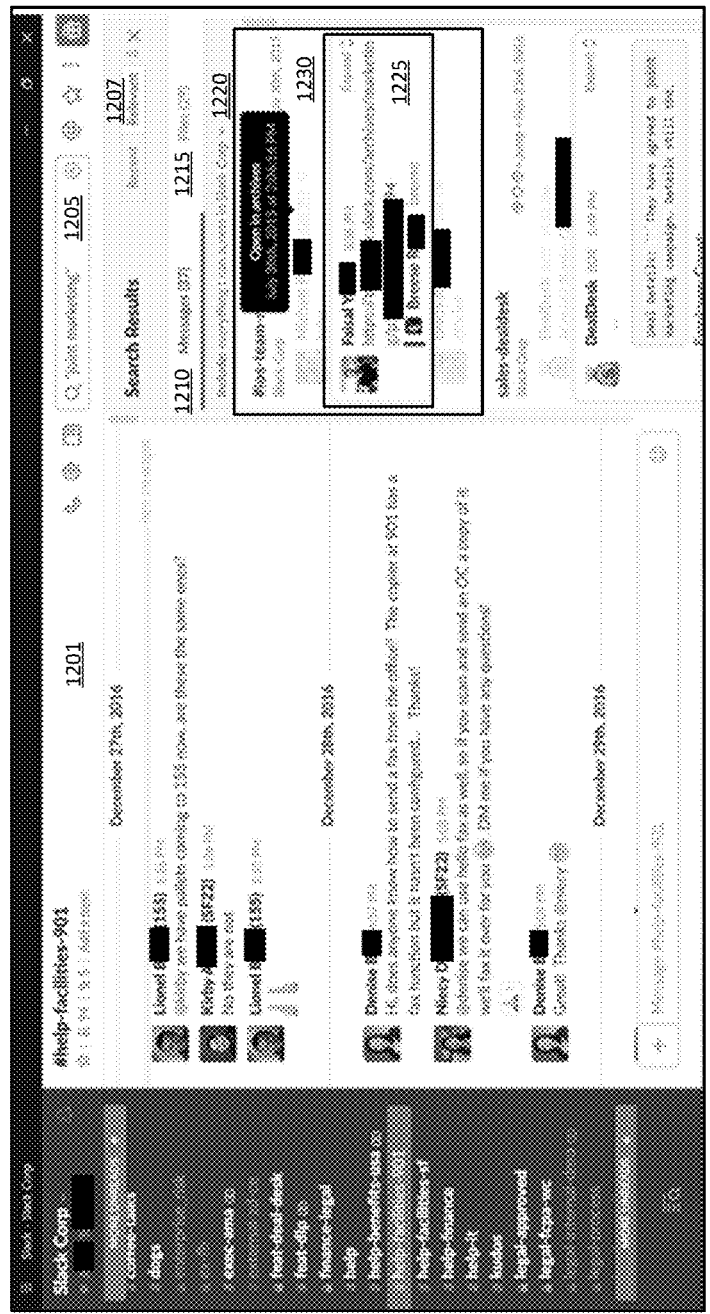
FIG. 12 shows a screenshot diagram illustrating embodiments of the MSM.

FIG. 12 shows a screenshot diagram illustrating embodiments of the MSM. In FIG. 12, screen 1201 illustrates search results of a search conducted for a user. As shown at 1205, the user specified "joint marketing" as the search term for the search. In one implementation, the search results may be displayed to the user sorted based on relevance 1207 (e.g., highest ranked applicable data items with higher ranking scores are shown first). In another implementation, the search results may be displayed to the user sorted based on other criteria (e.g., most recent highest ranked applicable data items are shown first).

The results of this search include two types of results, messages 1210 and files 1215. In one implementation, the user may select which type of results to view. In another implementation, different result types may be shown together in one view. As shown at 1220, the results are determined using data for the user's company. In some implementations, the user may choose to obtain search results using data for one or more user selected teams associated with the user.

Message 1225 is shown as the highest ranked search result for the search. The message may be one of the messages in a conversation primitive partially shown at 1230. The user may view the other messages in the conversation primitive using the "Expand" GUI widget.

Figure 13:
FIG. 13 shows a screenshot diagram illustrating embodiments of the MSM.

FIG. 13 shows a screenshot diagram illustrating embodiments of the MSM. In FIG. 13, screen 1301 illustrates search results of a search conducted for a user. As shown at 1305, the user specified "slacklab" as the search term for the search. In addition to messages and files, the results of the search include people. As shown at 1310, three team members (e.g., with the highest ranking scores) are included in the search results. For example, a person may be thought of a collection of messages associated with the person, and may be ranked using data regarding this collection of messages, work graph data, and/or the like.

Figure 14:
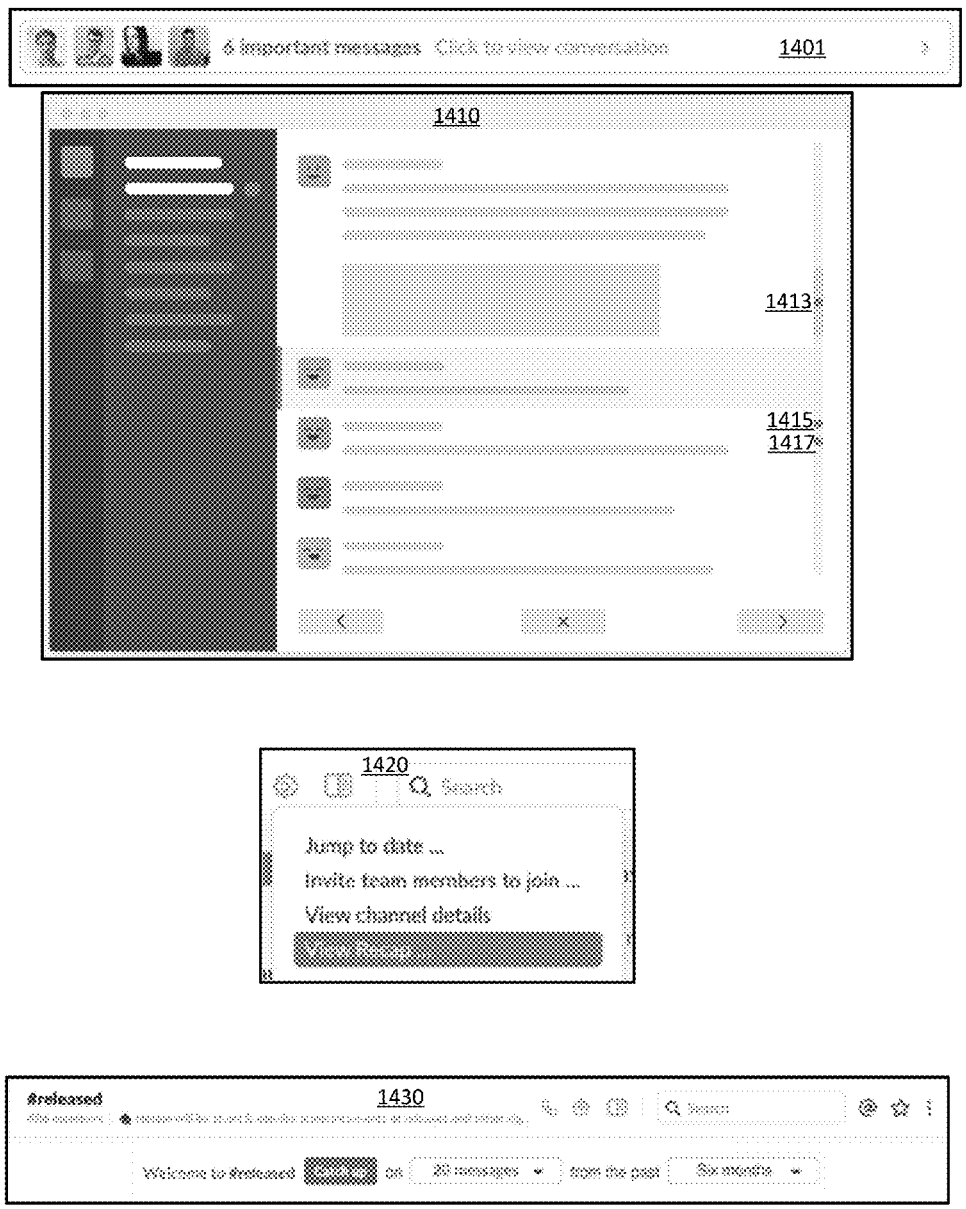
FIG. 14 shows a screenshot diagram illustrating embodiments of the MSM.

FIG. 14 shows a screenshot diagram illustrating embodiments of the MSM. In FIG. 14, screen 1401 illustrates that a user may be shown a channel recap notification. For example, the user may not have been able to read messages a channel for some time, and the channel recap notification may be provided to help the user catch up with the channel. The channel recap notification may inform the user regarding important messages (e.g., 6 important messages) sent in the channel while the user was away. In one implementation, the user may click on the channel recap notification to view a channel recap.

Screen 1410 illustrates the channel recap that may be displayed for the user. In one implementation, the important messages may be marked with dots 1413, 1415, 1417 on the scrollbar to facilitate finding these messages. For example, the important messages may be messages with the highest ranking scores sent in the channel while the user was away.

Screen 1420 illustrates that the user may utilize a GUI widget to view a recap of the channel at any time. In one implementation, the channel recap may be configured to display the most important messages for a specified time period (e.g., the most important messages sent in the last week).

Screen 1430 illustrates that the user may select how a channel recap should be configured. For example, if the user joins a new channel that already has a lot of messages, the user may wish to catch up on the 20 most important messages sent in this channel in the last six month.

Figure 15:
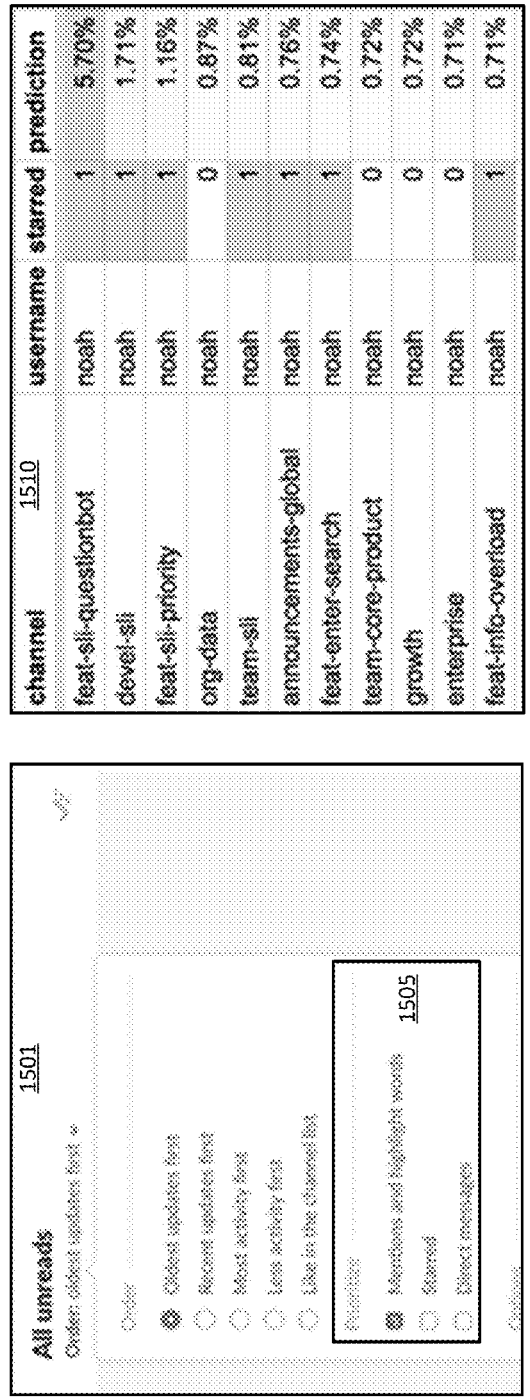
FIG. 15 shows a screenshot diagram illustrating embodiments of the MSM.

FIG. 15 shows a screenshot diagram illustrating embodiments of the MSM. In FIG. 15, screen 1501 illustrates how various channels may be sorted and/or prioritized. As shown at 1505 a user may choose to prioritize channels with mentions and highlight words.

Screen 1510 illustrates ranking scores (e.g., prediction column) for various channels (e.g., channel column) for the user (e.g., username column) For example, the user's channel priority preferences and data regarding the various channels (e.g., whether the user starred a channel, data regarding messages sent in a channel, work graph data) may be used to determine ranking scores for the various channels for the user.

Figure 16:
FIG. 16 shows a screenshot diagram illustrating embodiments of the MSM.

FIG. 16 shows a screenshot diagram illustrating embodiments of the MSM. As shown in FIG. 16, ranking scores for channels may be utilized for a variety of applications. Screen 1601 illustrates how channels may be sorted for a user. As shown, channels starred by the user may be shown on top in Starred section, priority channels (e.g., channels with the highest ranking scores) may be determined and/or sorted (e.g., channels with higher ranking scores are shown first) and shown below in Priority section, and other channels may be shown below in Channels section.

Screen 1605 illustrates suggestions of channels to join, leave, star, and/or the like that may be generated for the user (e.g., based on data regarding the user). For example, three channels to join may be suggested to the user. Screen 1610 illustrates channel suggestions that may be provided to the user when a user joins a channel (e.g., based on interests of other people in the channel and data regarding the user). For example, three channels to join may be suggested to the user.

Figure 17A:
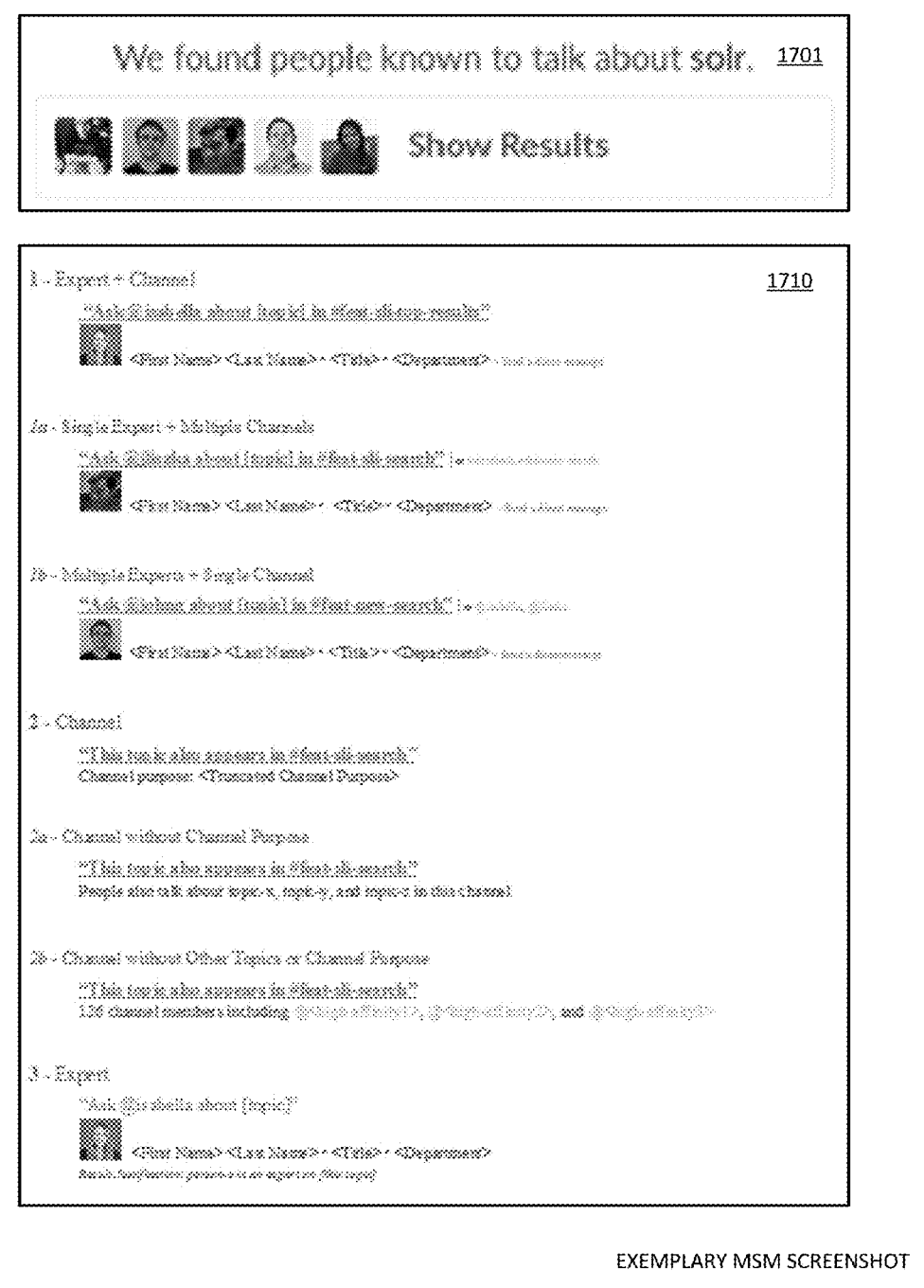
Figure 17B:
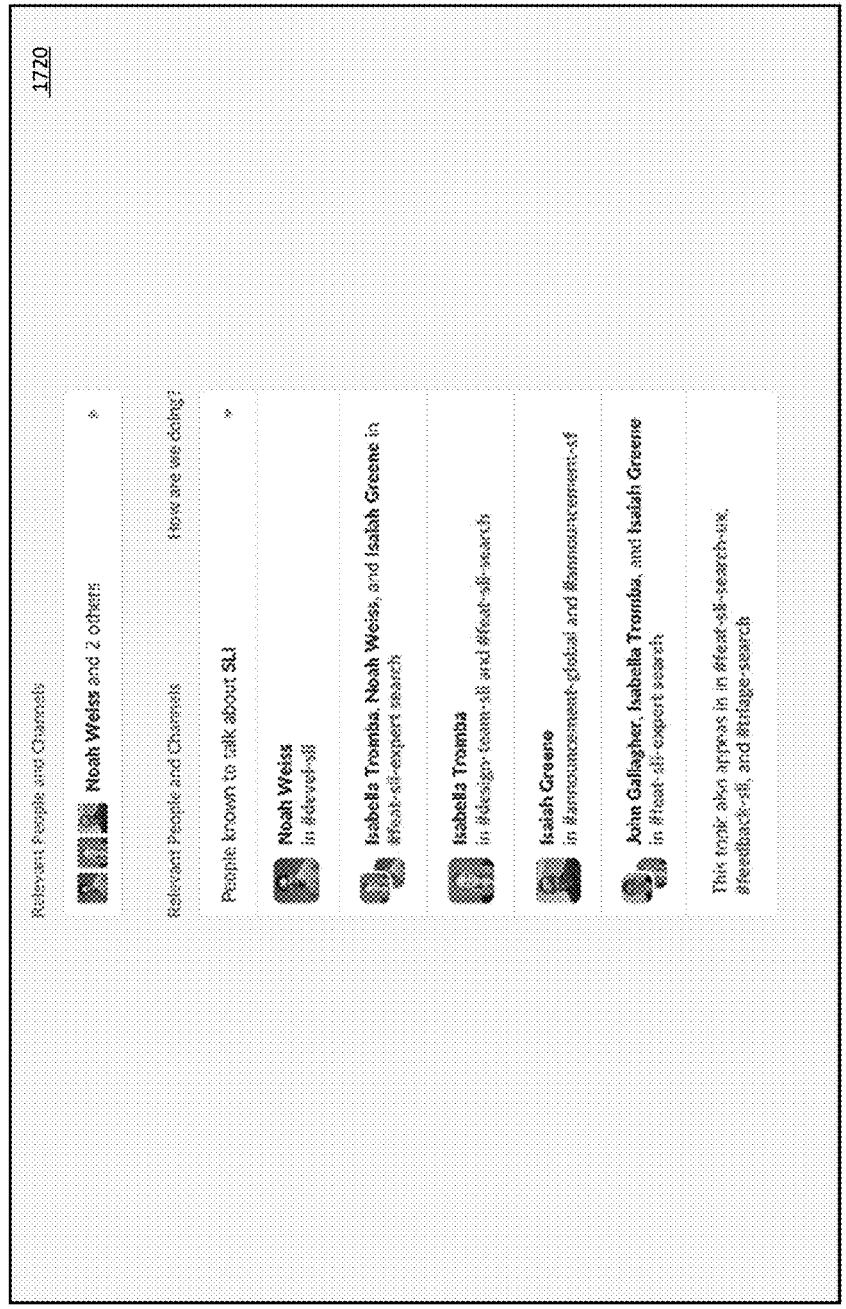
FIGS. 17A-17C show screenshot diagrams illustrating embodiments of the MSM.
Figure 17:
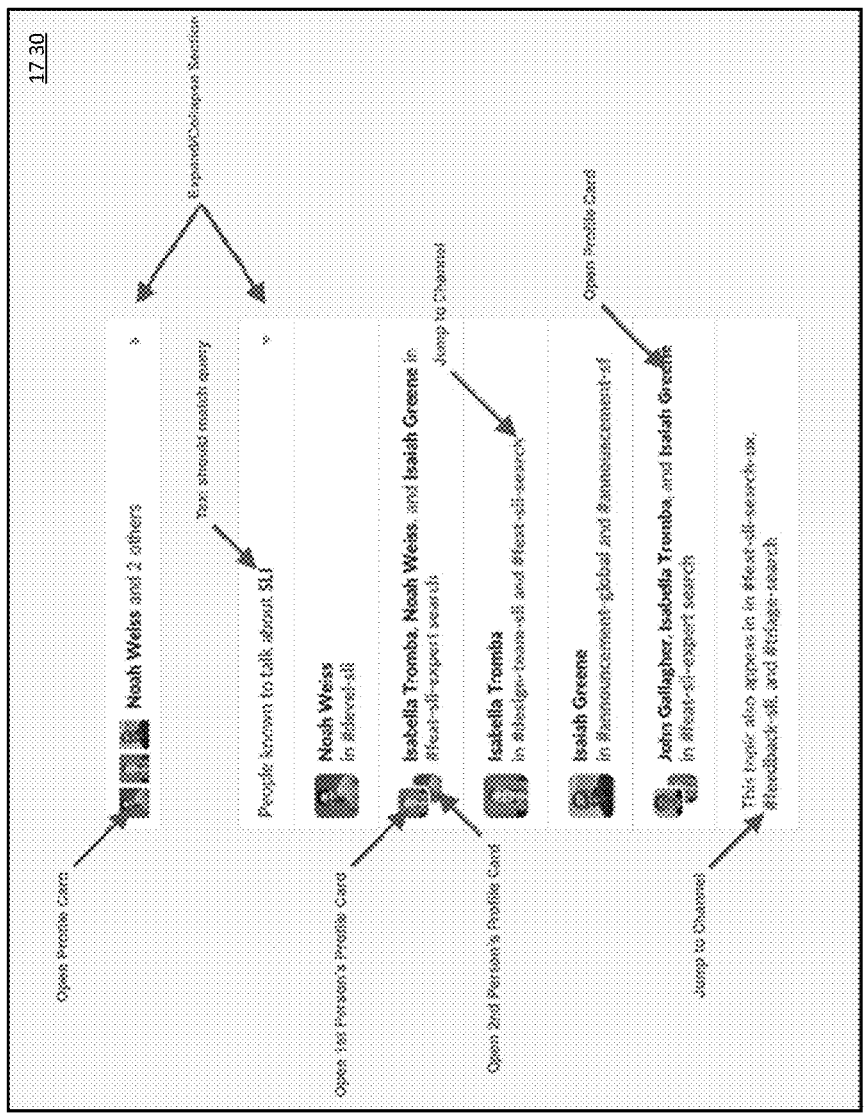

FIGS. 17A-17C show screenshot diagrams illustrating embodiments of the MSM. In FIG. 17, screen 1701 illustrates that a user may be shown a collapsed results teaser to inform the user that experts for a user specified search term (e.g., solr) have been found (e.g., based on topic expertise scores for topic solr). In one implementation, the user may click on the results teaser to view results.

Screen 1710 illustrates different types of results that may be shown to the user (e.g., ordered based on ranking from highest (1) to lowest (3)). In one implementation, the topic (e.g., solr) may have been discussed by an expert in a channel. Different result configurations are illustrated for cases where (1) a single expert discussed the topic in a single channel, (1a) a single expert discussed the topic in multiple channels, and (1b) multiple experts discussed the topic in a single channel. For example, clicking on an expert may take the user to the relevant channel, where the user may ask a question and discuss the answer. In another implementation, the topic may have been discussed in a channel. Different result configurations are illustrated for cases where (2) a channel has a channel purpose description, (2a) a channel does not have a channel purpose description but has other discussed topics, and (2b) a channel does not have a channel purpose description or other discussed topics. In yet another implementation, the topic may have been discussed by an expert but not in a particular channel (e.g., in direct messages to other users). A result configuration (3) is illustrated for this case.

Screen 1720 illustrates an example of results that may be shown to the user. Screen 1730 illustrates various actions that may be taken in response to the user clicking on various elements of the results GUI.

FIG. 18 shows a screenshot diagram illustrating embodiments of the MSM. In FIG. 18, screen 1801 illustrates a cross-channel briefing of messages. In one embodiment, the briefing may be a GUI section with a set of diverse, interesting, unread messages. For example, the briefing may help people catch up quickly on important unread messages across joined channels by grouping them into a single dedicated section. In one implementation, in order to determine messages to show in the briefing, a multi-pass ranking approach using starred channel and channel priority tiers may be used as follows:

Tier 1: Take the top X % of starred channels based on channel priority. Select the highest scoring messages, and order the channels by score.

Tier 2: Take the bottom X % of starred channels based on channel priority. Select the highest scoring messages, and order the channels by score.

Tier 3: Take your top remaining channels by the top X % of priority (e.g., 20%, 30%), and do the same pass.

Tier 4: If there's still room left in the briefing, select the most important messages from the remaining channels.

Regardless of score, direct mentions may be included in the briefing unless the briefing has already been filled with messages in higher tiers.

Screen 1810 illustrates a feedback mechanism that may be utilized by a user to provide feedback regarding a message included in the briefing. Screen 1820 illustrates that when the user chooses to give positive or negative feedback, a second set of optional choices may be shown to obtain additional feedback (e.g., to help improve a ML model). For example, positive feedback choices may include: show me more messages like this, show me more from this channel, show me more from this person, show me more from this <domain>. In another example, negative feedback choices may include: this message isn't helpful, show me less from this channel, show me less from this person, show me less from this <domain>. In one implementation, a default optional choice may be used if the user does not select an optional choice.

Figure 19:
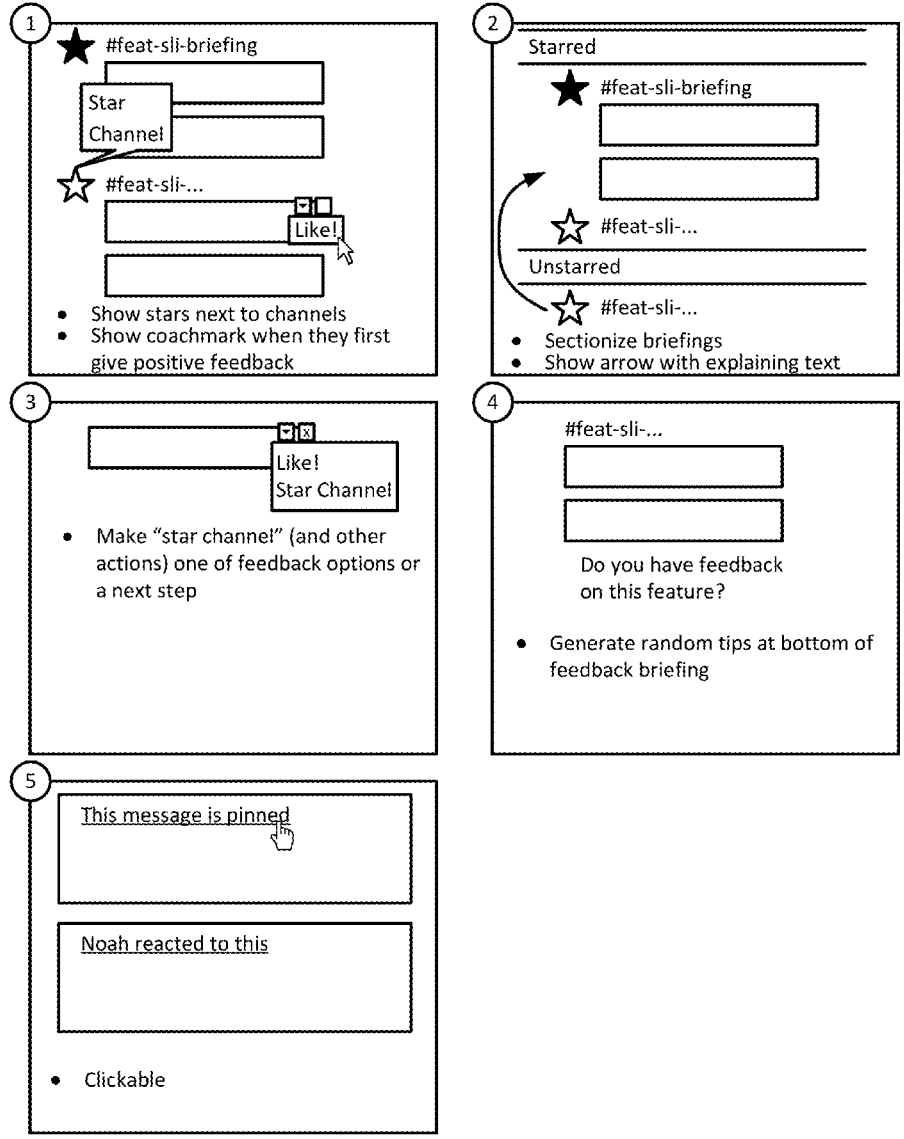
FIG. 19 shows a screenshot diagram illustrating embodiments of the MSM.

FIG. 19 shows a screenshot diagram illustrating alternative embodiments of the MSM.

Figure 20:
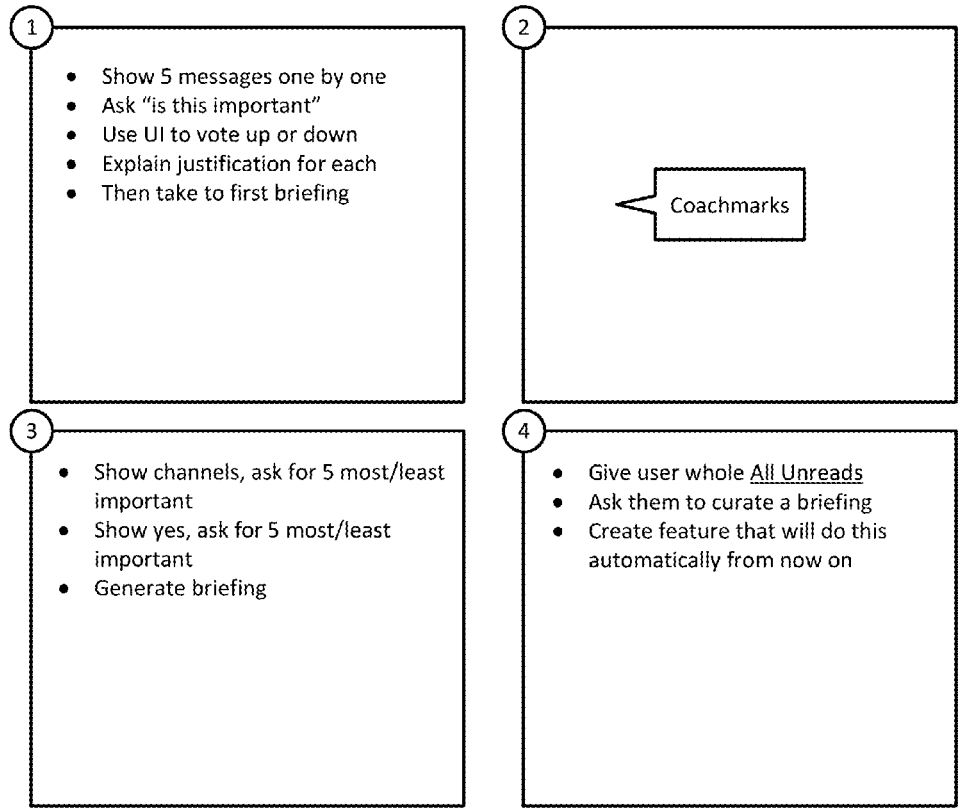
FIG. 20 shows a screenshot diagram illustrating embodiments of the MSM.

1. Instead of headings for each channel: add a star to the left so we can star directly from the Briefing 1a. If you give positive feedback on a message that's not a starred channel, we can show a coachmark 2. Sectionize Briefings between starred/unstarred section: use an arrow to show how you can move things up 3. Make star channel one of the feedback options 4. Replace TS feedback link with random tip generator and learn-more links 5. Clickable justifications FIG. 20 shows a screenshot diagram illustrating alternative embodiments of the MSM.

1. Show a series of messages of 1 by 1 and ask whether each was important. Show the justification for why it was shown. Show people how to give feedback.

2. Use coachmarks in various places.

3. Show "we think these are your 5 most important channels" in an interstitial and ask if you agree.

Figure 21:
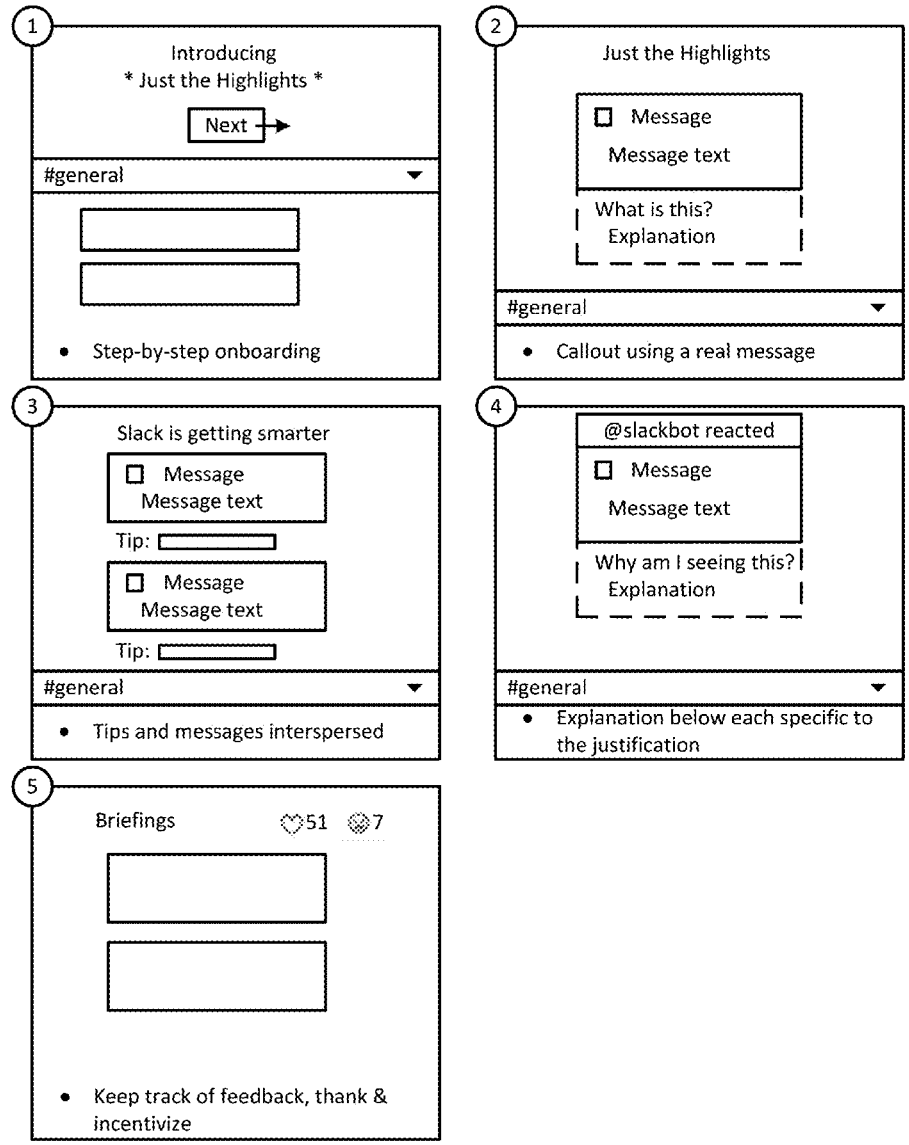
FIG. 21 shows a screenshot diagram illustrating embodiments of the MSM.

4. Give people all unreads and ask them to curate a briefing the first time to capture the intent of what Briefings is FIG. 21 shows a screenshot diagram illustrating alternative embodiments of the MSM.

1. A "Just the Highlights" walkthrough with next buttons to help you go through it 2. On first-use, just show one message with big callouts on what's going on 3. Add a tip underneath each Briefing message that's related to the justification 4. Explanation below each specific message "why am I seeing this?"

5. Show a count of feedback you've given so it communicates that we're listening.

Figure 22:
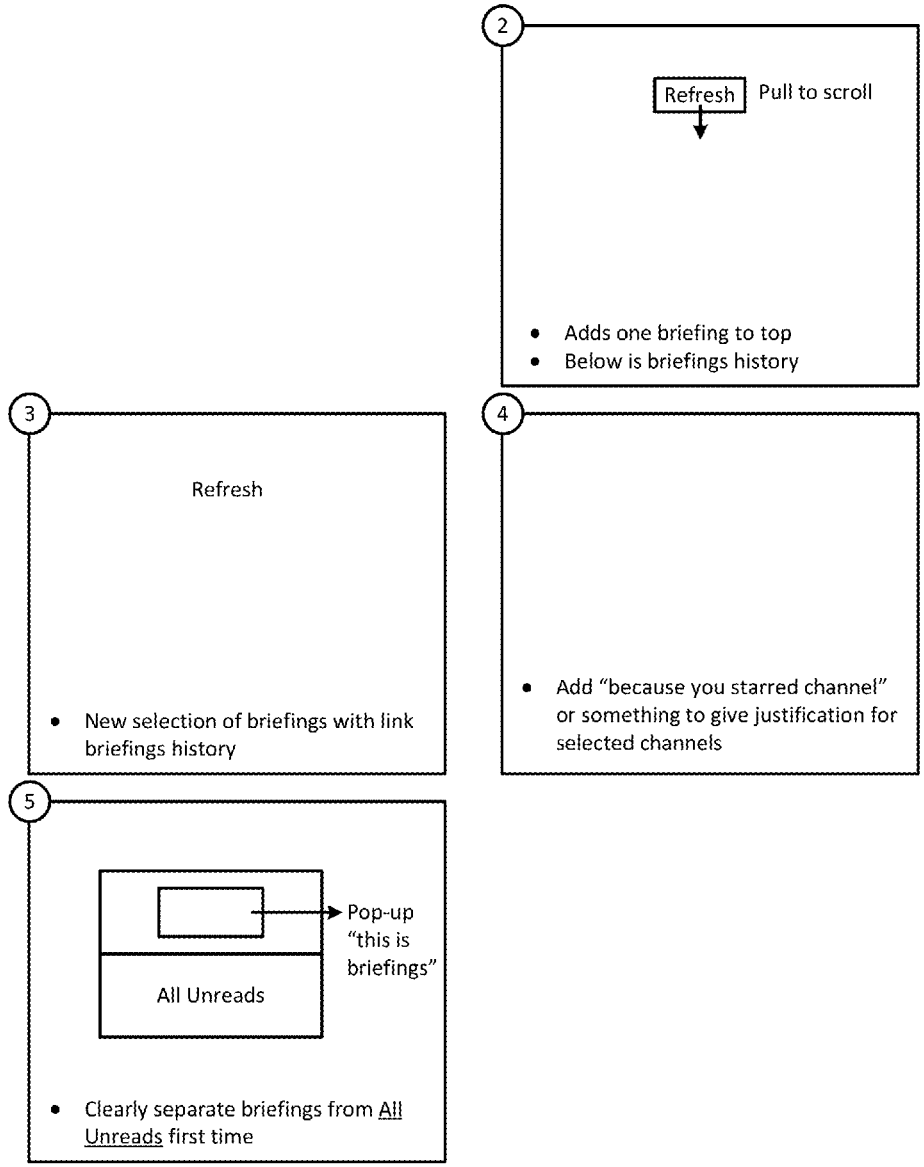
FIG. 22 shows a screenshot diagram illustrating embodiments of the MSM.

FIG. 22 shows a screenshot diagram illustrating alternative embodiments of the MSM.

2. Refresh button (or pull-down on Mobile)

3. Briefings history goes to a different place

4. Add "starring" terminology to justifications

5. Add a dark shade into All Unreads where the thing you can see is Briefings

Figure 23:
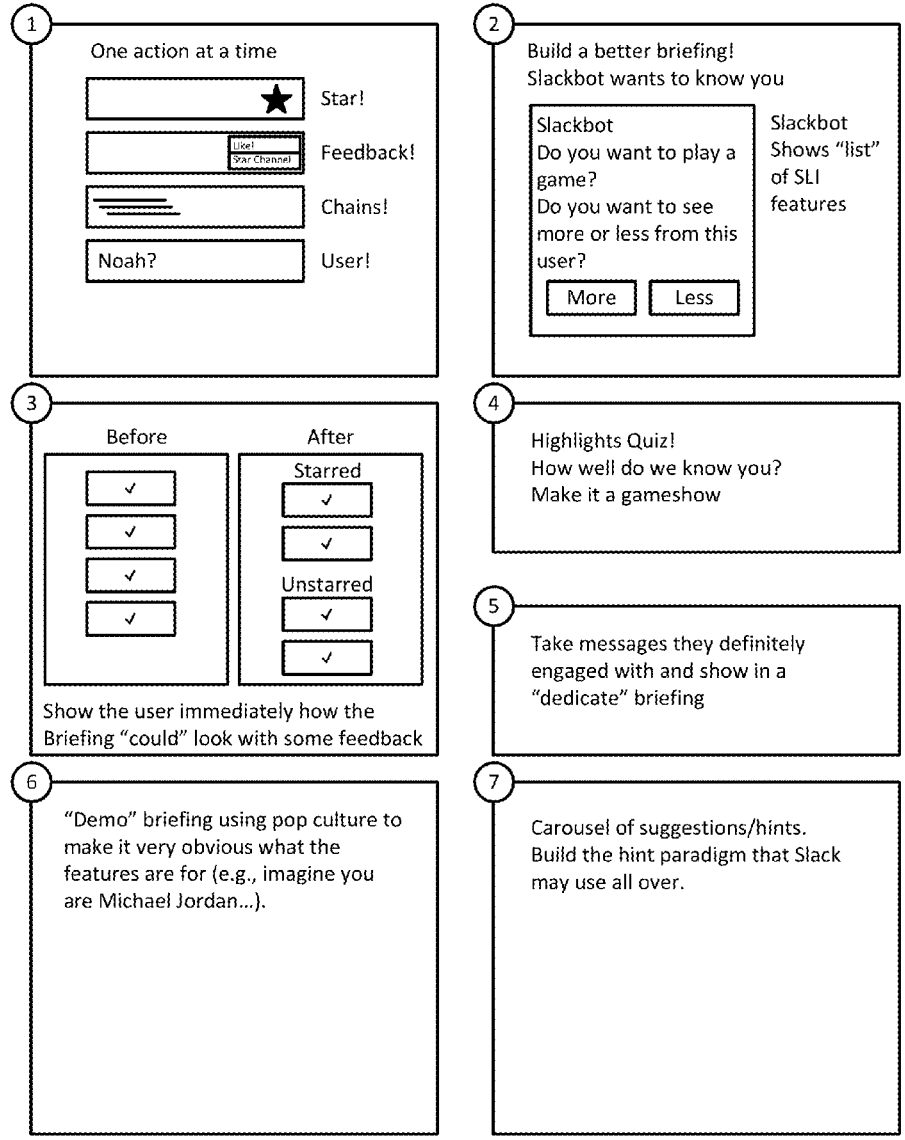
FIG. 23 shows a screenshot diagram illustrating embodiments of the MSM.

FIG. 23 shows a screenshot diagram illustrating alternative embodiments of the MSM.

1. Each message we show is specifically to teach one action. Highlight the important action.

2. Use Slackbot as the place to store SLI stuff. Use SLI to play a game to have fun and give us information at the same time.

Figure 24:
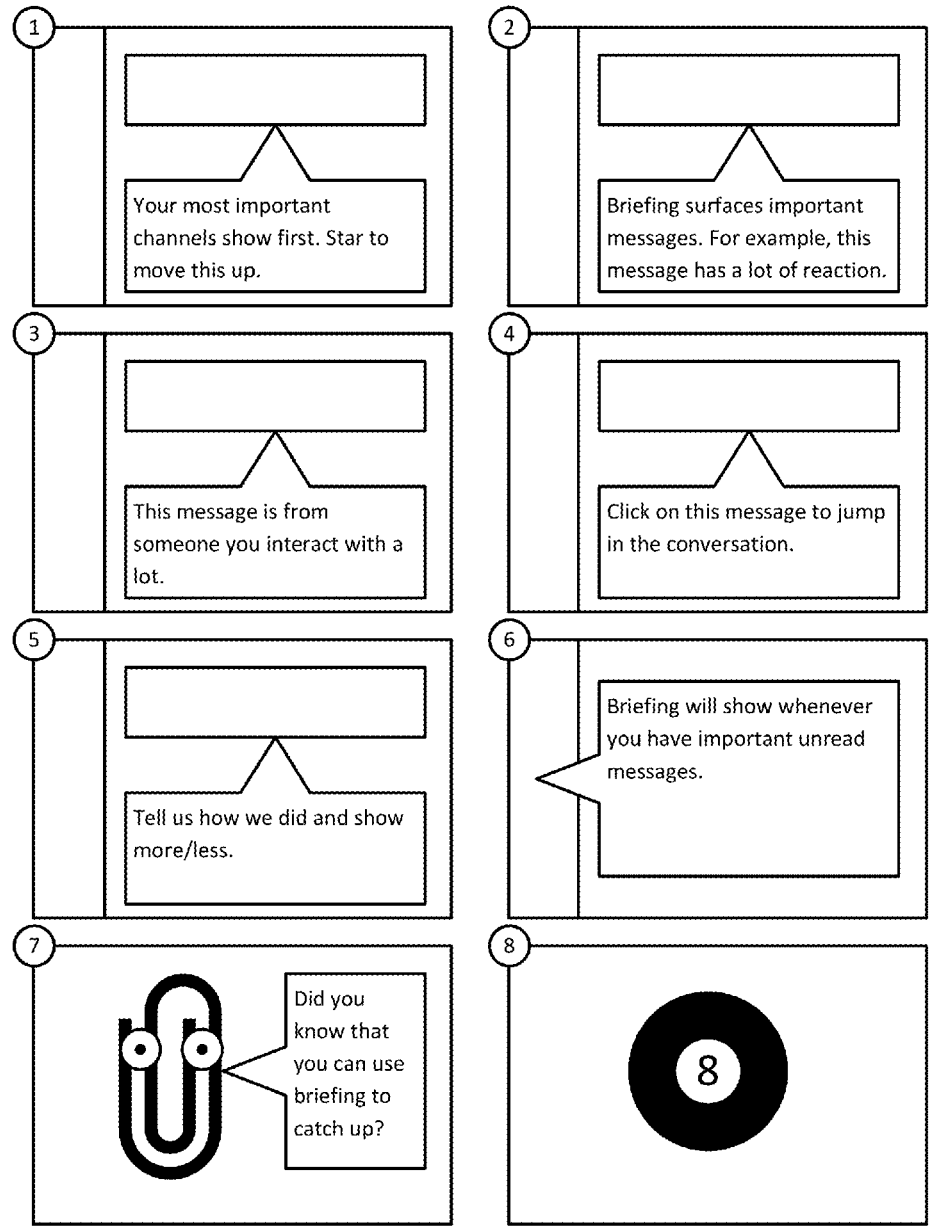
FIG. 24 shows a screenshot diagram illustrating embodiments of the MSM.

3. Show a "before" Briefing without any curation and an "after" Briefing after you've done fun things 6. Build a fake demo Briefing using universal pop culture so people understand why things are important/personalized 7. Carousel of hints and tips FIG. 24 shows a screenshot diagram illustrating alternative embodiments of the MSM.

1. Warm welcome that highlights parts of the UI and darkens the rest in logical order.

2-6: Coachmark various places with relevant text.

5. "Tell us how we did" coachmark that points to feedback controls

6. Point a coachmark at the sidebar

7. Clippy! Wizard!

8. Shake 8-ball for random tips

Figure 25:
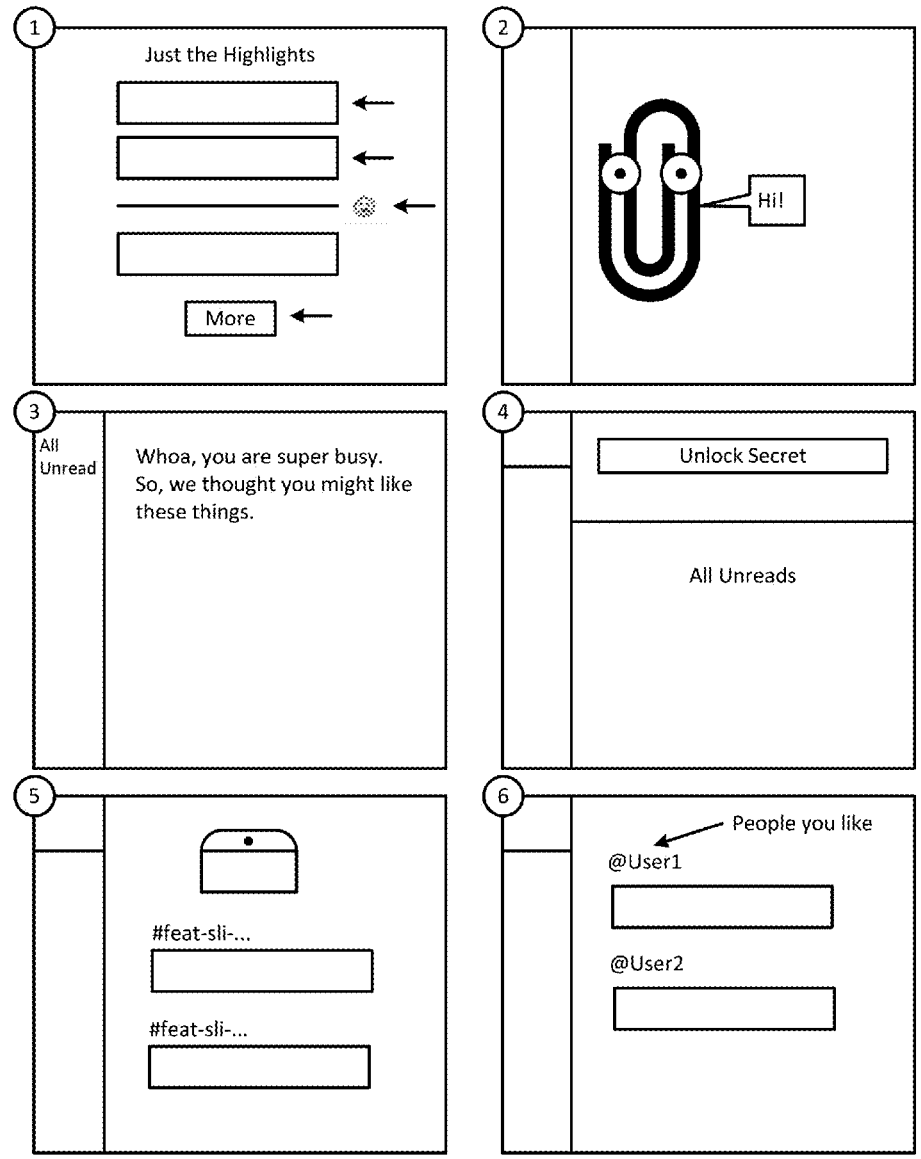
FIG. 25 shows a screenshot diagram illustrating embodiments of the MSM.

FIG. 25 shows a screenshot diagram illustrating alternative embodiments of the MSM.

1. Coachmarks

2. Clippy!

3. Badge the All Unreads when we think there's a Briefing that's really good. Don't enable Briefings until we know they have a really good one.

4. Hide the first very good Briefing behind an unlock button

5. Make the unlock button a cool treasure chest.

MSM Controller

Figure 26:
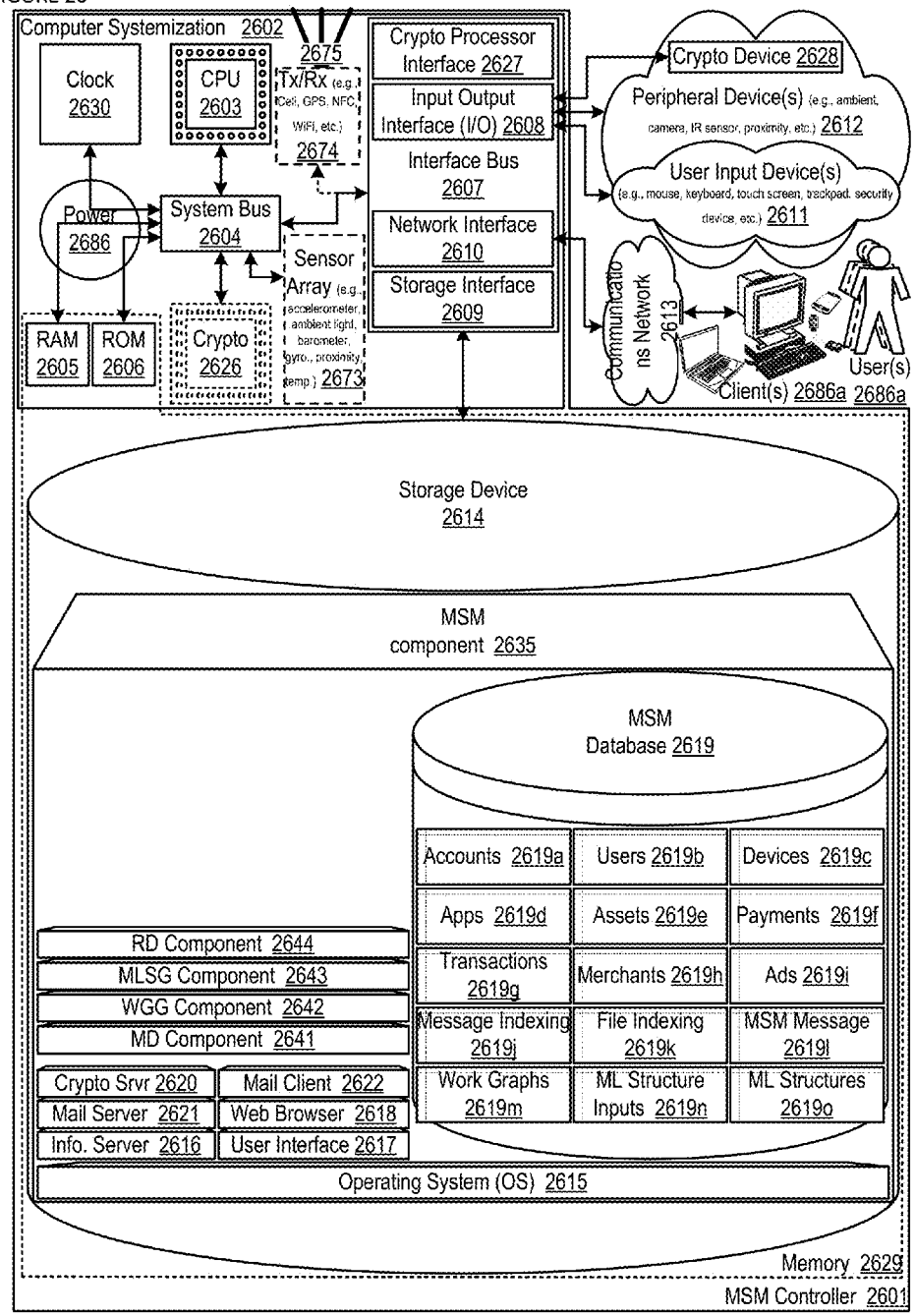
FIG. 26 shows a block diagram illustrating embodiments of a MSM controller.

FIG. 26 shows a block diagram illustrating embodiments of a MSM controller. In this embodiment, the MSM controller 2601 may serve to aggregate, process, store, search, serve, identify, instruct, generate, match, and/or facilitate interactions with a computer through internet messaging technologies, and/or other related data.

Typically, users, which may be people and/or other systems, may engage information technology systems (e.g., computers) to facilitate information processing. In turn, computers employ processors to process information; such processors 2603 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MSM controller 2601 may be connected to and/or communicate with entities such as, but not limited to: one or more users from peripheral devices 2612 (e.g., user input devices 2611); an optional cryptographic processor device 2628; and/or a communications network 2613.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The MSM controller 2601 may be based on computer systems that may comprise, but are not limited to, components such as: a computer systemization 2602 connected to memory 2629.

Computer Systemization

A computer systemization 2602 may comprise a clock 2630, central processing unit ("CPU(s)" and/or "processor(s)" (these terms are used interchangeable throughout the disclosure unless noted to the contrary)) 2603, a memory 2629 (e.g., a read only memory (ROM) 2606, a random access memory (RAM) 2605, etc.), and/or an interface bus 2607, and most frequently, although not necessarily, are all interconnected and/or communicating through a system bus 2604 on one or more (mother)board(s) 2602 having conductive and/or otherwise transportive circuit pathways through which instructions (e.g., binary encoded signals) may travel to effectuate communications, operations, storage, etc. The computer systemization may be connected to a power source 2686; e.g., optionally the power source may be internal. Optionally, a cryptographic processor 2626 may be connected to the system bus. In another embodiment, the cryptographic processor, transceivers (e.g., ICs) 2674, and/or sensor array (e.g., accelerometer, altimeter, ambient light, barometer, global positioning system (GPS) (thereby allowing MSM controller to determine its location), gyroscope, magnetometer, pedometer, proximity, ultra-violet sensor, etc.) 2673 may be connected as either internal and/or external peripheral devices 2612 via the interface bus I/O 2608 (not pictured) and/or directly via the interface bus 2607. In turn, the transceivers may be connected to antenna(s) 2675, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the MSM controller and beyond through various interfaces. Should processing requirements dictate a greater amount speed and/or capacity, distributed processors (e.g., see Distributed MSM below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the MSM may be achieved by implementing a microcontroller such as CAST's R8051XC2 microcontroller; Intel's MCS 51 (i.e., 8051 microcontroller); and/or the like. Also, to implement certain features of the MSM, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MSM component collection (distributed or otherwise) and/or features may be implemented via the microprocessor and/or via embedded components; e.g., via ASIC, coprocessor, DSP, FPGA, and/or the like. Alternately, some implementations of the MSM may be implemented with embedded components that are configured and used to achieve a variety of features or signal processing.

Depending on the particular implementation, the embedded components may include software solutions, hardware solutions, and/or some combination of both hardware/software solutions. For example, MSM features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the MSM features. A hierarchy of programmable interconnects allow logic blocks to be interconnected as needed by the MSM system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the MSM may be developed on regular FPGAs and then migrated into a fixed version that more resembles ASIC implementations. Alternate or coordinating implementations may migrate MSM controller features to a final ASIC instead of or in addition to FPGAs. Depending on the implementation all of the aforementioned embedded components and microprocessors may be considered the "CPU" and/or "processor" for the MSM.

Power Source

The power source 2686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2686 is connected to at least one of the interconnected subsequent components of the MSM thereby providing an electric current to all subsequent components. In one example, the power source 2686 is connected to the system bus component 2604. In an alternative embodiment, an outside power source 2686 is provided through a connection across the I/O 2608 interface. For example, a USB and/or IEEE 1394 connection carries both data and power across the connection and is therefore a suitable source of power.

Interface Adapters

Interface bus(ses) 2607 may accept, connect, and/or communicate to a number of interface adapters, conventionally although not necessarily in the form of adapter cards, such as but not limited to: input output interfaces (I/O) 2608, storage interfaces 2609, network interfaces 2610, and/or the like. Optionally, cryptographic processor interfaces 2627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X), PCI Express, Personal Computer Memory Card International Association (PCMCIA), and/or the like.

Storage interfaces 2609 may accept, communicate, and/or connect to a number of storage devices such as, but not limited to: storage devices 2614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2610 may accept, communicate, and/or connect to a communications network 2613. Through a communications network 2613, the MSM controller is accessible through remote clients 2633*b* (e.g., computers with web browsers) by users 2633*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed MSM below), architectures may similarly be employed to pool, load balance, and/or otherwise decrease/increase the communicative bandwidth required by the MSM controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 2610 may be used to engage with various communications network types 2613. For example, multiple network interfaces may be employed to allow for the communication over broadcast, multicast, and/or unicast networks.

LOOM Input Output interfaces (I/O) 2608 may accept, communicate, and/or connect to user, peripheral devices 2612 (e.g., input devices 2611), cryptographic processor devices 2628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 2612 may be connected and/or communicate to I/O and/or other facilities of the like such as network interfaces, storage interfaces, directly to the interface bus, system bus, the CPU, and/or the like. Peripheral devices may be external, internal and/or part of the MSM controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 2611 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the MSM controller may be embodied as an embedded, dedicated, and/or monitor-less (i.e., headless) device, wherein access would be provided over a network interface connection.

Cryptographic units such as, but not limited to, microcontrollers, processors 2626, interfaces 2627, and/or devices 2628 may be attached, and/or communicate with the MSM controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 2629. However, memory is a fungible technology and resource, thus, any number of memory embodiments may be employed in lieu of or in concert with one another. It is to be understood that the MSM controller and/or a computer systemization may employ various forms of memory 2629. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2629 will include ROM 2606, RAM 2605, and a storage device 2614. A storage device 2614 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 2629 may contain a collection of program and/or database components and/or data such as, but not limited to: operating system component(s) 2615 (operating system); information server component(s) 2616 (information server); user interface component(s) 2617 (user interface); Web browser component(s) 2618 (Web browser); database(s) 2619; mail server component(s) 2621; mail client component(s) 2622; cryptographic server component(s) 2620 (cryptographic server); the MSM component(s) 2635; and/or the like (i.e., collectively a component collection). These components may be stored and accessed from the storage devices and/or from storage devices accessible through an interface bus. Although non-conventional program components such as those in the component collection, typically, are stored in a local storage device 2614, they may also be loaded and/or stored in memory such as: peripheral devices, RAM, remote storage facilities through a communications network, ROM, various forms of memory, and/or the like.

Operating System

The operating system component 2615 is an executable program component facilitating the operation of the MSM controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Blackberry's QNX; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the MSM controller to communicate with other entities through a communications network 2613. Various communication protocols may be used by the MSM controller as a subcarrier transport mechanism for interaction, such as, but not limited to: multicast, TCP/IP, UDP, unicast, and/or the like.

Information Server

An information server component 2616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MSM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MSM database 2619, operating systems, other program components, user interfaces, Web browsers, and/or the like.

Access to the MSM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MSM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the MSM as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/ cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2618 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the MSM enabled nodes. The combined application may be nugatory on systems employing standard Web browsers.

Mail Server

A mail server component 2621 is a stored program component that is executed by a CPU 2603. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the MSM. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the MSM mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2622 is a stored program component that is executed by a CPU 2603. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2620 is a stored program component that is executed by a CPU 2603, cryptographic processor 2626, cryptographic processor interface 2627, cryptographic processor device 2628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the MSM may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the MSM component to engage in secure transactions if so desired. The cryptographic component facilitates the secure accessing of resources on the MSM and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The MSM Database

The MSM database component 2619 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the MSM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the MSM database is implemented as a data-structure, the use of the MSM database 2619 may be integrated into another component such as the MSM component 2635. Also, the database may be implemented as a mix of data structures, objects, and relational structures. Databases may be consolidated and/or distributed in countless variations (e.g., see Distributed MSM below). Portions of databases, e.g., tables, may be exported and/or imported and thus decentralized and/or integrated.

In one embodiment, the database component 2619 includes several tables 2619a-o:

An accounts table 2619a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 2619b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a MSM);

An devices table 2619c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 2619d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 2619e includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 2619f includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 2619g includes fields such as, but not limited to: transactionID, accountID, assetID s, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 2619h includes fields such as, but not limited to: merchantID, merchantTaxID, merchanteName, merchantContactUserID, accountID, is suerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 2619i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A message indexing table 2619*j* includes fields such as, but not limited to: messageID, messageTeam, messageChannel, messageUser, messageTopics, messageResponses, messageFileIDs, messageThirdPartyMetadata, messageConversationPrimitiveData, messageText, calculatedML_InputData, and/or the like;

A file indexing table 2619*k* includes fields such as, but not limited to: fileID, fileContents, and/or the like;

A MSM message table 2619*l* includes fields such as, but not limited to: messageID, messageContents, messageResponses, and/or the like;

A work graphs table 2619*m* includes fields such as, but not limited to: workGraphID, workGraphTeamID, workGraphUserData, workGraphChannelData, workGraphTopicData, and/or the like;

A ML structure inputs table 2619*n* includes fields such as, but not limited to: ML_StructureInputID, ML_StructureInputTeamID, ML_StructureInputName, ML_StructureInputType, ML_StructureInputData, and/or the like;

A ML structures table 2619*o* includes fields such as, but not limited to: ML_StructureID, ML_StructureTeamID, ML_StructureApplication, ML_StructureType, ML_StructureInputs, ML_StructureOutput, ML_StructureParametersData, and/or the like.

In one embodiment, the MSM database may interact with other database systems. For example, employing a distributed database system, queries and data access by search MSM component may treat the combination of the MSM database, an integrated data security layer database as a single database entity (e.g., see Distributed MSM below).

In one embodiment, user programs may contain various user interface primitives, which may serve to update the MSM. Also, various accounts may require custom database tables depending upon the environments and the types of clients the MSM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2619*a-o*. The MSM may be configured to keep track of various settings, inputs, and parameters via database controllers.

The MSM database may communicate to and/or with other components in a component collection, including itself, and/or facilities of the like. Most frequently, the MSM database communicates with the MSM component, other program components, and/or the like. The database may contain, retain, and provide information regarding other nodes and data.

The MSMs

The MSM component 2635 is a stored program component that is executed by a CPU. In one embodiment, the MSM component incorporates any and/or all combinations of the aspects of the MSM that was discussed in the previous figures. As such, the MSM affects accessing, obtaining and the provision of information, services, transactions, and/or the like across various communications networks. The features and embodiments of the MSM discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the MSM's features and facilities, and in many cases reduce the costs, energy consumption/requirements, and extend the life of MSM's underlying infrastructure; this has the added benefit of making the MSM more reliable. Similarly, many of the features and mechanisms are designed to be easier for users to use and access, thereby broadening the audience that may enjoy/employ and exploit the feature sets of the MSM; such ease of use also helps to increase the reliability of the MSM. In addition, the feature sets include heightened security as noted via the Cryptographic components 2620, 2626, 2628 and throughout, making access to the features and data more reliable and secure.

The MSM transforms message, ranking request inputs, via MSM components (e.g., MD, WGG, MLSG, RD), into work graphs, ML structure input data, ML structure, ranking response outputs.

The MSM component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the MSM server employs a cryptographic server to encrypt and decrypt communications. The MSM component may communicate to and/or with other components in a component collection, including itself, and/or facilities of the like. Most frequently, the MSM component communicates with the MSM database, operating systems, other program components, and/or the like. The MSM may contain, communicate, generate, obtain, and/or provide program component, system, user, and/or data communications, requests, and/or responses.

Distributed MSMs

The structure and/or operation of any of the MSM node controller components may be combined, consolidated, and/ or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the MSM controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for MSM controller and/or MSM component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the MSM controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address='192.168.0.100';
$port=255;
// create a server-side SSL socket, listen for/accept incom-
    ing communication $sock=socket_create(AF_INET,
    SOCK_STREAM, 0);
socket_bind($sock, $address, $port) or die('Could not
    bind to address');
socket_listen($sock);
$client=socket_accept($sock);
// read input data from client device in 1024 byte blocks
    until end of message do {
    $input=" ";
    $input=socket_read($client, 1024);
    $data.=$input;
} while($input !=" ");
// parse data to extract variables
$obj=json_decode($data, true);
// store input data in a database
```

```
mysql_connect("201.408.185.132",$DBserver,$pass-
    word); // access database server
mysql_select("CLIENT_DB.SQL"); // select database to
    append
mysql_query("INSERT INTO UserTable (transmission)
    VALUES ($data)"); // add data to UserTable table in a
    CLIENT database
mysql_close("CLIENT_DB.SQL"); // close connection to
    database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments include:

1. A message indexing apparatus, comprising:
   a memory;
   a component collection in the memory, including:
     a metadata determining component;
   a processor disposed in communication with the memory, and configured to issue a plurality of processing instructions from the component collection stored in the memory,
     wherein the processor issues instructions from the metadata determining component, stored in the memory, to:
       obtain, via at least one processor, a metadata access control carrying message;
       determine, via at least one processor, message access control data associated with the metadata access control carrying message by analyzing metadata associated with the metadata access control carrying message, wherein the message access control data includes group level access control data and channel level access control data;
       determine, via at least one processor, a user identifier of the user who sent the metadata access control carrying message by analyzing metadata associated with the metadata access control carrying message;
       determine, via at least one processor, a set of topics associated with the metadata access control carrying message by analyzing message contents of the metadata access control carrying message;
       generate, via at least one processor, a group level message index for the metadata access control carrying message, wherein the group level message index's access control data corresponds to the group level access control data, wherein the metadata access control carrying message is indexed using the determined message access control data, user identifier, and set of topics such that the group level message index facilitates searching using the indexed data.

2. The apparatus of embodiment 1, further, comprising:
   the processor issues instructions from the metadata determining component, stored in the memory, to:
     determine, via at least one processor, a set of responses associated with the metadata access control carrying message;
     generate, via at least one processor, response index data for the metadata access control carrying message; and
     generate, via at least one processor, the group level message index for the metadata access control carrying message such that the metadata access control carrying message is also indexed using the generated response index data.

3. The apparatus of embodiment 2, wherein a response is any of: a reaction to the metadata access control carrying message, clicking on a link in the metadata access control carrying message, replying to the metadata access control carrying message, downloading a file associated with the metadata access control carrying message, sharing the metadata access control carrying message to another channel, pinning the metadata access control carrying message, starring the metadata access control carrying message.

4. The apparatus of embodiment 2, wherein the response index data includes a set of user identifiers of users who responded to the metadata access control carrying message.

5. The apparatus of embodiment 2, wherein the response index data includes a social score generated for the metadata access control carrying message based on the set of responses.

6. The apparatus of embodiment 1, further, comprising:
   the processor issues instructions from the metadata determining component, stored in the memory, to:
     determine, via at least one processor, a set of files associated with the metadata access control carrying message by analyzing metadata associated with the metadata access control carrying message;
     generate, via at least one processor, the group level message index for the metadata access control carrying message such that the metadata access control carrying message is also indexed using the set of files; and
     generate, via at least one processor, a group level file index for the set of files, wherein the group level file index's access control data corresponds to the group level access control data.

7. The apparatus of embodiment 1, further, comprising:
   the processor issues instructions from the metadata determining component, stored in the memory, to:
     determine, via at least one processor, third party metadata associated with the metadata access control carrying message by analyzing metadata associated with the metadata access control carrying message; and
     generate, via at least one processor, the group level message index for the metadata access control carrying message such that the metadata access control carrying message is also indexed using the third party metadata.

8. The apparatus of embodiment 1, further, comprising:
   the processor issues instructions from the metadata determining component, stored in the memory, to:
     determine, via at least one processor, a conversation primitive associated with the metadata access control carrying message; and
     generate, via at least one processor, the group level message index for the metadata access control carrying message such that the metadata access control carrying message is indexed using the conversation primitive.

9. The apparatus of embodiment 8, wherein the conversation primitive is the metadata access control carrying message, a specified number of preceding metadata access control carrying messages and a specified number of following metadata access control carrying messages.

10. The apparatus of embodiment 8, wherein the conversation primitive is the metadata access control carrying message and a set of other metadata access control carrying messages determined based on message send time proximity to the metadata access control carrying message.

11. The apparatus of embodiment 1, wherein the group level access control data is associated with an organization group.

12. The apparatus of embodiment 1, wherein the group level access control data is associated with a team group.

13. The apparatus of embodiment 1, further, comprising:
a ranking determining component in the component collection, and
the processor issues instructions from the ranking determining component, stored in the memory, to:
obtain, via at least one processor, a ranking request associated with a ranking application; and
determine, via at least one processor, that the metadata access control carrying message is relevant to the ranking request based on analysis of the associated indexed metadata.

14. The apparatus of embodiment 13, wherein the ranking request is a search query from a user who is allowed access to the metadata access control carrying message.

15. The apparatus of embodiment 13, wherein the ranking application is any of: ranking metadata access control carrying messages, ranking people, ranking channels.

16. A processor-readable message indexing non-transient physical medium storing processor-executable components, the components, comprising:
a component collection stored in the medium, including:
a metadata determining component;
wherein the metadata determining component, stored in the medium, includes processor-issuable instructions to:
obtain, via at least one processor, a metadata access control carrying message;
determine, via at least one processor, message access control data associated with the metadata access control carrying message by analyzing metadata associated with the metadata access control carrying message, wherein the message access control data includes group level access control data and channel level access control data;
determine, via at least one processor, a user identifier of the user who sent the metadata access control carrying message by analyzing metadata associated with the metadata access control carrying message;
determine, via at least one processor, a set of topics associated with the metadata access control carrying message by analyzing message contents of the metadata access control carrying message;
generate, via at least one processor, a group level message index for the metadata access control carrying message, wherein the group level message index's access control data corresponds to the group level access control data, wherein the metadata access control carrying message is indexed using the determined message access control data, user identifier, and set of topics such that the group level message index facilitates searching using the indexed data.

17. The medium of embodiment 16, further, comprising:
the metadata determining component, stored in the medium, includes processor-issuable instructions to:
determine, via at least one processor, a set of responses associated with the metadata access control carrying message;
generate, via at least one processor, response index data for the metadata access control carrying message; and
generate, via at least one processor, the group level message index for the metadata access control carrying message such that the metadata access control carrying message is also indexed using the generated response index data.

18. The medium of embodiment 17, wherein a response is any of: a reaction to the metadata access control carrying message, clicking on a link in the metadata access control carrying message, replying to the metadata access control carrying message, downloading a file associated with the metadata access control carrying message, sharing the metadata access control carrying message to another channel, pinning the metadata access control carrying message, starring the metadata access control carrying message.

19. The medium of embodiment 17, wherein the response index data includes a set of user identifiers of users who responded to the metadata access control carrying message.

20. The medium of embodiment 17, wherein the response index data includes a social score generated for the metadata access control carrying message based on the set of responses.

21. The medium of embodiment 16, further, comprising:
the metadata determining component, stored in the medium, includes processor-issuable instructions to:
determine, via at least one processor, a set of files associated with the metadata access control carrying message by analyzing metadata associated with the metadata access control carrying message;
generate, via at least one processor, the group level message index for the metadata access control carrying message such that the metadata access control carrying message is also indexed using the set of files; and
generate, via at least one processor, a group level file index for the set of files, wherein the group level file index's access control data corresponds to the group level access control data.

22. The medium of embodiment 16, further, comprising:
the metadata determining component, stored in the medium, includes processor-issuable instructions to:
determine, via at least one processor, third party metadata associated with the metadata access control carrying message by analyzing metadata associated with the metadata access control carrying message; and
generate, via at least one processor, the group level message index for the metadata access control carrying message such that the metadata access control carrying message is also indexed using the third party metadata.

23. The medium of embodiment 16, further, comprising:
the metadata determining component, stored in the medium, includes processor-issuable instructions to:

determine, via at least one processor, a conversation primitive associated with the metadata access control carrying message; and generate, via at least one processor, the group level message index for the metadata access control carrying message such that the metadata access control carrying message is indexed using the conversation primitive.

24. The medium of embodiment 23, wherein the conversation primitive is the metadata access control carrying message, a specified number of preceding metadata access control carrying messages and a specified number of following metadata access control carrying messages.

25. The medium of embodiment 23, wherein the conversation primitive is the metadata access control carrying message and a set of other metadata access control carrying messages determined based on message send time proximity to the metadata access control carrying message.

26. The medium of embodiment 16, wherein the group level access control data is associated with an organization group.

27. The medium of embodiment 16, wherein the group level access control data is associated with a team group.

28. The medium of embodiment 16, further, comprising:
a ranking determining component in the component collection;
wherein the ranking determining component, stored in the medium, includes processor-issuable instructions to:
obtain, via at least one processor, a ranking request associated with a ranking application; and
determine, via at least one processor, that the metadata access control carrying message is relevant to the ranking request based on analysis of the associated indexed metadata.

29. The medium of embodiment 28, wherein the ranking request is a search query from a user who is allowed access to the metadata access control carrying message.

30. The medium of embodiment 28, wherein the ranking application is any of: ranking metadata access control carrying messages, ranking people, ranking channels.

31. A processor-implemented message indexing system, comprising:
a metadata determining component means, to:
obtain, via at least one processor, a metadata access control carrying message;
determine, via at least one processor, message access control data associated with the metadata access control carrying message by analyzing metadata associated with the metadata access control carrying message, wherein the message access control data includes group level access control data and channel level access control data;
determine, via at least one processor, a user identifier of the user who sent the metadata access control carrying message by analyzing metadata associated with the metadata access control carrying message;
determine, via at least one processor, a set of topics associated with the metadata access control carrying message by analyzing message contents of the metadata access control carrying message;
generate, via at least one processor, a group level message index for the metadata access control carrying message, wherein the group level message index's access control data corresponds to the group level access control data, wherein the metadata access control carrying message is indexed using the determined message access control data, user identifier, and set of topics such that the group level message index facilitates searching using the indexed data.

32. The system of embodiment 31, further, comprising:
the metadata determining component means, to:
determine, via at least one processor, a set of responses associated with the metadata access control carrying message;
generate, via at least one processor, response index data for the metadata access control carrying message; and
generate, via at least one processor, the group level message index for the metadata access control carrying message such that the metadata access control carrying message is also indexed using the generated response index data.

33. The system of embodiment 32, wherein a response is any of: a reaction to the metadata access control carrying message, clicking on a link in the metadata access control carrying message, replying to the metadata access control carrying message, downloading a file associated with the metadata access control carrying message, sharing the metadata access control carrying message to another channel, pinning the metadata access control carrying message, starring the metadata access control carrying message.

34. The system of embodiment 32, wherein the response index data includes a set of user identifiers of users who responded to the metadata access control carrying message.

35. The system of embodiment 32, wherein the response index data includes a social score generated for the metadata access control carrying message based on the set of responses.

36. The system of embodiment 31, further, comprising:
the metadata determining component means, to:
determine, via at least one processor, a set of files associated with the metadata access control carrying message by analyzing metadata associated with the metadata access control carrying message;
generate, via at least one processor, the group level message index for the metadata access control carrying message such that the metadata access control carrying message is also indexed using the set of files; and
generate, via at least one processor, a group level file index for the set of files, wherein the group level file index's access control data corresponds to the group level access control data.

37. The system of embodiment 31, further, comprising:
the metadata determining component means, to:
determine, via at least one processor, third party metadata associated with the metadata access control carrying message by analyzing metadata associated with the metadata access control carrying message; and
generate, via at least one processor, the group level message index for the metadata access control carrying message such that the metadata access control carrying message is also indexed using the third party metadata.

38. The system of embodiment 31, further, comprising:
the metadata determining component means, to:
determine, via at least one processor, a conversation primitive associated with the metadata access control carrying message; and generate, via at least one processor, the group level message index for the metadata access control carrying message such that the metadata access control carrying message is indexed using the conversation primitive.

39. The system of embodiment 38, wherein the conversation primitive is the metadata access control carrying message, a specified number of preceding metadata access control carrying messages and a specified number of following metadata access control carrying messages.

40. The system of embodiment 38, wherein the conversation primitive is the metadata access control carrying message and a set of other metadata access control carrying messages determined based on message send time proximity to the metadata access control carrying message.

41. The system of embodiment 31, wherein the group level access control data is associated with an organization group.

42. The system of embodiment 31, wherein the group level access control data is associated with a team group.

43. The system of embodiment 31, further, comprising:
a ranking determining component means, to:
obtain, via at least one processor, a ranking request associated with a ranking application; and
determine, via at least one processor, that the metadata access control carrying message is relevant to the ranking request based on analysis of the associated indexed metadata.

44. The system of embodiment 43, wherein the ranking request is a search query from a user who is allowed access to the metadata access control carrying message.

45. The system of embodiment 43, wherein the ranking application is any of: ranking metadata access control carrying messages, ranking people, ranking channels.

46. A processor-implemented message indexing method, comprising:
executing processor-implemented metadata determining component instructions to:
obtain, via at least one processor, a metadata access control carrying message;
determine, via at least one processor, message access control data associated with the metadata access control carrying message by analyzing metadata associated with the metadata access control carrying message, wherein the message access control data includes group level access control data and channel level access control data;
determine, via at least one processor, a user identifier of the user who sent the metadata access control carrying message by analyzing metadata associated with the metadata access control carrying message;
determine, via at least one processor, a set of topics associated with the metadata access control carrying message by analyzing message contents of the metadata access control carrying message;
generate, via at least one processor, a group level message index for the metadata access control carrying message, wherein the group level message index's access control data corresponds to the group level access control data, wherein the metadata access control carrying message is indexed using the determined message access control data, user identifier, and set of topics such that the group level message index facilitates searching using the indexed data.

47. The method of embodiment 46, further, comprising:
executing processor-implemented metadata determining component instructions to:
determine, via at least one processor, a set of responses associated with the metadata access control carrying message;
generate, via at least one processor, response index data for the metadata access control carrying message; and
generate, via at least one processor, the group level message index for the metadata access control carrying message such that the metadata access control carrying message is also indexed using the generated response index data.

48. The method of embodiment 47, wherein a response is any of: a reaction to the metadata access control carrying message, clicking on a link in the metadata access control carrying message, replying to the metadata access control carrying message, downloading a file associated with the metadata access control carrying message, sharing the metadata access control carrying message to another channel, pinning the metadata access control carrying message, starring the metadata access control carrying message.

49. The method of embodiment 47, wherein the response index data includes a set of user identifiers of users who responded to the metadata access control carrying message.

50. The method of embodiment 47, wherein the response index data includes a social score generated for the metadata access control carrying message based on the set of responses.

51. The method of embodiment 46, further, comprising:
executing processor-implemented metadata determining component instructions to:
determine, via at least one processor, a set of files associated with the metadata access control carrying message by analyzing metadata associated with the metadata access control carrying message;
generate, via at least one processor, the group level message index for the metadata access control carrying message such that the metadata access control carrying message is also indexed using the set of files; and
generate, via at least one processor, a group level file index for the set of files, wherein the group level file index's access control data corresponds to the group level access control data.

52. The method of embodiment 46, further, comprising:
executing processor-implemented metadata determining component instructions to:
determine, via at least one processor, third party metadata associated with the metadata access control carrying message by analyzing metadata associated with the metadata access control carrying message; and
generate, via at least one processor, the group level message index for the metadata access control carrying message such that the metadata access control carrying message is also indexed using the third party metadata.

53. The method of embodiment 46, further, comprising:
executing processor-implemented metadata determining component instructions to:
determine, via at least one processor, a conversation primitive associated with the metadata access control carrying message; and generate, via at least one processor, the group level message index for the metadata access control carrying message such that the metadata access control carrying message is indexed using the conversation primitive.

54. The method of embodiment 53, wherein the conversation primitive is the metadata access control carrying message, a specified number of preceding metadata access control carrying messages and a specified number of following metadata access control carrying messages.

55. The method of embodiment 53, wherein the conversation primitive is the metadata access control carrying message and a set of other metadata access control carrying messages determined based on message send time proximity to the metadata access control carrying message.

56. The method of embodiment 46, wherein the group level access control data is associated with an organization group.

57. The method of embodiment 46, wherein the group level access control data is associated with a team group.

58. The method of embodiment 46, further, comprising:
executing processor-implemented ranking determining component instructions to:
obtain, via at least one processor, a ranking request associated with a ranking application; and
determine, via at least one processor, that the metadata access control carrying message is relevant to the ranking request based on analysis of the associated indexed metadata.

59. The method of embodiment 58, wherein the ranking request is a search query from a user who is allowed access to the metadata access control carrying message.

60. The method of embodiment 58, wherein the ranking application is any of: ranking metadata access control carrying messages, ranking people, ranking channels.

101. A work graph generating apparatus, comprising:
a memory;
a component collection in the memory, including:
a work graph generating component;
a processor disposed in communication with the memory, and configured to issue a plurality of processing instructions from the component collection stored in the memory,
wherein the processor issues instructions from the work graph generating component, stored in the memory, to:
obtain, via at least one processor, a work graph generation request, wherein the work graph generation request includes group level access control data;
determine, via at least one processor, a set of metadata access control carrying messages, wherein access control data associated with metadata access control carrying messages in the set of metadata access control carrying messages corresponds to the group level access control data;
determine, via at least one processor, a set of users, wherein access control data associated with users in the set of users corresponds to the group level access control data;
calculate, via at least one processor, from the perspective of each user in the set of users, a user priority score for each of the other users in the set of users, wherein a user priority score from the perspective of a first user for a second user is calculated based on the number of metadata access control carrying messages, in the set of metadata access control carrying messages, associated with the second user that were user-pertinent to the first user;
determine, via at least one processor, a set of channels, wherein access control data associated with channels in the set of channels corresponds to the group level access control data;
calculate, via at least one processor, from the perspective of each user in the set of users, a channel priority score for each of the channels in the set of channels, wherein a channel priority score from the perspective of a user for a channel is calculated based on the number of metadata access control carrying messages, in the set of metadata access control carrying messages, associated with that channel that were channel-pertinent to that user;
determine, via at least one processor, a set of topics associated with the set of metadata access control carrying messages;
calculate, via at least one processor, from the perspective of each user in the set of users, a topic priority score for each of the topics in the set of topics, wherein a topic priority score from the perspective of a user for a topic is calculated based on the number of metadata access control carrying messages, in the set of metadata access control carrying messages, associated with that topic that were topic-pertinent to that user; and
generate, via at least one processor, a work graph data structure that includes a set of user objects corresponding to the set of users, wherein a user object for a user includes data regarding the calculated user priority scores, channel priority scores, and topic priority scores associated with that user, and wherein the work graph data structure is associated with group level access control data.

102. The apparatus of embodiment 101, wherein the group level access control data is associated with an organization group.

103. The apparatus of embodiment 101, wherein the group level access control data is associated with a team group.

104. The apparatus of embodiment 101, wherein the set of metadata access control carrying messages is filtered to exclude metadata access control carrying messages sent outside a specified time period.

105. The apparatus of embodiment 101, wherein the user-pertinent metadata access control carrying messages are any of: metadata access control carrying messages from the second user read by the first user, metadata access control carrying messages from the first user to the second user, metadata access control carrying messages from the second user responded to by the first user.

106. The apparatus of embodiment 105, wherein a response to a metadata access control carrying message is any of: a reaction to the metadata access control carrying message, clicking on a link in the metadata access control carrying message, replying to the metadata access control carrying message, downloading a file associated with the metadata access control carrying message, sharing the metadata access control carrying message to another channel, pinning the metadata access control carrying message, starring the metadata access control carrying message.

107. The apparatus of embodiment 101, wherein the channel-pertinent metadata access control carrying messages associated with a channel for a user are any of: metadata access control carrying messages sent by that user in that channel, metadata access control carrying messages read by that user in that channel, metadata access control carrying messages in that channel responded to by that user.

108. The apparatus of embodiment 101, wherein the topic-pertinent metadata access control carrying messages associated with a topic for a user are any of: metadata access control carrying messages sent by that user regarding that topic, metadata access control carrying messages read by that user regarding that topic, metadata access control carrying messages regarding that topic responded to by that user.

109. The apparatus of embodiment 101, further, comprising:
the processor issues instructions from the work graph generating component, stored in the memory, to:
calculate, via at least one processor, from the perspective of each channel in the set of channels, a channel similarity score for each of the other channels in the set of channels, wherein a channel similarity score from the perspective of a first channel for a second channel is calculated based on the number of common users, in the set of users, that the first channel and the second channel share;
wherein the generated work graph structure includes a set of channel objects corresponding to the set of channels, wherein a channel object for a channel includes data regarding the calculated channel similarity scores associated with that channel.

110. The apparatus of embodiment 101, further, comprising:
the processor issues instructions from the work graph generating component, stored in the memory, to:
calculate, via at least one processor, from the perspective of each topic in the set of topics, a topic similarity score for each of the other topics in the set of topics;
wherein the generated work graph structure includes a set of topic objects corresponding to the set of topics, wherein a topic object for a topic includes data regarding the calculated topic similarity scores associated with that topic.

111. The apparatus of embodiment 101, wherein user priority scores between two users in the set of users are asymmetric.

112. The apparatus of embodiment 101, wherein user priority scores between two users in the set of users are symmetric.

113. The apparatus of embodiment 101, further, comprising:
a machine learning structure generating component in the component collection, and
the processor issues instructions from the machine learning structure generating component, stored in the memory, to:
determine, via at least one processor, a ranking application for which to generate a machine learning structure;
determine, via at least one processor, a set of inputs for the machine learning structure based on the ranking application, wherein at least some of the inputs in the set of inputs correspond to work graph data stored in the work graph data structure;
train, via at least one processor, the machine learning structure using at least some of the work graph data stored in the work graph data structure; and
store, via at least one processor, machine learning structure parameters of the trained machine learning structure, wherein the trained machine learning structure is associated with group level access control data.

114. The apparatus of embodiment 113, wherein the machine learning structure is a neural network.

115. The apparatus of embodiment 113, wherein the ranking application is any of: ranking metadata access control carrying messages, ranking people, ranking channels.

116. A processor-readable work graph generating non-transient physical medium storing processor-executable components, the components, comprising:
a component collection stored in the medium, including:
a work graph generating component;
wherein the work graph generating component, stored in the medium, includes processor-issuable instructions to:
obtain, via at least one processor, a work graph generation request, wherein the work graph generation request includes group level access control data;
determine, via at least one processor, a set of metadata access control carrying messages, wherein access control data associated with metadata access control carrying messages in the set of metadata access control carrying messages corresponds to the group level access control data;
determine, via at least one processor, a set of users, wherein access control data associated with users in the set of users corresponds to the group level access control data;
calculate, via at least one processor, from the perspective of each user in the set of users, a user priority score for each of the other users in the set of users, wherein a user priority score from the perspective of a first user for a second user is calculated based on the number of metadata access control carrying messages, in the set of metadata access control carrying messages, associated with the second user that were user-pertinent to the first user;
determine, via at least one processor, a set of channels, wherein access control data associated with channels in the set of channels corresponds to the group level access control data;
calculate, via at least one processor, from the perspective of each user in the set of users, a channel priority score for each of the channels in the set of channels, wherein a channel priority score from the perspective of a user for a channel is calculated based on the number of metadata access control carrying messages, in the set of metadata access control carrying messages, associated with that channel that were channel-pertinent to that user;
determine, via at least one processor, a set of topics associated with the set of metadata access control carrying messages;
calculate, via at least one processor, from the perspective of each user in the set of users, a topic priority score for each of the topics in the set of topics, wherein a topic priority score from the perspective of a user for a topic is calculated based on the number of metadata access control carrying messages, in the set of metadata access control carrying messages, associated with that topic that were topic-pertinent to that user; and
generate, via at least one processor, a work graph data structure that includes a set of user objects corresponding to the set of users, wherein a user object for a user includes data regarding the calculated user priority scores, channel priority scores, and topic priority scores associated with that user, and wherein the work graph data structure is associated with group level access control data.

117. The medium of embodiment 116, wherein the group level access control data is associated with an organization group.

118. The medium of embodiment 116, wherein the group level access control data is associated with a team group.

119. The medium of embodiment 116, wherein the set of metadata access control carrying messages is filtered to exclude metadata access control carrying messages sent outside a specified time period.

120. The medium of embodiment 116, wherein the user-pertinent metadata access control carrying messages are any of: metadata access control carrying messages from the second user read by the first user, metadata access control carrying messages from the first user to the second user, metadata access control carrying messages from the second user responded to by the first user.

121. The medium of embodiment 120, wherein a response to a metadata access control carrying message is any of: a reaction to the metadata access control carrying message, clicking on a link in the metadata access control carrying message, replying to the metadata access control carrying message, downloading a file associated with the metadata access control carrying message, sharing the metadata access control carrying message to another channel, pinning the metadata access control carrying message, starring the metadata access control carrying message.

122. The medium of embodiment 116, wherein the channel-pertinent metadata access control carrying messages associated with a channel for a user are any of: metadata access control carrying messages sent by that user in that channel, metadata access control carrying messages read by that user in that channel, metadata access control carrying messages in that channel responded to by that user.

123. The medium of embodiment 116, wherein the topic-pertinent metadata access control carrying messages associated with a topic for a user are any of: metadata access control carrying messages sent by that user regarding that topic, metadata access control carrying messages read by that user regarding that topic, metadata access control carrying messages regarding that topic responded to by that user.

124. The medium of embodiment 116, further, comprising:
the work graph generating component, stored in the medium, includes processor-issuable instructions to:
calculate, via at least one processor, from the perspective of each channel in the set of channels, a channel similarity score for each of the other channels in the set of channels, wherein a channel similarity score from the perspective of a first channel for a second channel is calculated based on the number of common users, in the set of users, that the first channel and the second channel share;
wherein the generated work graph structure includes a set of channel objects corresponding to the set of channels, wherein a channel object for a channel includes data regarding the calculated channel similarity scores associated with that channel.

125. The medium of embodiment 116, further, comprising:
the work graph generating component, stored in the medium, includes processor-issuable instructions to:
calculate, via at least one processor, from the perspective of each topic in the set of topics, a topic similarity score for each of the other topics in the set of topics;
wherein the generated work graph structure includes a set of topic objects corresponding to the set of topics, wherein a topic object for a topic includes data regarding the calculated topic similarity scores associated with that topic.

126. The medium of embodiment 116, wherein user priority scores between two users in the set of users are asymmetric.

127. The medium of embodiment 116, wherein user priority scores between two users in the set of users are symmetric.

128. The medium of embodiment 116, further, comprising:
a machine learning structure generating component in the component collection;
wherein the machine learning structure generating component, stored in the medium, includes processor-issuable instructions to:
determine, via at least one processor, a ranking application for which to generate a machine learning structure;
determine, via at least one processor, a set of inputs for the machine learning structure based on the ranking application, wherein at least some of the inputs in the set of inputs correspond to work graph data stored in the work graph data structure;
train, via at least one processor, the machine learning structure using at least some of the work graph data stored in the work graph data structure; and
store, via at least one processor, machine learning structure parameters of the trained machine learning structure, wherein the trained machine learning structure is associated with group level access control data.

129. The medium of embodiment 128, wherein the machine learning structure is a neural network.

130. The medium of embodiment 128, wherein the ranking application is any of: ranking metadata access control carrying messages, ranking people, ranking channels.

131. A processor-implemented work graph generating system, comprising:
a work graph generating component means, to:
obtain, via at least one processor, a work graph generation request, wherein the work graph generation request includes group level access control data;
determine, via at least one processor, a set of metadata access control carrying messages, wherein access control data associated with metadata access control carrying messages in the set of metadata access control carrying messages corresponds to the group level access control data;
determine, via at least one processor, a set of users, wherein access control data associated with users in the set of users corresponds to the group level access control data;
calculate, via at least one processor, from the perspective of each user in the set of users, a user priority score for each of the other users in the set of users, wherein a user priority score from the perspective of a first user for a second user is calculated based on the number of metadata access control carrying messages, in the set of metadata access control carrying messages, associated with the second user that were user-pertinent to the first user;
determine, via at least one processor, a set of channels, wherein access control data associated with channels in the set of channels corresponds to the group level access control data;

calculate, via at least one processor, from the perspective of each user in the set of users, a channel priority score for each of the channels in the set of channels, wherein a channel priority score from the perspective of a user for a channel is calculated based on the number of metadata access control carrying messages, in the set of metadata access control carrying messages, associated with that channel that were channel-pertinent to that user;

determine, via at least one processor, a set of topics associated with the set of metadata access control carrying messages;

calculate, via at least one processor, from the perspective of each user in the set of users, a topic priority score for each of the topics in the set of topics, wherein a topic priority score from the perspective of a user for a topic is calculated based on the number of metadata access control carrying messages, in the set of metadata access control carrying messages, associated with that topic that were topic-pertinent to that user; and generate, via at least one processor, a work graph data structure that includes a set of user objects corresponding to the set of users, wherein a user object for a user includes data regarding the calculated user priority scores, channel priority scores, and topic priority scores associated with that user, and wherein the work graph data structure is associated with group level access control data.

132. The system of embodiment 131, wherein the group level access control data is associated with an organization group.

133. The system of embodiment 131, wherein the group level access control data is associated with a team group.

134. The system of embodiment 131, wherein the set of metadata access control carrying messages is filtered to exclude metadata access control carrying messages sent outside a specified time period.

135. The system of embodiment 131, wherein the user-pertinent metadata access control carrying messages are any of: metadata access control carrying messages from the second user read by the first user, metadata access control carrying messages from the first user to the second user, metadata access control carrying messages from the second user responded to by the first user.

136. The system of embodiment 135, wherein a response to a metadata access control carrying message is any of: a reaction to the metadata access control carrying message, clicking on a link in the metadata access control carrying message, replying to the metadata access control carrying message, downloading a file associated with the metadata access control carrying message, sharing the metadata access control carrying message to another channel, pinning the metadata access control carrying message, starring the metadata access control carrying message.

137. The system of embodiment 131, wherein the channel-pertinent metadata access control carrying messages associated with a channel for a user are any of: metadata access control carrying messages sent by that user in that channel, metadata access control carrying messages read by that user in that channel, metadata access control carrying messages in that channel responded to by that user.

138. The system of embodiment 131, wherein the topic-pertinent metadata access control carrying messages associated with a topic for a user are any of: metadata access control carrying messages sent by that user regarding that topic, metadata access control carrying messages read by that user regarding that topic, metadata access control carrying messages regarding that topic responded to by that user.

139. The system of embodiment 131, further, comprising:
the work graph generating component means, to:
calculate, via at least one processor, from the perspective of each channel in the set of channels, a channel similarity score for each of the other channels in the set of channels, wherein a channel similarity score from the perspective of a first channel for a second channel is calculated based on the number of common users, in the set of users, that the first channel and the second channel share;
wherein the generated work graph structure includes a set of channel objects corresponding to the set of channels, wherein a channel object for a channel includes data regarding the calculated channel similarity scores associated with that channel.

140. The system of embodiment 131, further, comprising:
the work graph generating component means, to:
calculate, via at least one processor, from the perspective of each topic in the set of topics, a topic similarity score for each of the other topics in the set of topics;
wherein the generated work graph structure includes a set of topic objects corresponding to the set of topics, wherein a topic object for a topic includes data regarding the calculated topic similarity scores associated with that topic.

141. The system of embodiment 131, wherein user priority scores between two users in the set of users are asymmetric.

142. The system of embodiment 131, wherein user priority scores between two users in the set of users are symmetric.

143. The system of embodiment 131, further, comprising:
a machine learning structure generating component means, to:
determine, via at least one processor, a ranking application for which to generate a machine learning structure;
determine, via at least one processor, a set of inputs for the machine learning structure based on the ranking application, wherein at least some of the inputs in the set of inputs correspond to work graph data stored in the work graph data structure;
train, via at least one processor, the machine learning structure using at least some of the work graph data stored in the work graph data structure; and
store, via at least one processor, machine learning structure parameters of the trained machine learning structure, wherein the trained machine learning structure is associated with group level access control data.

144. The system of embodiment 143, wherein the machine learning structure is a neural network.

145. The system of embodiment 143, wherein the ranking application is any of: ranking metadata access control carrying messages, ranking people, ranking channels.

146. A processor-implemented work graph generating method, comprising:
executing processor-implemented work graph generating component instructions to:
obtain, via at least one processor, a work graph generation request, wherein the work graph generation request includes group level access control data;

determine, via at least one processor, a set of metadata access control carrying messages, wherein access control data associated with metadata access control carrying messages in the set of metadata access control carrying messages corresponds to the group level access control data;

determine, via at least one processor, a set of users, wherein access control data associated with users in the set of users corresponds to the group level access control data;

calculate, via at least one processor, from the perspective of each user in the set of users, a user priority score for each of the other users in the set of users, wherein a user priority score from the perspective of a first user for a second user is calculated based on the number of metadata access control carrying messages, in the set of metadata access control carrying messages, associated with the second user that were user-pertinent to the first user;

determine, via at least one processor, a set of channels, wherein access control data associated with channels in the set of channels corresponds to the group level access control data;

calculate, via at least one processor, from the perspective of each user in the set of users, a channel priority score for each of the channels in the set of channels, wherein a channel priority score from the perspective of a user for a channel is calculated based on the number of metadata access control carrying messages, in the set of metadata access control carrying messages, associated with that channel that were channel-pertinent to that user;

determine, via at least one processor, a set of topics associated with the set of metadata access control carrying messages;

calculate, via at least one processor, from the perspective of each user in the set of users, a topic priority score for each of the topics in the set of topics, wherein a topic priority score from the perspective of a user for a topic is calculated based on the number of metadata access control carrying messages, in the set of metadata access control carrying messages, associated with that topic that were topic-pertinent to that user; and generate, via at least one processor, a work graph data structure that includes a set of user objects corresponding to the set of users, wherein a user object for a user includes data regarding the calculated user priority scores, channel priority scores, and topic priority scores associated with that user, and wherein the work graph data structure is associated with group level access control data.

147. The method of embodiment 146, wherein the group level access control data is associated with an organization group.

148. The method of embodiment 146, wherein the group level access control data is associated with a team group.

149. The method of embodiment 146, wherein the set of metadata access control carrying messages is filtered to exclude metadata access control carrying messages sent outside a specified time period.

150. The method of embodiment 146, wherein the user-pertinent metadata access control carrying messages are any of: metadata access control carrying messages from the second user read by the first user, metadata access control carrying messages from the first user to the second user, metadata access control carrying messages from the second user responded to by the first user.

151. The method of embodiment 150, wherein a response to a metadata access control carrying message is any of: a reaction to the metadata access control carrying message, clicking on a link in the metadata access control carrying message, replying to the metadata access control carrying message, downloading a file associated with the metadata access control carrying message, sharing the metadata access control carrying message to another channel, pinning the metadata access control carrying message, starring the metadata access control carrying message.

152. The method of embodiment 146, wherein the channel-pertinent metadata access control carrying messages associated with a channel for a user are any of: metadata access control carrying messages sent by that user in that channel, metadata access control carrying messages read by that user in that channel, metadata access control carrying messages 153. The method of embodiment 146, wherein the topic-pertinent metadata access control carrying messages associated with a topic for a user are any of: metadata access control carrying messages sent by that user regarding that topic, metadata access control carrying messages read by that user regarding that topic, metadata access control carrying messages regarding that topic responded to by that user.

154. The method of embodiment 146, further, comprising:
executing processor-implemented work graph generating component instructions to:
calculate, via at least one processor, from the perspective of each channel in the set of channels, a channel similarity score for each of the other channels in the set of channels, wherein a channel similarity score from the perspective of a first channel for a second channel is calculated based on the number of common users, in the set of users, that the first channel and the second channel share;
wherein the generated work graph structure includes a set of channel objects corresponding to the set of channels, wherein a channel object for a channel includes data regarding the calculated channel similarity scores associated with that channel.

155. The method of embodiment 146, further, comprising:
executing processor-implemented work graph generating component instructions to:
calculate, via at least one processor, from the perspective of each topic in the set of topics, a topic similarity score for each of the other topics in the set of topics;
wherein the generated work graph structure includes a set of topic objects corresponding to the set of topics, wherein a topic object for a topic includes data regarding the calculated topic similarity scores associated with that topic.

156. The method of embodiment 146, wherein user priority scores between two users in the set of users are asymmetric.

157. The method of embodiment 146, wherein user priority scores between two users in the set of users are symmetric.

158. The method of embodiment 146, further, comprising:
executing processor-implemented machine learning structure generating component instructions to:
determine, via at least one processor, a ranking application for which to generate a machine learning structure;

determine, via at least one processor, a set of inputs for the machine learning structure based on the ranking application, wherein at least some of the inputs in the set of inputs correspond to work graph data stored in the work graph data structure;

train, via at least one processor, the machine learning structure using at least some of the work graph data stored in the work graph data structure; and store, via at least one processor, machine learning structure parameters of the trained machine learning structure, wherein the trained machine learning structure is associated with group level access control data.

159. The method of embodiment 158, wherein the machine learning structure is a neural network.

160. The method of embodiment 158, wherein the ranking application is any of: ranking metadata access control carrying messages, ranking people, ranking channels.

201. A ranking determining apparatus, comprising:

a memory;

a component collection in the memory, including:

a ranking determining component;

a processor disposed in communication with the memory, and configured to issue a plurality of processing instructions from the component collection stored in the memory, wherein the processor issues instructions from the ranking determining component, stored in the memory, to:

obtain, via at least one processor, a ranking request associated with a user, wherein the ranking request includes group level access control data, wherein access control data associated with the user corresponds to the group level access control data;

determine, via at least one processor, a ranking type associated with the ranking request, wherein the ranking type indicates a ranking application associated with the ranking request;

retrieve, via at least one processor, a machine learning structure for the ranking request based on the group level access control data and the ranking type;

determine, via at least one processor, a set of inputs associated with the machine learning structure, wherein at least some of the inputs in the set of inputs correspond to work graph data;

obtain, via at least one processor, ranking data, wherein the ranking data's access control data corresponds to the group level access control data, wherein the ranking data includes work graph data associated with the user and a set of applicable data items;

determine, via at least one processor, input values for the determined set of inputs for each of the applicable data items;

determine, via at least one processor, a ranking score for each of the applicable data items using the machine learning structure and the corresponding input values;

select, via at least one processor, a set of highest ranked applicable data items; and facilitate, via at least one processor, generating a user interface configured to display information regarding the selected set of highest ranked applicable data items.

202. The apparatus of embodiment 201, wherein the ranking request is generated based on a search request associated with the user.

203. The apparatus of embodiment 202, wherein the ranking request is one of a plurality of ranking requests generated in response to the search request, and wherein each of the plurality of generated ranking requests is associated with a different ranking type.

204. The apparatus of embodiment 201, wherein the ranking application is any of: ranking metadata access control carrying messages, ranking people, ranking channels.

205. The apparatus of embodiment 201, wherein the machine learning structure is a neural network.

206. The apparatus of embodiment 201, wherein the work graph data associated with the user includes user priority scores, channel priority scores, and topic priority scores associated with the user.

207. The apparatus of embodiment 201, wherein the set of applicable data items includes a set of metadata access control carrying messages.

208. The apparatus of embodiment 207, wherein at least some of the input values for the set of metadata access control carrying messages are determined based on analysis of the associated indexed metadata.

209. The apparatus of embodiment 201, wherein the set of applicable data items includes a set of users.

210. The apparatus of embodiment 201, wherein the set of applicable data items includes a set of channels.

211. The apparatus of embodiment 201, wherein the set of highest ranked applicable data items is determined based on a threshold number of highest ranked applicable data items.

212. The apparatus of embodiment 201, wherein the set of highest ranked applicable data items is determined based on a threshold ranking score.

213. The apparatus of embodiment 207, wherein the user interface is configured to display information regarding the highest ranked metadata access control carrying messages in a channel recap format.

214. The apparatus of embodiment 209, wherein the user interface is configured to display information regarding the highest ranked users in a search results format.

215. The apparatus of embodiment 210, wherein the user interface is configured to display information regarding the highest ranked channels in a channel suggestions format.

216. A processor-readable ranking determining non-transient physical medium storing processor-executable components, the components, comprising:

a component collection stored in the medium, including:

a ranking determining component;

wherein the ranking determining component, stored in the medium, includes processor-issuable instructions to:

obtain, via at least one processor, a ranking request associated with a user, wherein the ranking request includes group level access control data, wherein access control data associated with the user corresponds to the group level access control data;

determine, via at least one processor, a ranking type associated with the ranking request, wherein the ranking type indicates a ranking application associated with the ranking request;

retrieve, via at least one processor, a machine learning structure for the ranking request based on the group level access control data and the ranking type;

determine, via at least one processor, a set of inputs associated with the machine learning structure, wherein at least some of the inputs in the set of inputs correspond to work graph data;

obtain, via at least one processor, ranking data, wherein the ranking data's access control data corresponds to the group level access control data, wherein the ranking data includes work graph data associated with the user and a set of applicable data items;

determine, via at least one processor, input values for the determined set of inputs for each of the applicable data items;

determine, via at least one processor, a ranking score for each of the applicable data items using the machine learning structure and the corresponding input values;

select, via at least one processor, a set of highest ranked applicable data items; and facilitate, via at least one processor, generating a user interface configured to display information regarding the selected set of highest ranked applicable data items.

217. The medium of embodiment 216, wherein the ranking request is generated based on a search request associated with the user.

218. The medium of embodiment 217, wherein the ranking request is one of a plurality of ranking requests generated in response to the search request, and wherein each of the plurality of generated ranking requests is associated with a different ranking type.

219. The medium of embodiment 216, wherein the ranking application is any of: ranking metadata access control carrying messages, ranking people, ranking channels.

220. The medium of embodiment 216, wherein the machine learning structure is a neural network.

221. The medium of embodiment 216, wherein the work graph data associated with the user includes user priority scores, channel priority scores, and topic priority scores associated with the user.

222. The medium of embodiment 216, wherein the set of applicable data items includes a set of metadata access control carrying messages.

223. The medium of embodiment 222, wherein at least some of the input values for the set of metadata access control carrying messages are determined based on analysis of the associated indexed metadata.

224. The medium of embodiment 216, wherein the set of applicable data items includes a set of users.

225. The medium of embodiment 216, wherein the set of applicable data items includes a set of channels.

226. The medium of embodiment 216, wherein the set of highest ranked applicable data items is determined based on a threshold number of highest ranked applicable data items.

227. The medium of embodiment 216, wherein the set of highest ranked applicable data items is determined based on a threshold ranking score.

228. The medium of embodiment 222, wherein the user interface is configured to display information regarding the highest ranked metadata access control carrying messages in a channel recap format.

229. The medium of embodiment 224, wherein the user interface is configured to display information regarding the highest ranked users in a search results format.

230. The medium of embodiment 225, wherein the user interface is configured to display information regarding the highest ranked channels in a channel suggestions format.

231. A processor-implemented ranking determining system, comprising:

a ranking determining component means, to:

obtain, via at least one processor, a ranking request associated with a user, wherein the ranking request includes group level access control data, wherein access control data associated with the user corresponds to the group level access control data;

determine, via at least one processor, a ranking type associated with the ranking request, wherein the ranking type indicates a ranking application associated with the ranking request;

retrieve, via at least one processor, a machine learning structure for the ranking request based on the group level access control data and the ranking type;

determine, via at least one processor, a set of inputs associated with the machine learning structure, wherein at least some of the inputs in the set of inputs correspond to work graph data;

obtain, via at least one processor, ranking data, wherein the ranking data's access control data corresponds to the group level access control data, wherein the ranking data includes work graph data associated with the user and a set of applicable data items;

determine, via at least one processor, input values for the determined set of inputs for each of the applicable data items;

determine, via at least one processor, a ranking score for each of the applicable data items using the machine learning structure and the corresponding input values;

select, via at least one processor, a set of highest ranked applicable data items; and facilitate, via at least one processor, generating a user interface configured to display information regarding the selected set of highest ranked applicable data items.

232. The system of embodiment 231, wherein the ranking request is generated based on a search request associated with the user.

233. The system of embodiment 232, wherein the ranking request is one of a plurality of ranking requests generated in response to the search request, and wherein each of the plurality of generated ranking requests is associated with a different ranking type.

234. The system of embodiment 231, wherein the ranking application is any of: ranking metadata access control carrying messages, ranking people, ranking channels.

235. The system of embodiment 231, wherein the machine learning structure is a neural network.

236. The system of embodiment 231, wherein the work graph data associated with the user includes user priority scores, channel priority scores, and topic priority scores associated with the user.

237. The system of embodiment 231, wherein the set of applicable data items includes a set of metadata access control carrying messages.

238. The system of embodiment 237, wherein at least some of the input values for the set of metadata access control carrying messages are determined based on analysis of the associated indexed metadata.

239. The system of embodiment 231, wherein the set of applicable data items includes a set of users.

240. The system of embodiment 231, wherein the set of applicable data items includes a set of channels.

241. The system of embodiment 231, wherein the set of highest ranked applicable data items is determined based on a threshold number of highest ranked applicable data items.

242. The system of embodiment 231, wherein the set of highest ranked applicable data items is determined based on a threshold ranking score.

243. The system of embodiment 237, wherein the user interface is configured to display information regarding the highest ranked metadata access control carrying messages in a channel recap format.

244. The system of embodiment 239, wherein the user interface is configured to display information regarding the highest ranked users in a search results format.

245. The system of embodiment 240, wherein the user interface is configured to display information regarding the highest ranked channels in a channel suggestions format.

246. A processor-implemented ranking determining method, comprising:
executing processor-implemented ranking determining component instructions to:
obtain, via at least one processor, a ranking request associated with a user, wherein the ranking request includes group level access control data, wherein access control data associated with the user corresponds to the group level access control data;
determine, via at least one processor, a ranking type associated with the ranking request, wherein the ranking type indicates a ranking application associated with the ranking request;
retrieve, via at least one processor, a machine learning structure for the ranking request based on the group level access control data and the ranking type;
determine, via at least one processor, a set of inputs associated with the machine learning structure, wherein at least some of the inputs in the set of inputs correspond to work graph data;
obtain, via at least one processor, ranking data, wherein the ranking data's access control data corresponds to the group level access control data, wherein the ranking data includes work graph data associated with the user and a set of applicable data items;
determine, via at least one processor, input values for the determined set of inputs for each of the applicable data items;
determine, via at least one processor, a ranking score for each of the applicable data items using the machine learning structure and the corresponding input values;
select, via at least one processor, a set of highest ranked applicable data items; and
facilitate, via at least one processor, generating a user interface configured to display information regarding the selected set of highest ranked applicable data items.

247. The method of embodiment 246, wherein the ranking request is generated based on a search request associated with the user.

248. The method of embodiment 247, wherein the ranking request is one of a plurality of ranking requests generated in response to the search request, and wherein each of the plurality of generated ranking requests is associated with a different ranking type.

249. The method of embodiment 246, wherein the ranking application is any of: ranking metadata access control carrying messages, ranking people, ranking channels.

250. The method of embodiment 246, wherein the machine learning structure is a neural network.

251. The method of embodiment 246, wherein the work graph data associated with the user includes user priority scores, channel priority scores, and topic priority scores associated with the user.

252. The method of embodiment 246, wherein the set of applicable data items includes a set of metadata access control carrying messages.

253. The method of embodiment 252, wherein at least some of the input values for the set of metadata access control carrying messages are determined based on analysis of the associated indexed metadata.

254. The method of embodiment 246, wherein the set of applicable data items includes a set of users.

255. The method of embodiment 246, wherein the set of applicable data items includes a set of channels.

256. The method of embodiment 246, wherein the set of highest ranked applicable data items is determined based on a threshold number of highest ranked applicable data items.

257. The method of embodiment 246, wherein the set of highest ranked applicable data items is determined based on a threshold ranking score.

258. The method of embodiment 252, wherein the user interface is configured to display information regarding the highest ranked metadata access control carrying messages in a channel recap format.

259. The method of embodiment 254, wherein the user interface is configured to display information regarding the highest ranked users in a search results format.

260. The method of embodiment 255, wherein the user interface is configured to display information regarding the highest ranked channels in a channel suggestions format.

In order to address various issues and advance the art, the entirety of this application for Messaging Search and Management Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a MSM individual and/or enterprise user, database configuration and/or relational model, data type, data transmission and/or network framework, syntax structure, and/or the like, various embodiments of the MSM, may be implemented that enable a great deal of flexibility and customization. For example, aspects of the MSM may be adapted for operating system and internet operating system services. While various embodiments and discussions of the MSM have included internet messaging, however, it is to be understood that the embodiments described herein may be readily configured and/or customized for a wide variety of other applications and/or implementations.

What is claimed is:
1. A work graph generating apparatus, comprising:
a memory;
a component collection in the memory, including:
a work graph generating component;
a processor disposed in communication with the memory, and configured to issue a plurality of processing instructions from the component collection stored in the memory,
wherein the processor issues instructions from the work graph generating component, stored in the memory, to:
obtain, via at least one processor, a work graph generation request, wherein the work graph generation request includes group level access control data;
determine, via at least one processor, a set of metadata access control carrying messages, wherein access control data associated with metadata access control carrying messages in the set of metadata access control carrying messages corresponds to the group level access control data;
determine, via at least one processor, a set of users, wherein access control data associated with users in the set of users corresponds to the group level access control data;
calculate, via at least one processor, from the perspective of each user in the set of users, a user priority score for each of the other users in the set of users, wherein a user priority score from the perspective of a first user for a second user is calculated based on the number of metadata access control carrying messages, in the set of metadata access control carrying messages, associated with the second user that were user-pertinent to the first user;
determine, via at least one processor, a set of channels, wherein access control data associated with channels in the set of channels corresponds to the group level access control data;
calculate, via at least one processor, from the perspective of each user in the set of users, a channel priority score for each of the channels in the set of channels, wherein a channel priority score from the perspective of a user for a channel is calculated based on the number of metadata access control carrying messages, in the set of metadata access control carrying messages, associated with that channel that were channel-pertinent to that user;
determine, via at least one processor, a set of topics associated with the set of metadata access control carrying messages;
calculate, via at least one processor, from the perspective of each user in the set of users, a topic priority score for each of the topics in the set of topics, wherein a topic priority score from the perspective of a user for a topic is calculated based on the number of metadata access control carrying messages, in the set of metadata access control carrying messages, associated with that topic that were topic-pertinent to that user; and
generate, via at least one processor, a work graph data structure that includes a set of user objects corresponding to the set of users, wherein a user object for a user includes data regarding the calculated user priority scores, channel priority scores, and topic priority scores associated with that user, and wherein the work graph data structure is associated with group level access control data.

2. The apparatus of claim 1, wherein the group level access control data is associated with an organization group.
3. The apparatus of claim 1, wherein the group level access control data is associated with a team group.

4. The apparatus of claim 1, wherein the set of metadata access control carrying messages is filtered to exclude metadata access control carrying messages sent outside a specified time period.

5. The apparatus of claim 1, wherein the user-pertinent metadata access control carrying messages are any of: metadata access control carrying messages from the second user read by the first user, metadata access control carrying messages from the first user to the second user, metadata access control carrying messages from the second user responded to by the first user.

6. The apparatus of claim 5, wherein a response to a metadata access control carrying message is any of: a reaction to the metadata access control carrying message, clicking on a link in the metadata access control carrying message, replying to the metadata access control carrying message, downloading a file associated with the metadata access control carrying message, sharing the metadata access control carrying message to another channel, pinning the metadata access control carrying message, starring the metadata access control carrying message.

7. The apparatus of claim 1, wherein the channel-pertinent metadata access control carrying messages associated with a channel for a user are any of: metadata access control carrying messages sent by that user in that channel, metadata access control carrying messages read by that user in that channel, metadata access control carrying messages in that channel responded to by that user.

8. The apparatus of claim 1, wherein the topic-pertinent metadata access control carrying messages associated with a topic for a user are any of: metadata access control carrying messages sent by that user regarding that topic, metadata access control carrying messages read by that user regarding that topic, metadata access control carrying messages regarding that topic responded to by that user.

9. The apparatus of claim 1, further, comprising:
the processor issues instructions from the work graph generating component, stored in the memory, to:
calculate, via at least one processor, from the perspective of each channel in the set of channels, a channel similarity score for each of the other channels in the set of channels, wherein a channel similarity score from the perspective of a first channel for a second channel is calculated based on the number of common users, in the set of users, that the first channel and the second channel share;
wherein the generated work graph structure includes a set of channel objects corresponding to the set of channels, wherein a channel object for a channel includes data regarding the calculated channel similarity scores associated with that channel.

10. The apparatus of claim 1, further, comprising:
the processor issues instructions from the work graph generating component, stored in the memory, to:
calculate, via at least one processor, from the perspective of each topic in the set of topics, a topic similarity score for each of the other topics in the set of topics;
wherein the generated work graph structure includes a set of topic objects corresponding to the set of topics, wherein a topic object for a topic includes data regarding the calculated topic similarity scores associated with that topic.

11. The apparatus of claim 1, wherein user priority scores between two users in the set of users are asymmetric.

12. The apparatus of claim 1, wherein user priority scores between two users in the set of users are symmetric.

13. The apparatus of claim 1, further, comprising:
a machine learning structure generating component in the component collection, and
the processor issues instructions from the machine learning structure generating component, stored in the memory, to:
determine, via at least one processor, a ranking application for which to generate a machine learning structure;
determine, via at least one processor, a set of inputs for the machine learning structure based on the ranking application, wherein at least some of the inputs in the set of inputs correspond to work graph data stored in the work graph data structure;
train, via at least one processor, the machine learning structure using at least some of the work graph data stored in the work graph data structure; and
store, via at least one processor, machine learning structure parameters of the trained machine learning structure, wherein the trained machine learning structure is associated with group level access control data.

14. The apparatus of claim 13, wherein the machine learning structure is a neural network.

15. The apparatus of claim 13, wherein the ranking application is any of: ranking metadata access control carrying messages, ranking people, ranking channels.

16. A processor-readable work graph generating non-transient physical medium storing processor-executable components, the components, comprising:
a component collection stored in the medium, including:
a work graph generating component;
wherein the work graph generating component, stored in the medium, includes processor-issuable instructions to:
obtain, via at least one processor, a work graph generation request, wherein the work graph generation request includes group level access control data;
determine, via at least one processor, a set of metadata access control carrying messages, wherein access control data associated with metadata access control carrying messages in the set of metadata access control carrying messages corresponds to the group level access control data;
determine, via at least one processor, a set of users, wherein access control data associated with users in the set of users corresponds to the group level access control data;
calculate, via at least one processor, from the perspective of each user in the set of users, a user priority score for each of the other users in the set of users, wherein a user priority score from the perspective of a first user for a second user is calculated based on the number of metadata access control carrying messages, in the set of metadata access control carrying messages, associated with the second user that were user-pertinent to the first user;
determine, via at least one processor, a set of channels, wherein access control data associated with channels in the set of channels corresponds to the group level access control data;
calculate, via at least one processor, from the perspective of each user in the set of users, a channel priority score for each of the channels in the set of channels, wherein a channel priority score from the perspective of a user for a channel is calculated based on the number of metadata access control carrying messages, in the set of metadata access control carrying messages, associated with that channel that were channel-pertinent to that user;

determine, via at least one processor, a set of topics associated with the set of metadata access control carrying messages;

calculate, via at least one processor, from the perspective of each user in the set of users, a topic priority score for each of the topics in the set of topics, wherein a topic priority score from the perspective of a user for a topic is calculated based on the number of metadata access control carrying messages, in the set of metadata access control carrying messages, associated with that topic that were topic-pertinent to that user; and generate, via at least one processor, a work graph data structure that includes a set of user objects corresponding to the set of users, wherein a user object for a user includes data regarding the calculated user priority scores, channel priority scores, and topic priority scores associated with that user, and wherein the work graph data structure is associated with group level access control data.

17. A processor-implemented work graph generating system, comprising:

a work graph generating component means, to:

obtain, via at least one processor, a work graph generation request, wherein the work graph generation request includes group level access control data;

determine, via at least one processor, a set of metadata access control carrying messages, wherein access control data associated with metadata access control carrying messages in the set of metadata access control carrying messages corresponds to the group level access control data;

determine, via at least one processor, a set of users, wherein access control data associated with users in the set of users corresponds to the group level access control data;

calculate, via at least one processor, from the perspective of each user in the set of users, a user priority score for each of the other users in the set of users, wherein a user priority score from the perspective of a first user for a second user is calculated based on the number of metadata access control carrying messages, in the set of metadata access control carrying messages, associated with the second user that were user-pertinent to the first user;

determine, via at least one processor, a set of channels, wherein access control data associated with channels in the set of channels corresponds to the group level access control data;

calculate, via at least one processor, from the perspective of each user in the set of users, a channel priority score for each of the channels in the set of channels, wherein a channel priority score from the perspective of a user for a channel is calculated based on the number of metadata access control carrying messages, in the set of metadata access control carrying messages, associated with that channel that were channel-pertinent to that user;

determine, via at least one processor, a set of topics associated with the set of metadata access control carrying messages;

calculate, via at least one processor, from the perspective of each user in the set of users, a topic priority score for each of the topics in the set of topics, wherein a topic priority score from the perspective of a user for a topic is calculated based on the number of metadata access control carrying messages, in the set of metadata access control carrying messages, associated with that topic that were topic-pertinent to that user; and generate, via at least one processor, a work graph data structure that includes a set of user objects corresponding to the set of users, wherein a user object for a user includes data regarding the calculated user priority scores, channel priority scores, and topic priority scores associated with that user, and wherein the work graph data structure is associated with group level access control data.

18. A processor-implemented work graph generating method, comprising:

executing processor-implemented work graph generating component instructions to:

obtain, via at least one processor, a work graph generation request, wherein the work graph generation request includes group level access control data;

determine, via at least one processor, a set of metadata access control carrying messages, wherein access control data associated with metadata access control carrying messages in the set of metadata access control carrying messages corresponds to the group level access control data;

determine, via at least one processor, a set of users, wherein access control data associated with users in the set of users corresponds to the group level access control data;

calculate, via at least one processor, from the perspective of each user in the set of users, a user priority score for each of the other users in the set of users, wherein a user priority score from the perspective of a first user for a second user is calculated based on the number of metadata access control carrying messages, in the set of metadata access control carrying messages, associated with the second user that were user-pertinent to the first user;

determine, via at least one processor, a set of channels, wherein access control data associated with channels in the set of channels corresponds to the group level access control data;

calculate, via at least one processor, from the perspective of each user in the set of users, a channel priority score for each of the channels in the set of channels, wherein a channel priority score from the perspective of a user for a channel is calculated based on the number of metadata access control carrying messages, in the set of metadata access control carrying messages, associated with that channel that were channel-pertinent to that user;

determine, via at least one processor, a set of topics associated with the set of metadata access control carrying messages;

calculate, via at least one processor, from the perspective of each user in the set of users, a topic priority score for each of the topics in the set of topics, wherein a topic priority score from the perspective of a user for a topic is calculated based on the number of metadata access control carrying messages, in the set of metadata access control carrying messages, associated with that topic that were topic-pertinent to that user; and generate, via at least one processor, a work graph data structure that includes a set of user objects corresponding to the set of users, wherein a user object for a user includes data regarding the calculated user priority scores, channel priority scores, and topic priority scores associated with that user, and wherein the work graph data structure is associated with group level access control data.

* * * * *